(12) United States Patent
Laurence et al.

(10) Patent No.: US 9,132,873 B1
(45) Date of Patent: Sep. 15, 2015

(54) FLEXIBLE CONVEYANCE SYSTEM

(71) Applicant: KUKA Systems Corporation North America, Sterling Heights, MI (US)

(72) Inventors: Kevin J. Laurence, Rochester, MI (US); Michael P. LaRose, Rochester Hills, MI (US)

(73) Assignee: KUKA Systems Corporation North America, Sterling Heights, MI (US)

( * ) Notice: Subject to any disclaimer, the term of this patent is extended or adjusted under 35 U.S.C. 154(b) by 0 days.

(21) Appl. No.: 14/727,207

(22) Filed: Jun. 1, 2015

Related U.S. Application Data

(63) Continuation-in-part of application No. 14/211,793, filed on Mar. 14, 2014, now Pat. No. 9,045,183, which is a continuation-in-part of application No. 14/211,572, filed on Mar. 14, 2014, now abandoned.

(60) Provisional application No. 61/781,147, filed on Mar. 14, 2013.

(51) Int. Cl.
*B65G 17/00* (2006.01)
*B62D 65/18* (2006.01)
*B65G 17/12* (2006.01)
*B65G 17/32* (2006.01)

(52) U.S. Cl.
CPC ............. *B62D 65/18* (2013.01); *B65G 17/12* (2013.01); *B65G 17/32* (2013.01)

(58) Field of Classification Search
CPC .............................. B62D 65/18; B62D 65/024
USPC ................... 198/343.1, 346.1, 346.2, 346.3; 104/281, 283, 290; 414/928, 929
See application file for complete search history.

(56) References Cited

U.S. PATENT DOCUMENTS

| | | | |
|---|---|---|---|
| 3,575,301 A | 4/1971 | Panissidi | |
| 4,492,297 A | 1/1985 | Sticht | |
| 4,615,274 A | 10/1986 | Hoehn | |
| 4,788,786 A | 12/1988 | Suter | |
| 4,792,036 A | 12/1988 | Heidelberg | |
| 4,881,633 A | 11/1989 | Cailey et al. | |
| 4,966,080 A | 10/1990 | Teissier et al. | |
| 5,125,140 A | 6/1992 | Sticht | |
| 5,152,050 A | 10/1992 | Kaczmarek et al. | |
| 5,579,695 A | 12/1996 | Cockayne | |
| 5,839,567 A | 11/1998 | Kyotani et al. | |
| 5,957,057 A | 9/1999 | Nakamura et al. | |
| 6,101,952 A | 8/2000 | Thornton et al. | |
| 6,234,737 B1 | 5/2001 | Young et al. | |
| 6,308,821 B1 | 10/2001 | Asai et al. | |
| 6,318,542 B1 | 11/2001 | Ikeda et al. | |
| 6,662,934 B1 | 12/2003 | Iida | |

(Continued)

OTHER PUBLICATIONS

U.S Patent and Trademark Office; Search Report and Written Opinion in International Patent Application No. PCT/US2014/028819 dated Jul. 28, 2014; 12 pages.

*Primary Examiner* — Douglas Hess
(74) *Attorney, Agent, or Firm* — Wood, Herron & Evans, LLP

(57) ABSTRACT

A conveyance system includes a plurality of feed-forward track segments aligned end-to end, each having an upwardly facing channel and at least one linear motor disposed in the channel. At least one carrier is supported for movement along the track segments. Each carrier includes at least one magnet that cooperates with the linear motors to move the carrier along the respective feed-forward track segments.

16 Claims, 50 Drawing Sheets

(56) References Cited

U.S. PATENT DOCUMENTS

| | | |
|---|---|---|
| 6,834,595 B1 | 12/2004 | Henderson |
| 6,938,752 B2 | 9/2005 | Stewart et al. |
| 6,962,249 B2 | 11/2005 | Ludwig et al. |
| 7,070,041 B1 | 7/2006 | Dirschbacher et al. |
| 7,458,454 B2 | 12/2008 | Mendenhall |
| 7,614,790 B2 | 11/2009 | Liu et al. |
| 7,731,015 B2 | 6/2010 | Abe et al. |
| 8,011,491 B2 | 9/2011 | Nakagawa et al. |
| 8,191,481 B2 | 6/2012 | Spangler et al. |
| 8,616,134 B2 | 12/2013 | King et al. |
| 8,678,167 B1 * | 3/2014 | Nakamura et al. ......... 198/343.2 |
| 8,919,532 B2 * | 12/2014 | Buergermeister et al. . 198/465.1 |
| 9,045,183 B2 * | 6/2015 | Laurence et al. ..................... 1/1 |
| 9,050,896 B2 * | 6/2015 | Brier et al. ........................... 1/1 |
| 9,061,872 B2 * | 6/2015 | Finkbeiner et al. .................. 1/1 |

* cited by examiner

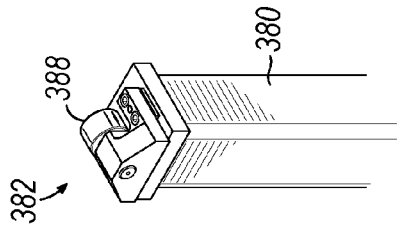
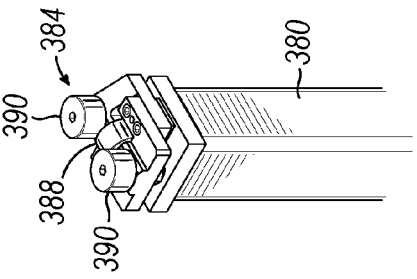
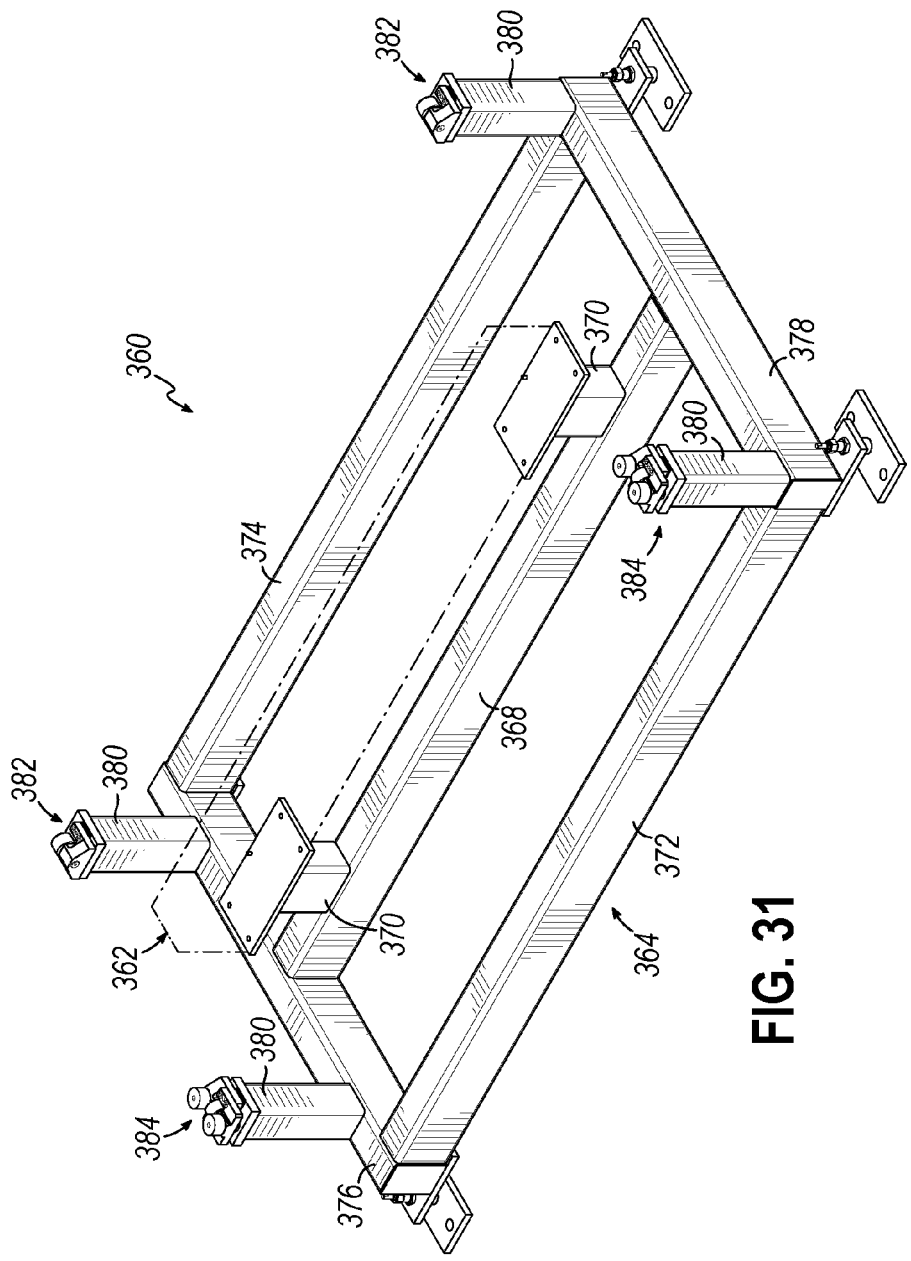

FLEXIBLE CONVEYANCE SYSTEM

CROSS-REFERENCE

This application is a continuation-in-part of U.S. patent application Ser. No. 14/211,793 filed Mar. 14, 2014 (Pending), which is a continuation-in-part of U.S. patent application Ser. No. 14/211,572 filed Mar. 14, 2014 (Abandoned), which claims the benefit of priority to U.S. Provisional Patent Application Ser. No. 61/781,147 filed Mar. 14, 2013, the disclosures of which are incorporated by reference herein in their entirety.

TECHNICAL FIELD

The invention relates generally to material handling systems and, more particularly, to conveyance systems for assembly-line fabrication.

BACKGROUND

Material handling systems for assembly-line fabrication are generally designed to facilitate efficient and rapid fabrication of an assembly from a plurality of parts or sub-assemblies. One area particularly suited to such material handling systems is automotive manufacturing. For example, material handling systems may be used for the assembly of a vehicle's sheet metal body, power train, chassis sub-assemblies, or trim. Material handling systems may also be used in painting operations, welding, bonding, or other general assembly operations.

Generally a carrier, a structure for accumulating the various parts and sub-assemblies that will eventually be joined to a vehicle body, travels through a plurality of stations. At each station, components may be added and/or joining operations may be performed (e.g., resistance welding, adhesive bonding, stud welding, etc.) by a plurality of robots or tradesman. Individual components or sub-assemblies may be provided to the various stations by a magazine, which presents the parts to the robots or tradesmen in a consistent orientation and at sufficient frequency to match the pace of an assembly line. Either at discrete stations, or in conjunction with other tasks, a plurality of geometric orientation tools ("geo-tools") may be used to manipulate the parts into precise alignment with various reference points prior to being permanently joined.

Often, the carrier may be conveyed by a generic transfer frame. The transfer frame may be moved from station to station by a variety of different transfer systems, such as an overhead track system, for example, and may be raised and lowered with respect to the stations.

There are several disadvantages traditional conveyance systems. For example, the transfer frame and carriers produce a bulky combined assembly. At the end of the assembly line, each of the transfer frames and carrier assemblies must be returned to the beginning of the line. This often involves dedicating a return loop, typically located above the assembly line, for the purpose of returning the empty carriers and frames. Unfortunately, this return loop generally bisects an upper catwalk and, therefore, prohibits maintenance personnel on one side from being able to safely pass to the other side of the catwalk. This greatly hinders troubleshooting and access to equipment cabinets and overhand routed utilities.

Additionally, each of the frames and carriers may be communally tied to an overhead conveyer. Accordingly, carriers and frames at one station cannot be moved independently with respect to carriers and frames at other stations. This results in a lack of flexibility, and carriers are unable to rapidly pass through unnecessary stations. Moreover, carriers must be moved through the various stations at a constant movement and delay pattern. A carrier and corresponding parts undergoing processing at one station, even when processing is completed, cannot move until all of the other stations have completed their respective tasks. Limit switches, slow switches, and stop switches control the overhead conveyer as one collective unit.

Therefore, an improved non-overhead conveyance system with improved flexibility is needed.

SUMMARY

The present invention overcomes the foregoing and other shortcomings and drawbacks of conventional conveyance systems heretofore known for use in transferring components along an assembly line. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, an apparatus for use with a flexible conveyance system includes at least one station track segment that is aligned with a track segment of the flexible conveyance system. The station track segment has an upper side with at least one opening that defines an upwardly-facing channel extending lengthwise along the station track segment. At least one linear motor is disposed within the channel and cooperates with linear motors of the conveyance system tack segments to receive and position a carrier on the station track segment. The apparatus further includes actuation structure proximate the station track segment and configured to displace at least a portion of the carrier when the carrier is positioned on the station track segment.

In one embodiment, the actuation structure may comprise at least one locating fixture spaced laterally from the at least one station track segment. The locating fixture defines at least one surface for contacting complementary locating structure on the carrier when the carrier is received on the station track segment, whereby the locating fixture and the locating structure cooperate to position the carrier within the workstation. In one aspect, the carrier may include first and second portions, and contact between the locating fixture of the apparatus and the locating structure on the carrier may move the second carrier portion in a direction away from the first carrier portion.

In another embodiment, the actuation structure may be an elevator for vertically displacing the carrier on the station track segment. In yet another embodiment, the actuation structure may be a lift for vertically displacing the carrier on the station track segment. In another embodiment, the actuation structure may be a turnaround for angularly displacing the carrier on the station track segment.

In another aspect, a carrier for use with a flexible conveyance system that has a plurality of track segments with linear motors includes a first carrier portion received on the track segments and a second carrier portion couplable with the first carrier portion. The first carrier portion may include at least one first engagement feature, and the second carrier portion may include at least one second engagement feature, the second engagement feature being complementary to the at least one first engagement feature and cooperating with the at least one first engagement feature to locate the second carrier portion on the first carrier portion.

The above and other objects and advantages in accordance with the principles of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention. Similar reference numerals are used to indicate similar features throughout the various figures of the drawings.

FIG. 31 is an enlarged perspective view of the workstation of FIG. 30, with the track segment removed to show detail.

FIG. 31A is a perspective view of an exemplary locating fixture of the workstation of FIG. 31.

FIG. 31B is a perspective view of another locating fixture of the workstation of FIG. 31.

DETAILED DESCRIPTION

Figure 1:
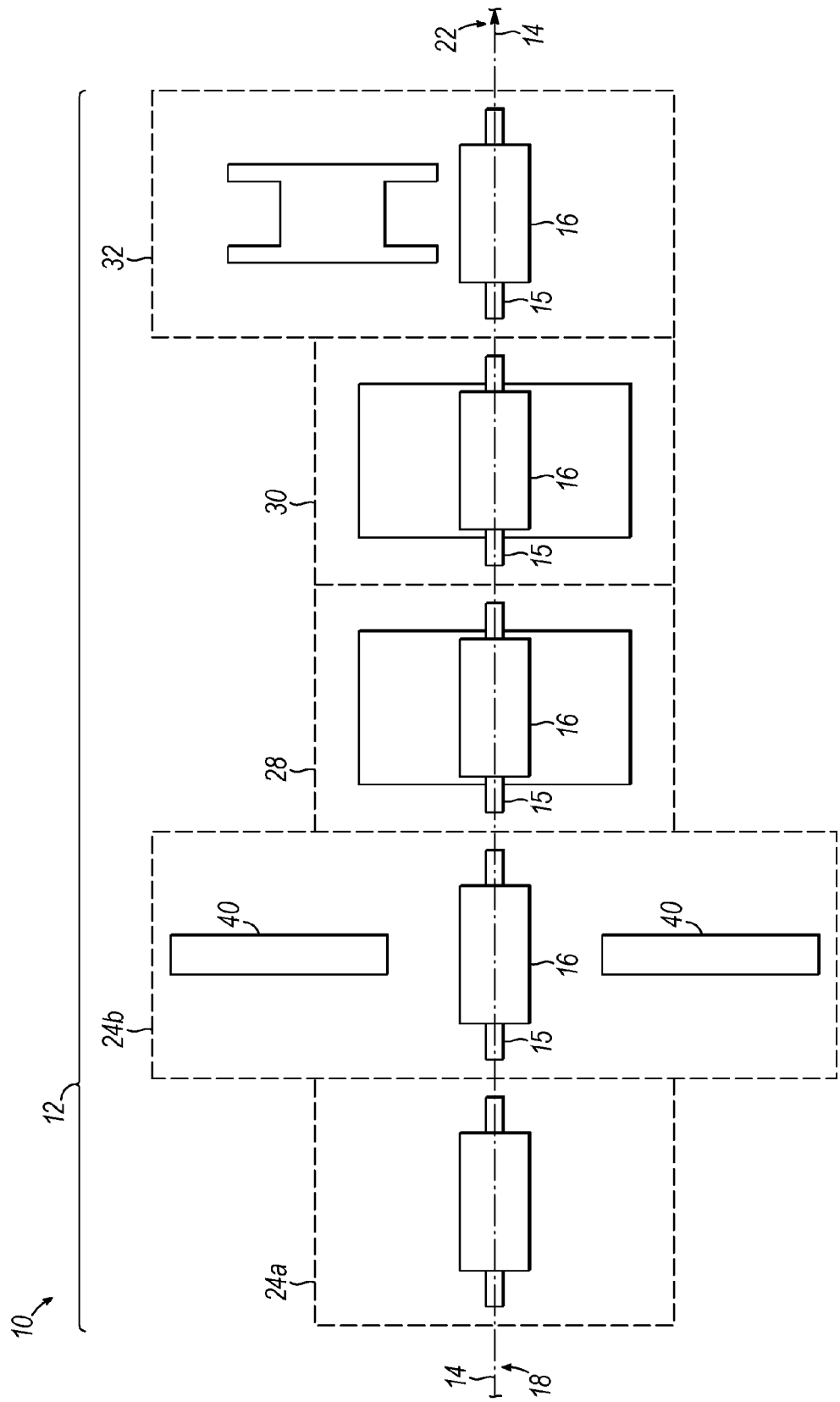
FIG. 1 is a schematic plan view of an assembly line including an exemplary conveyance system in accordance with the principles of the present invention.

FIG. 1 is a schematic illustration of an exemplary, flexible inverted conveyance system 10 in accordance with the principles of the present invention. A plurality of stations 12 are configured to process and assemble various components and sub-components, such as automotive bodies.

The system 10 includes a track 14 that conveys parts between the various stations 12. A carrier 16 (described in more detail below with respect to FIGS. 5 and 9) cooperates with the track 14 and serves as a foundation to receive various parts and subcomponents. The carrier 16 is introduced at the beginning of the line 18, and is conveyed by a plurality of belt segments 20 (described in more detail below with respect to FIGS. 6-8) that are disposed beneath the track 14. It has been observed that several configurations of belt 20 may provide acceptable results. Two important design characteristics of belt 20 include resistance to elongation and the application of sufficient frictional forces between the belt segment 20 and the carrier 16. For example, one embodiment of the invention may use a steel reinforced nylon belt to resist elongation while the belt segment 20 is under load while conveying the carrier 16. Additionally, certain embodiments may utilize a grooved belt to enhance frictional forces between the belt segment 20 and the carrier 16, while other embodiments my use a molded urethane coating or other resilient compound. In the exemplary system 10, the belt segments 20 may be completely enclosed by the track segments 15. It should be noted that while the track 14 is illustrated in the drawings as being continuous, the track actually comprises a plurality of segments, wherein each segment is independent of the adjacent segments. The carrier 16 is driven by the various belt segments 20 toward the end of the line 22.

With continued reference to FIG. 1, one possible configuration of the various stations 12 that the carrier 16 passes through on the track segments 15 and belt segments 20 will be described. After being mated with the track segment 15, the carrier 16 first enters a component placement station 24, which may include a first placement station 24a and a second placement station 24b. A plurality of feed conveyors 40 hold, orient, and advance various auto body components and sub-assemblies that are positioned near the track segment 15. Various robots (described in more detail below) may grasp parts from the feed conveyor 40 and place them onto the carrier 16. The carrier 16 then progresses to the next station 12, a geo-tool 28, where the various components on the carrier 16 are aligned with each other and preliminarily joined together. The carrier 16 may then progresses to the next station 12, which is a re-spot tool 30. The re-spot tool 30 may apply additional welds that could not be applied at geo-tool station 28 due to obstructions in the geo-tool 28, or because of time constraints. The carrier 16 may then travel through a plurality of additional stations 12 that could include adhesive bonding, additional geo-tools 28, additional component placement stations 24, or additional re-spot tools 30.

When the carrier 16 enters the geo-tool 28, the track segment 15 and belt segment 20 are lowered to the ground. This effectively transfers the weight of the parts or sub-components onto the geo-tool 28 itself, and off of the carrier 16. Once the load of parts is no longer on the carrier 16, the geo-tool 28 and its various fixtures can manipulate the sub-assembly and place each of the components into a particular geometric relationship with each other. While the carrier 16 is lowered out of the way, the robots are able to more easily access various surfaces of the auto body in the absence of interfering projections of the carrier 16. As the track segment 15 is lowered, the belt segment 20 is placed into a free-wheeling configuration, and an internal clutch decouples the belt segment 20 from a drive. The carrier 16 is then able to move fore and aft, thereby allowing the parts to be engaged by the geo-tool 28.

After completing each of the various processing stations 12, the carrier 16 terminates at the end of line 22 at an off-load station 32. At the off-load station 32, the completed auto body sub-assembly is removed from the carrier 16. The carrier 16 is decoupled from the track 14 and a robot transfers the carrier 16 from the track 14 to an overhead return track 34 (described in more detail blow with respect to FIG. 14) that conveys the carrier 16 back to the beginning of the line 18.

Figure 2:
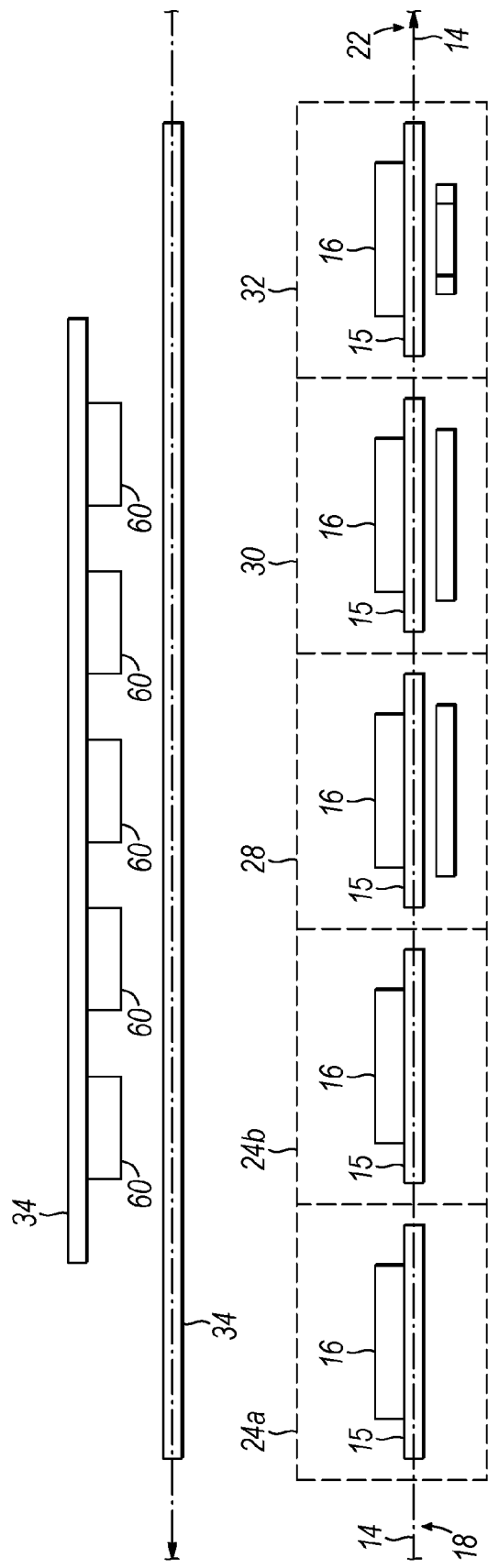
FIG. 2 is a schematic elevation view of the exemplary conveyance system of FIG. 1.

FIG. 2 is a side elevation view of the exemplary conveyance system 10 of FIG. 1, including an overhead return track 34 disposed between the track 14 and a catwalk 36. The catwalk 36 may support equipment 60, such as motor controllers, robot control cabinets, utility distribution systems, etc., and facilitates maintenance, repair, and troubleshooting thereof. It should be noted that this configuration of track 14, return track 34, and catwalk 36 allows for an unobstructed path for service personnel on the catwalk 36. By way of counter-example, if the overhead return track 34 was situated above the catwalk 36, service personnel would be unable to walk from one side of the catwalk 36 to the other side of the catwalk 36. The path would be obstructed by the overhead return track 34 and carriers 16 that are recycled back to the beginning of the line 18. In this view, the geo-tool 28 and re-spot tool 30 are depicted as having track segments 15 configured to raise and lower independently from the other track sections 15 and independently from other stations 12. It should also be noted that the stations 12 and their corresponding belt segments 20 are capable of independent linear speed control with respect to adjacent belt segments 20. This enables the carrier 16 to be advanced down the track 14 thereby bypassing unused stations 12. Additionally, this allows the carrier 16 to be released from a station 12 and placed into a vacant station 12, even prior to adjacent carrier 16 being released from an adjacent station 12.

Figure 3:
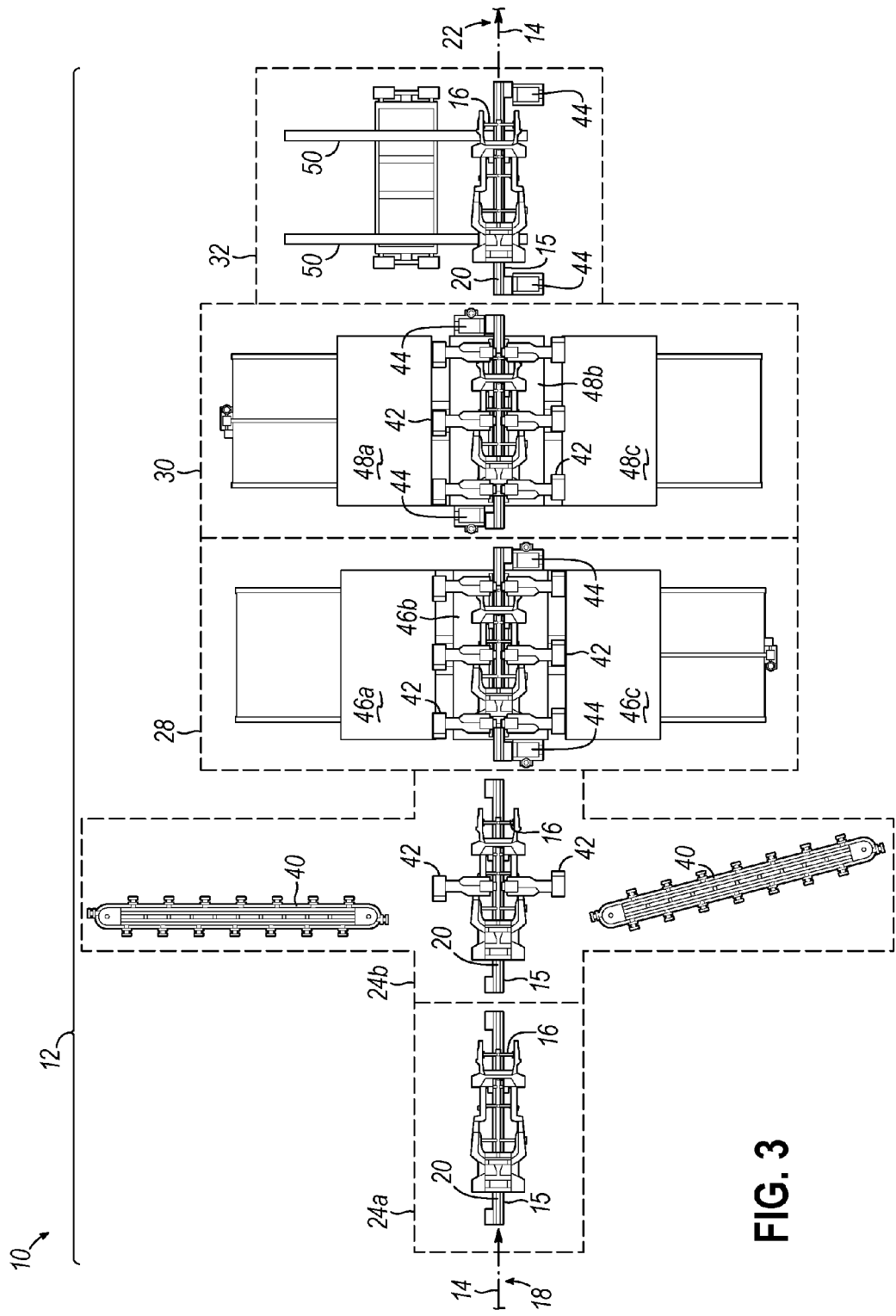
FIG. 3 is a more detailed top plan view of the conveyance system of FIG. 1.

Referring now to FIG. 3, a plan view of the conveyance system 10 of FIG. 1 is illustrated in greater detail, however, catwalk 36 and overhead return track 34 have been omitted for clarity. Starting at the beginning of the line 18, a carrier 16 sits at a component placement station 24a and has been loaded with several large sub-assemblies of an automotive body. The track segment 15 and corresponding belt segment 20 of station 24a are configured to be static. For the purposes of this discussion, a static track segment 15 is defined as one that is incapable of raising and lowering with respect to the assembly line floor. At component placement station 24b, the carrier 16 receives additional auto body components from a plurality of feed conveyors 40. Some embodiments may utilize feed conveyors 40 of a horizontal configuration, while other embodiments may utilize vertical conveyors to minimize consumption of assembly line floor space. As with station 24a, the station at 24b is also configured to be static and is only capable of linear translation of the carrier 16. A plurality of robots 42 transfer auto body components from the feed conveyor 40 to the carrier 16 which is parked in the component placement station 24b. Parts from the feed conveyor 40 are advanced to the assembly line at a rate sufficient to supply the carrier 16 as it enters the component placement station 24b.

A geo-tool 28 is the first station 12 of the assembly line that is configured with a vertical translation tower 44. The vertical translation towers 44 are configured to move the track segment 15, and corresponding belt segment 20, up and down with respect to the assembly line floor. Since the vertical translation towers 44 and robots are a primary physical interface between the system 10 and the facility floor, it is desirable to conceal a majority of plant utilities therein. Therefore, robots 42 and vertical translation towers 44 may include channels or penetrations in their respective bases, so that electrical power conductors, electrical signal conductors, hydraulic lines, pneumatic lines, and the like may travel from the assembly line floor to the system 10 in a protected and efficient manner.

With continued reference to FIG. 3, a plurality of geo-tool trays 46a-46c may be positioned underneath the track segment 15 and disposed between a pair of vertical translation towers 44. Each of the geo-tool trays 46a-46c are configured with a plurality of indexing pins, holding fixtures, clamping means, and the like, that correspond to a particular automotive make and model and combination of auto body parts. Therefore, the conveyance system 10, in this particular example, is capable of accommodating at least three different variations of automotive body frame to be processed on the assembly line.

Once the carrier 16 is positioned over the appropriate geo-tool tray 46a-46c, an internal clutch mechanism disengages power from the belt segment 20. This essentially places the carrier 16 in a configuration allowing for fore and aft movement of carrier 16 with respect to the geo-tool tray 46a-46c. Therefore, when the track segment 15 is lowered into contact with the geo-tool tray 46a-46c by the vertical translation towers 44 the carrier 16 is capable of reciprocating freely to bring the parts into contact with the appropriate portions of the geo-tool tray 46a-46c. Once lowered, the carrier 16 no longer bears the weight of the automotive body components and the weight of said components is now in contact with the various components of the geo-tool tray 46a-46c. A plurality of robots 42 preliminarily secure each of the auto body components in a desired relationship with the other auto body components. Once the parts are preliminarily secured, the track segment 15 is raised by the vertical translation towers 44, bringing the automotive components back into contact with the carrier 16. When the track segment 15 is fully raised, the full weight of the automotive assembly is on the carrier 16, and the carrier 16 is ready for movement into the next station 12.

The next station 12 is a re-spot tool 30. The re-spot tool 30 is configured to perform additional joining operations that were infeasible due to obstructions in the prior station 12 or due to time limitations at the prior station 12. A plurality of re-spot tool trays 48a-48c may be positioned underneath the track segment 15 in the same way that the plurality of geo-tool trays 46a-46c were positioned in the geo-tool 28. Once the carrier 16 is positioned over the appropriate re-spot tool tray 48a-48c, a pair of vertical translation towers 44 lower the track segment 15 into contact with the re-spot tool tray 48a-48c. A plurality of robots 42 provide additional welding to the automotive components that are positioned and supported by the re-spot tool 30. After additional welding steps are complete, the pair of vertical translation towers 44 raise the track segment 15 and cooperating carrier 16 vertically with respect to the assembly line floor. The weight of the automotive body components are then transferred from the re-spot tool tray 48a-48c to the carrier 16. When the track segment 15 and cooperating carrier 16 are fully raised, the carrier 16 is ready to be advanced to the next station 12. It should be noted that these exemplary views depict a truncated version of a full assembly line. Any combination or number of individual stations 12 may be placed in sequential order to allow for flexibility in the manufacturing process. For example, additional operations may be performed at the various stations 12 to include adhesive bonding, stud or fastener placement, automated or mechanical adjustment of parts, automated or manual application of trim and other accessory components, etc.

The final exemplary station 12 illustrated in FIG. 3 is an offload station 32. Once the carrier 16 is in the offload station 32, a plurality of lifting forks 50 are reciprocated into a position between the carrier 16 and automotive body components. The vertical translation towers 44 lower the track segment 15 and carrier 16 a sufficient distance to transfer the weight of the automotive body components onto the lifting forks 50. The lifting forks 50 then retract to their original position away from the track 14 and place the partially assembled automotive body onto a cart or other conveyance for movement throughout the factory. As will be described in more detail below with reference to FIG. 14, a robot 42 transfers the carrier 16 from the track segment 15 to an overhead return track 34. The overhead return track 34 returns the carrier 16 from the end of the line 22 back to the beginning of the line 18. As will be explained in greater detail in the discussion that follows, the configuration of the overhead return track is such that an unobstructed path on the catwalk 36 is maintained.

Figure 4:
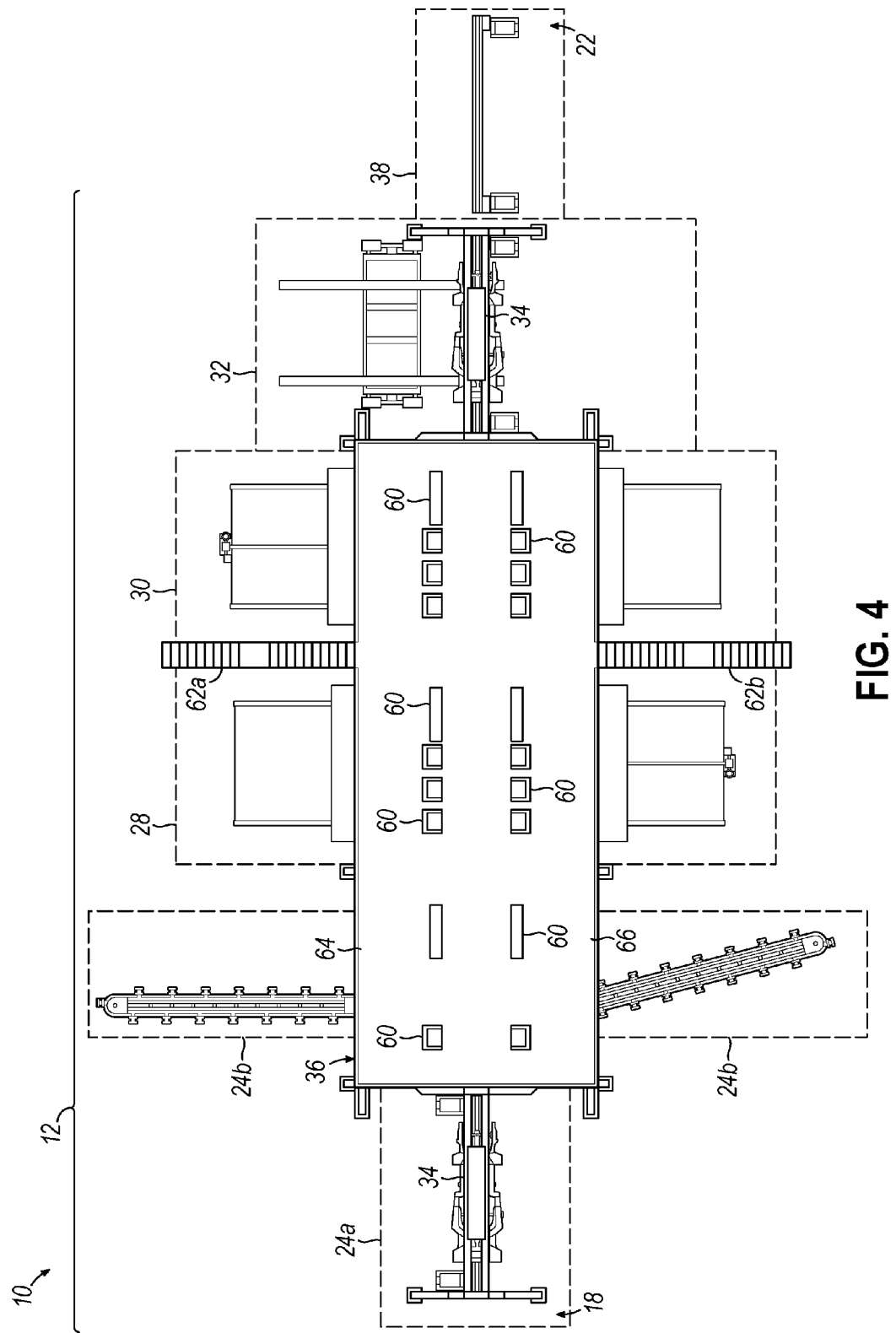
FIG. 4 is a top plan view of the conveyance system of FIG. 3, further including a catwalk and an overhead return track.

FIG. 4 is a plan view of the conveyance system 10, similar to FIG. 3, but now including the catwalk 36 and overhead return track 34. The catwalk 36 and corresponding equipment 60 are situated directly above the track 14. The overhead return track 34 is situated below the catwalk 36 in this top view. A plurality of stairs 62a and 62b join the ground level of the assembly line to the catwalk 36. In the absence of a carrier return track disposed above the catwalk 36, a worker may travel up the stairs 62a, across the catwalk 36, and down the stairs 62b on the opposite side of the catwalk 36. This configuration provides greatly improved efficiency during trouble-shooting and repair procedures. A technician on the catwalk 36 may freely move from the left side 64 to the right side 66 of the catwalk 36. The orientation of left side 64 and right side 66 is defined when one is standing at the beginning of the line 18 and looking toward the end of the line 22. Therefore, performance of the equipment 60 on the left side 64 of the catwalk 36 may be readily compared with equipment 60 performance on the right side 66 of the catwalk 36 during troubleshooting procedures.

FIG. 4 also illustrates an optional repair station 68 positioned at the end of the line 22. Damaged portions of the carrier 16 may be replaced, adjusted, or refurbished after being removed from the assembly line and placed onto a track segment 15 of the repair station 68. A partition (not shown) may be disposed between the offload station 32 and repair station 68, so that the carrier 16 may be safely serviced while the main assembly line continues to operate.

Figure 5:
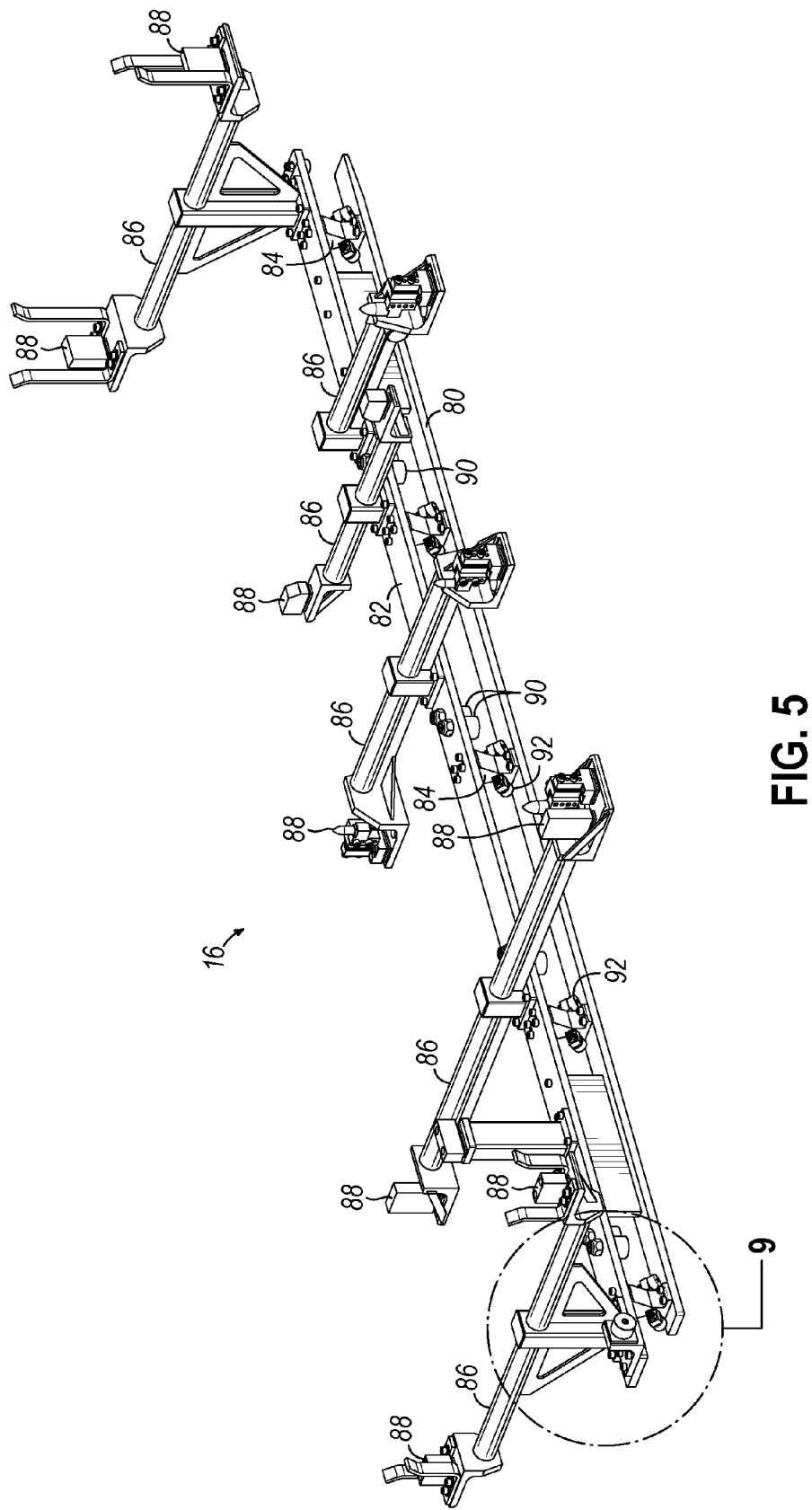
FIG. 5 is a perspective view of an exemplary carrier in accordance with the principles of the present invention.

FIG. 5. depicts an exemplary carrier 16 in accordance with the principles of the invention. A friction rail 80 is mated to a mounting rail 82 with a plurality of risers 84. The carrier 16 includes a friction rail 80 and mounting rail 82 joined with a riser 84 using, for example, threaded fasteners, welding, rivets, or other suitable methods of attachment. A plurality of transverse supports 86 are mounted in a perpendicular orientation with respect to the mounting rail 82. The transverse supports 86 terminate in a plurality of load bearing surfaces 88. The load bearing surfaces 88 are configured to support the various portions and sub-assemblies of the automotive body as the carrier 16 and cooperating auto body components travel down the track 14. A plurality of parallel rollers 90 and angled rollers 92 cooperate with mating surfaces on the track 14 and stabilize the carrier 16 as it travels down the track 14. The engagement between the parallel rollers 90 and angled rollers 92 will be shown in detail in the following figures.

Figure 6:
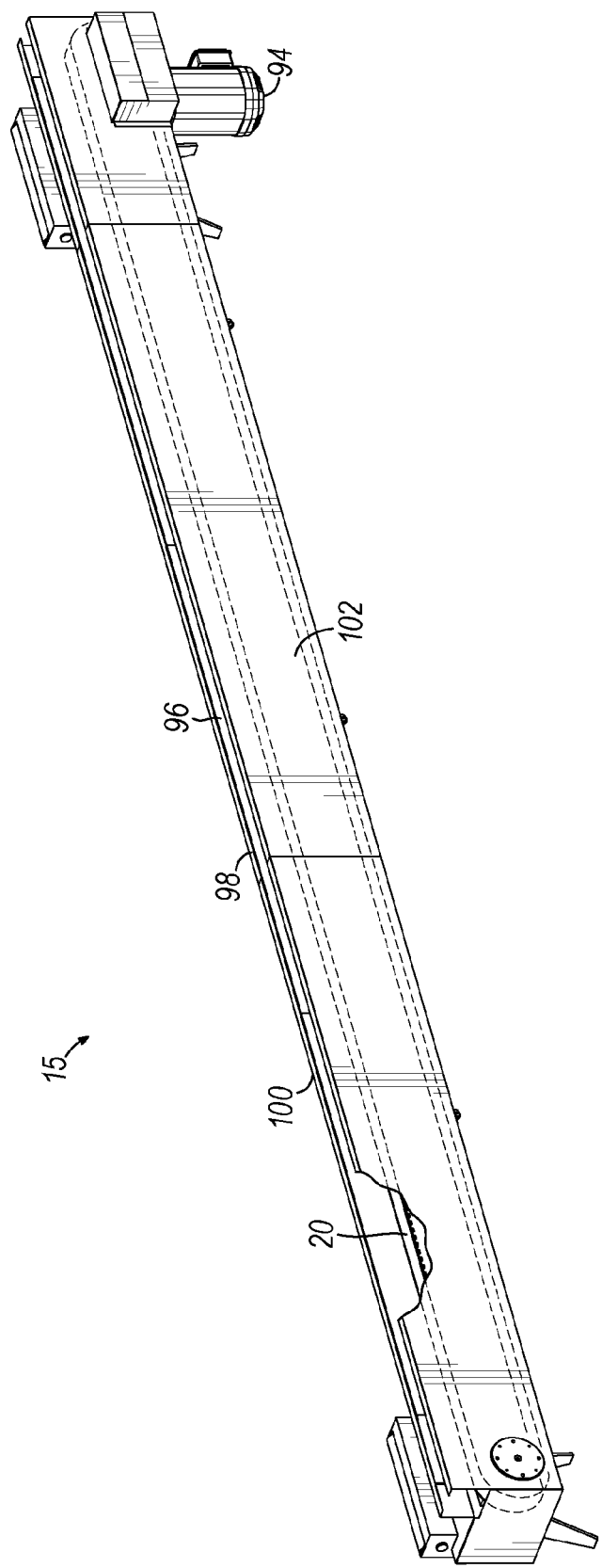
FIG. 6 is a perspective view of an exemplary track segment in accordance with the principles of the present invention.

FIG. 6 depicts an exemplary track segment 15, and illustrates the nested belt segment 20 therein. A belt motor 94 may be operated by a motor controller (not shown) to drive the belt segment 20 of one track segment 15 independently from other belt segments 20. As illustrated below with respect to FIGS. 7-10, the carrier 16 rides within a channel 96 defined by a top surface 98, a first rail 100, a second rail 102, and the belt segment 20. Bearing surfaces of the first rail 100 and second rail 102 may be fabricated from SAE 4140 steel in some embodiments of the invention. The friction rail 80, parallel rollers 90, and angular rollers 92 of the carrier 16 generally travel below the top surface 98 of the rail 14 while the mounting rail 82 and transverse supports 86 ride above the top surface 98 of the rail 14.

Figure 7:
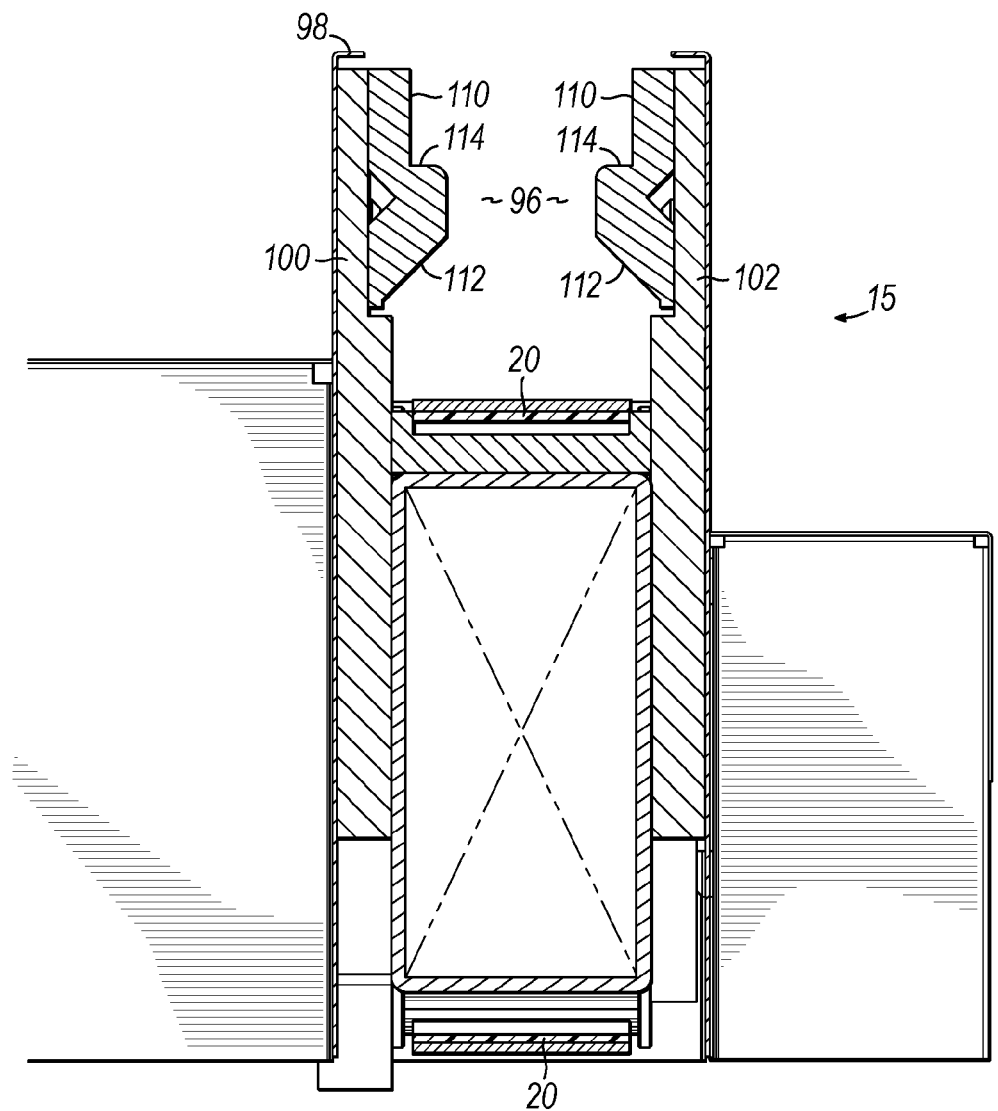
FIG. 7 is a partial cross-sectional view of the track segment of FIG. 6, taken along line 7-7.
Figure 8:
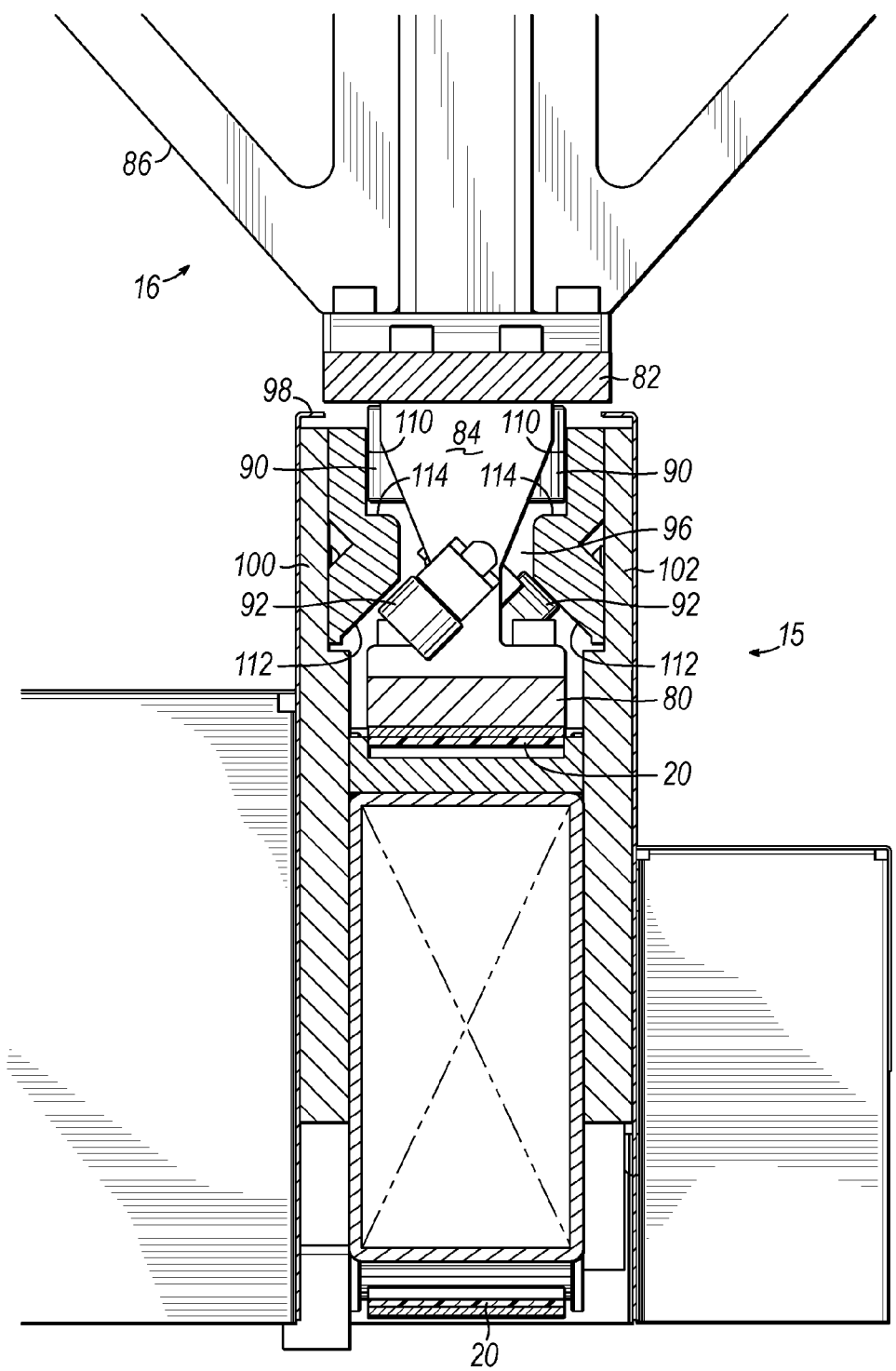
FIG. 8 is a partial cross-sectional view of the track segment of FIG. 7, further illustrating a carrier coupled with the track segment.

Referring now to FIGS. 7-10, coupling of a carrier 16 to a track segment 15 is described. FIG. 7 shows a detailed cross-sectional view of the track segment 15. The first rail 100 and second rail 102 are generally symmetric and the individual features of the first rail 100 equally apply to the second rail 102. The parallel face 110 of the track segment 15 and a cooperating parallel roller 90 on the carrier 16 serve to generally guide the carrier 16 axially along the track segment 15. An angled face 112 of the track segment 15 and a cooperating angled roller 92 on the carrier 16 serve to trap the carrier 16 within the channel 94 of the track segment 15. The angled rollers 92 and cooperating angled face 112 serve to keep the carrier 16 in constant frictional relationship with the belt segment 20. Under normal operating conditions, the parallel rollers 90 are suspended above the non-contact face 114 by lifting forces that are exerted upon the friction rail 80 by the belt segment 20. At certain portions of the system 10, the first rail 100 and second rail 102 are held in a moveable relationship with each other. This enables the first rail 100 and second rail 102 to be separated from each other for the purpose of coupling and decoupling the carrier 16 from the track segment 15. FIG. 8 shows an end view of the cooperation between carrier 16 and its rollers 90 and 92 and the track segment 15 and its faces 110 and 112.

Figure 9:
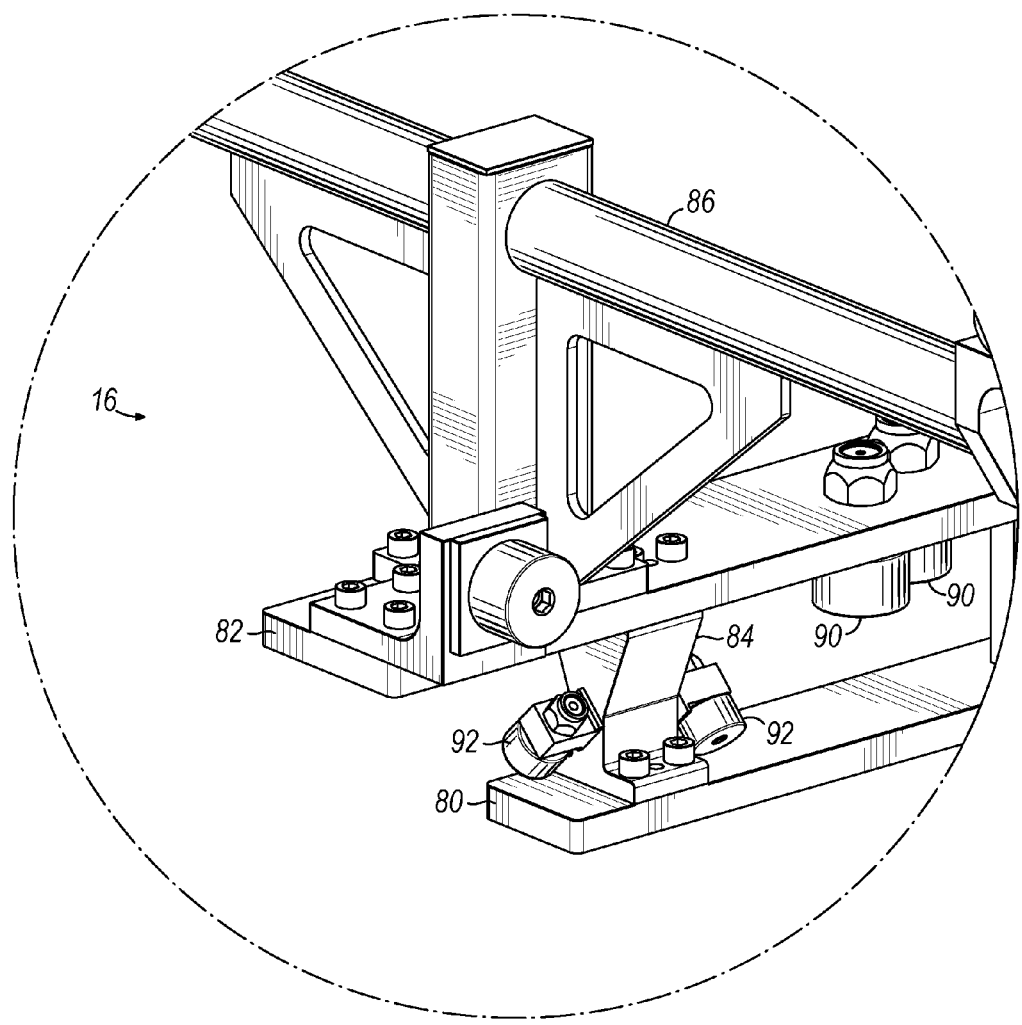
FIG. 9 is a detail view of the encircled area of FIG. 5.
Figure 10:
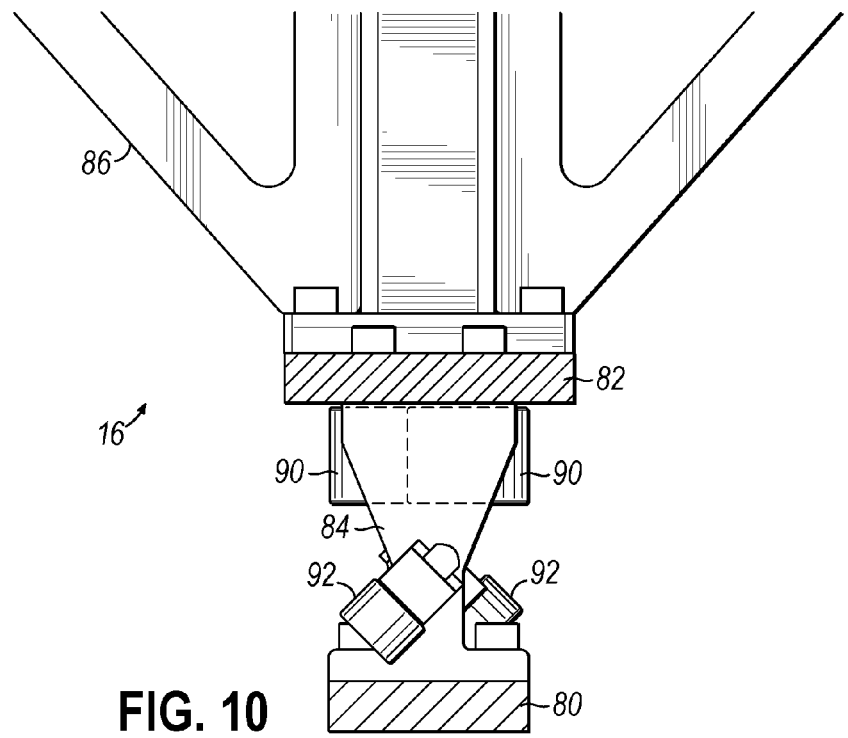
FIG. 10 is an end view of the carrier of FIG. 5, further illustrating the configuration of rollers.

With reference to FIGS. 9 and 10, the angled rollers 92 of the carrier 16 are mated to the riser 84 and are disposed such that the contact surfaces of the angled rollers 92 form a substantially forty-five degree angle with respect to the friction rail 80 and mounting rail 82. The center lines of rotation of the angled rollers 92 form right angles with respect to each other. It will be appreciated that various other angular orientations may produce acceptable results, assuming that mating surfaces on the track 14 are dimensioned appropriately. The parallel rollers 90 are mated to the mounting rail 82 to reduce lateral play between the carrier 16 and track 14.

Figure 11:
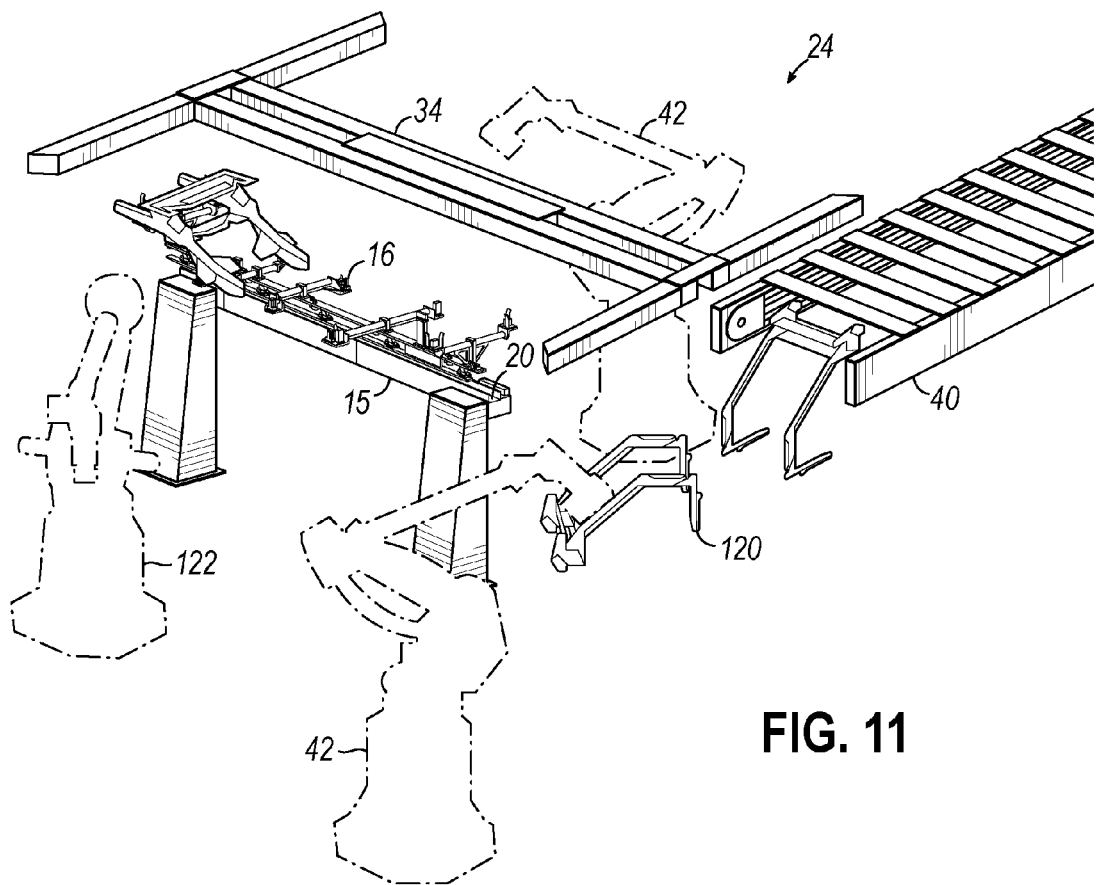
FIG. 11 is a perspective view of an exemplary component placement station in accordance with the principles of the present invention.

FIG. 11 illustrates an exemplary component placement station 24 with a track segment 15 and carrier 16 located therein. This configuration is achieved by using a beginning transfer robot 122 to transfer an empty carrier 16 from the overhead return track 34 onto the track segment 15 of component placement station 24. A similar end transfer robot 124 depicted in FIG. 14) is located at the end of the line 22 and is configured to take the empty carrier 16 from the offload station 32 and place the carrier 16 onto the overhead return track 34. Once the carrier 16 is placed on the track segment 15, the belt segment 20 is decoupled from the belt motor 94 (not shown) thereby placing the belt segment 20 in a free-wheeling configuration. A shot pin package (not shown) locks the carrier 16 at the appropriate location along the track segment 15. This stabilizes the carrier 16 in preparation for receiving automotive body parts. Once the empty carrier 16 has been spatially oriented in the component placement station 24, a robot 42 places a first body component 120 onto the carrier 16. The first body component 120 is fed to the component placement system by the feed conveyor 40. The robot 42 repetitively transfers a new first body component 120 from the feed conveyor 40 upon each empty carrier 16 entering the component placement station 24. Once the appropriate number of auto body components is added to the carrier 16, the shot pin package (not shown) retracts, the belt segment 20 is re-coupled to the belt motor 94 (not shown), and the carrier 16 is advanced to the next station 12.

Figure 12:
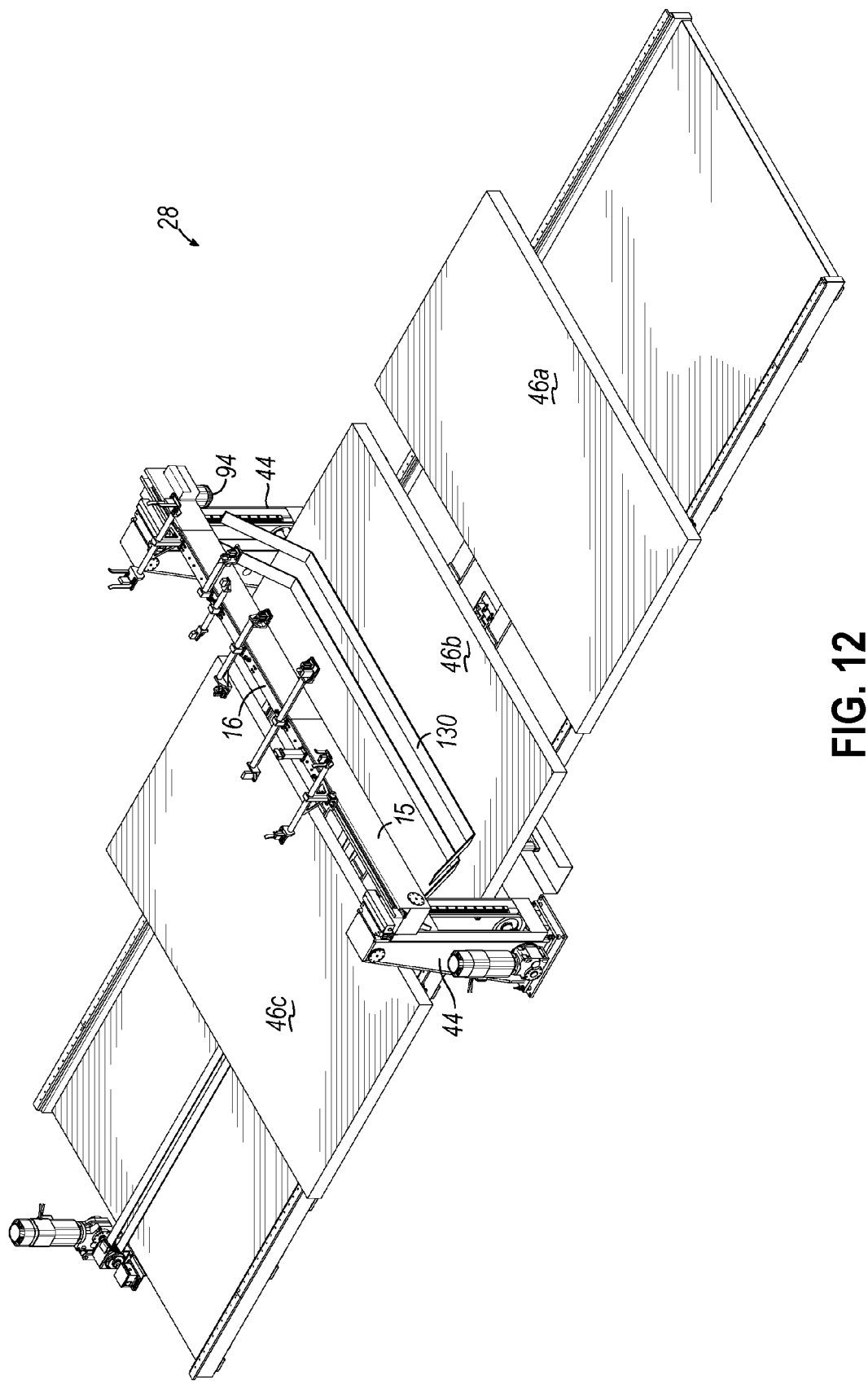
FIG. 12 is a perspective view of an exemplary geo-tool station in accordance with the principles of the present invention.

FIG. 12 depicts an exemplary geo-tool 28 in accordance with the principles of the invention. The geo-tool trays 46a-46c are positioned underneath the track segment 15. In this embodiment, geo-tool tray 46b is selected to interact with the carrier 16. A pair of vertical translation towers 44 suspend the track segment 15 above the geo-tool tray 46b. Once the belt motor 94 has positioned the carrier 16 in a generally acceptable linear position above the geo-tool tray 46b, the belt motor 94 is decoupled from the belt segment 20 allowing the carrier 16 to freely move fore and aft. As the vertical translation towers 44 lower the track segment 15 toward the geo-tool tray 46b the carrier 16 is guided into final alignment with the geo-tool tray 46b by angled surfaces of a yoke 130. This final guiding is accomplished with very little opposition since the belt motor 94 has been decoupled from the belt segment 20 as described earlier. Once the carrier 16 has been lowered into the yoke 130, the various fixtures and clamping components of the geo-tool tray 46b grasp the automotive body parts. Preliminary welding is completed and the carrier 16 and track segment 15 are raised by the vertical translation towers 44 in preparation of moving the carrier 16 to the next station 12.

Figure 13:
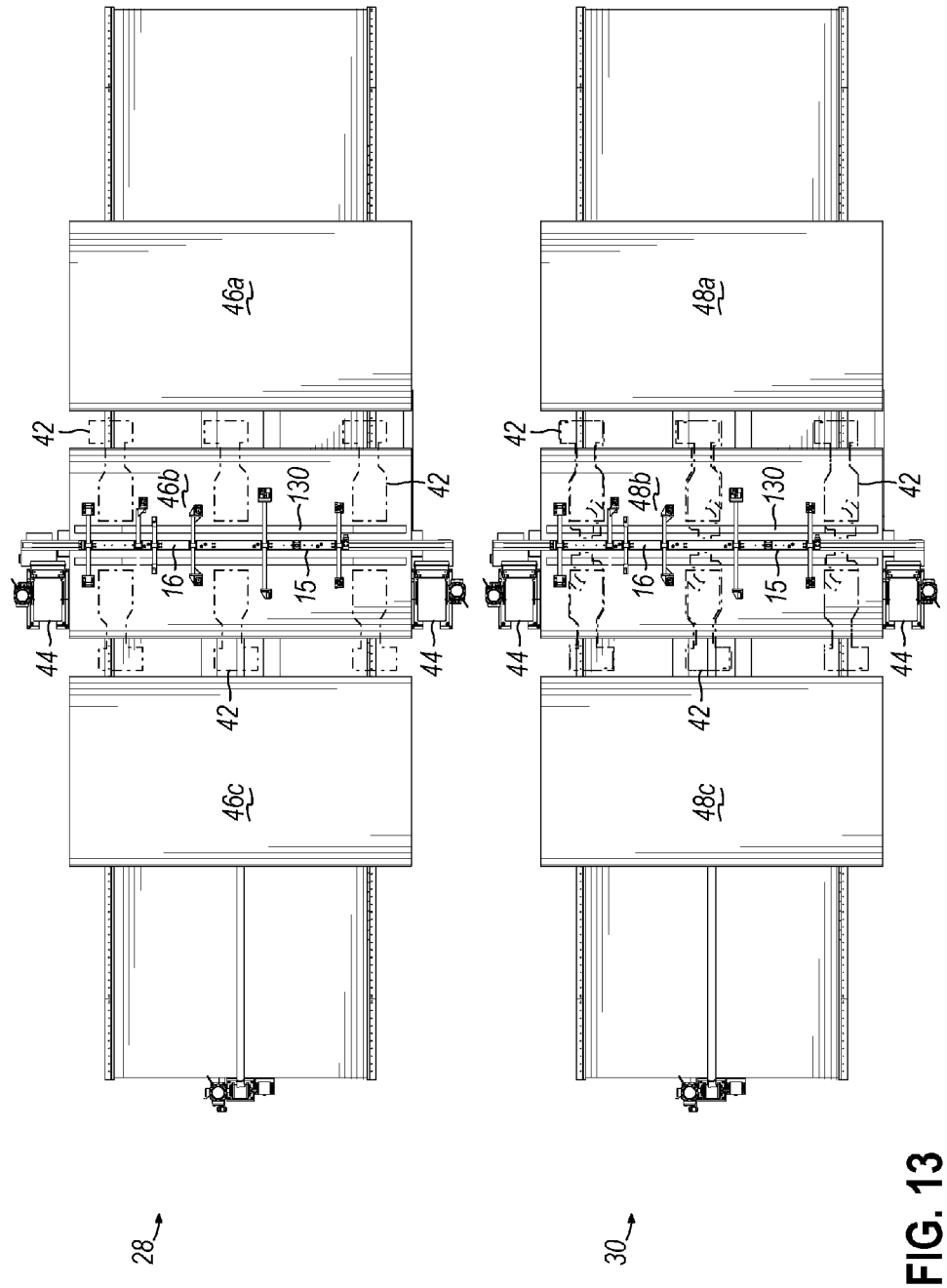
FIG. 13 is a top plan view of exemplary geo-tool stations of in accordance with the principles of the present invention.

FIG. 13 is a plan view of the geo-tool shown in FIG. 12, and further illustrates a re-spot tool 30 and a plurality of robots 42. The geo-tool 28 and re-spot tool 30 are virtually identical in this view, however the two stations 12 are distinguished by their respective functions. As described above, the geo-tool 28 is primarily concerned with orienting the automotive body parts with respect to each other and temporarily securing them with welds. Similarly, the re-spot tool 30 is concerned with providing additional structural welding to complete the assembly of the various components oriented by the geo-tool 28.

Figure 14:
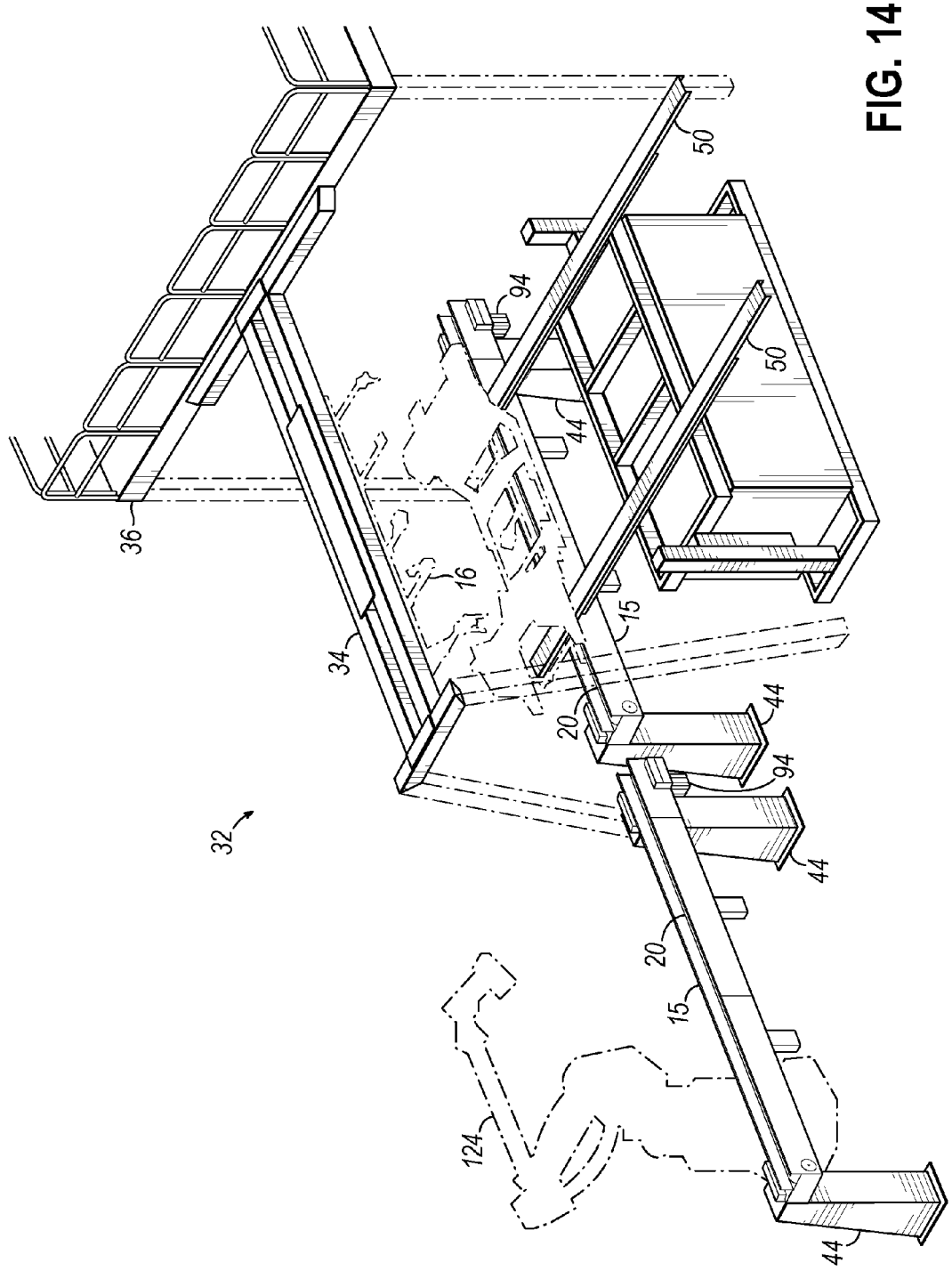
FIG. 14 is a perspective view of an exemplary offload station in accordance with the principles of the present invention.

FIG. 14 depicts an exemplary offload station 32 in accordance with the principles of the invention. Here, the lifting forks 50 have been positioned between the automotive body and the carrier 16. The vertical translation towers 44 will lower the track segment 15 so that the weight of the automotive body components is removed from the carrier 16 and placed upon the transfer forks 50. The transfer forks 50 will then withdraw away from the track segment 15, and the carrier 16 will then be free of automotive body parts. An end transfer robot 124 will remove the carrier 16 from the track segment 15. The end transfer robot 124 (not shown) will then invert the carrier 16 so that the friction rail 80 is facing upward. The carrier 16 will then be coupled to the overhead return track 34, and the carrier 16 will travel from the end of the line 22 back to the beginning of the line 18 using friction rollers, belt drives, or other means known to the art.

Figure 15:
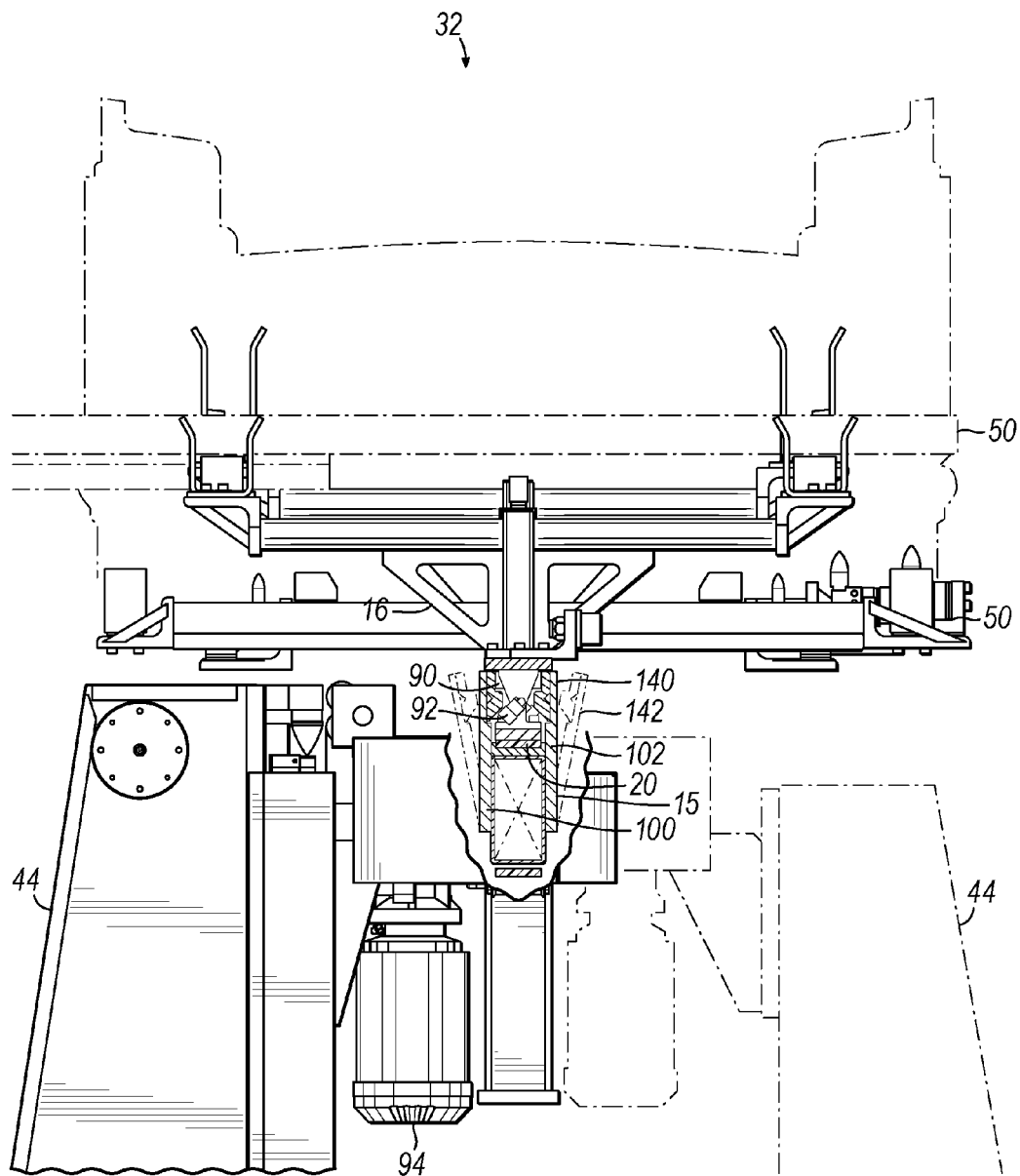
FIG. 15 is an end elevation view the offload station of FIG. 14.

FIG. 15 depicts an end view of the offload station 32. The track segment 15 is shown in two possible configurations. In a first configuration 140, illustrated in solid lines, the track segment 15 engages the carrier 16. In a second configuration 142, illustrated in phantom lines, the track segment 15 is unlocked, or disengaged from, the carrier 16. In this second condition 142, the first rail 100 and second rail 102 have been pivoted away from the carrier 16 by a track manipulator 144 shown in more detail in FIG. 19. In the second condition 142, the parallel rollers 90 and angular rollers 92 are taken out of contact with their corresponding surfaces on the first track 100 and second track 102. This allows the carrier 16 to be freely lifted from the track segment 15 by the lifting forks 50.

This same configuration may be used to couple and decouple the carrier 16 to the overhead return track 34 at the beginning of the line 18 and the end of the line 22. Likewise, this configuration may be used to couple the carrier 16 to the first track segment 15 at the beginning of the line 18.

Figure 16:
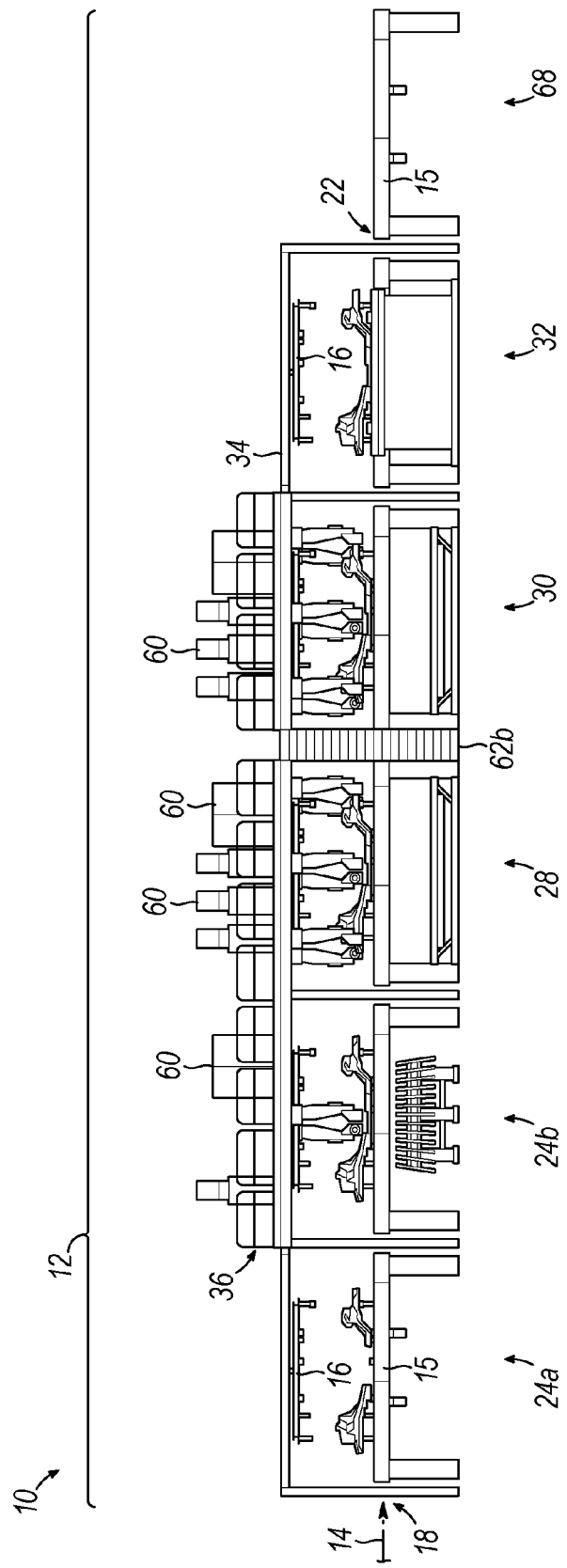
FIG. 16 is a side elevation view of the conveyance system of FIG. 4, illustrating an overhead return track and catwalk.

FIG. 16 depicts a more detailed side elevation view of the conveyance system 10. Starting at the beginning of the line 18 and progressing to the end of the line 22, a pair of component placement stations 24a and 24b are shown. A geo-tool 28, re-spot tool 30, and offload station 32 complete the assembly line. A repair station 68 follows the offload station 32 but is not deemed part of the assembly line itself. A plurality of carriers 16 are shown coupled to the overhead return track 34. The overhead return track 34 is disposed between the track 14 and the catwalk 36, and the stairway 62b provides user access to the catwalk 36. Since the return track 34 does not impinge upon the floor space of the catwalk 36, a user is free to service the various pieces of equipment 60 throughout all areas of the catwalk 36.

Figure 17:
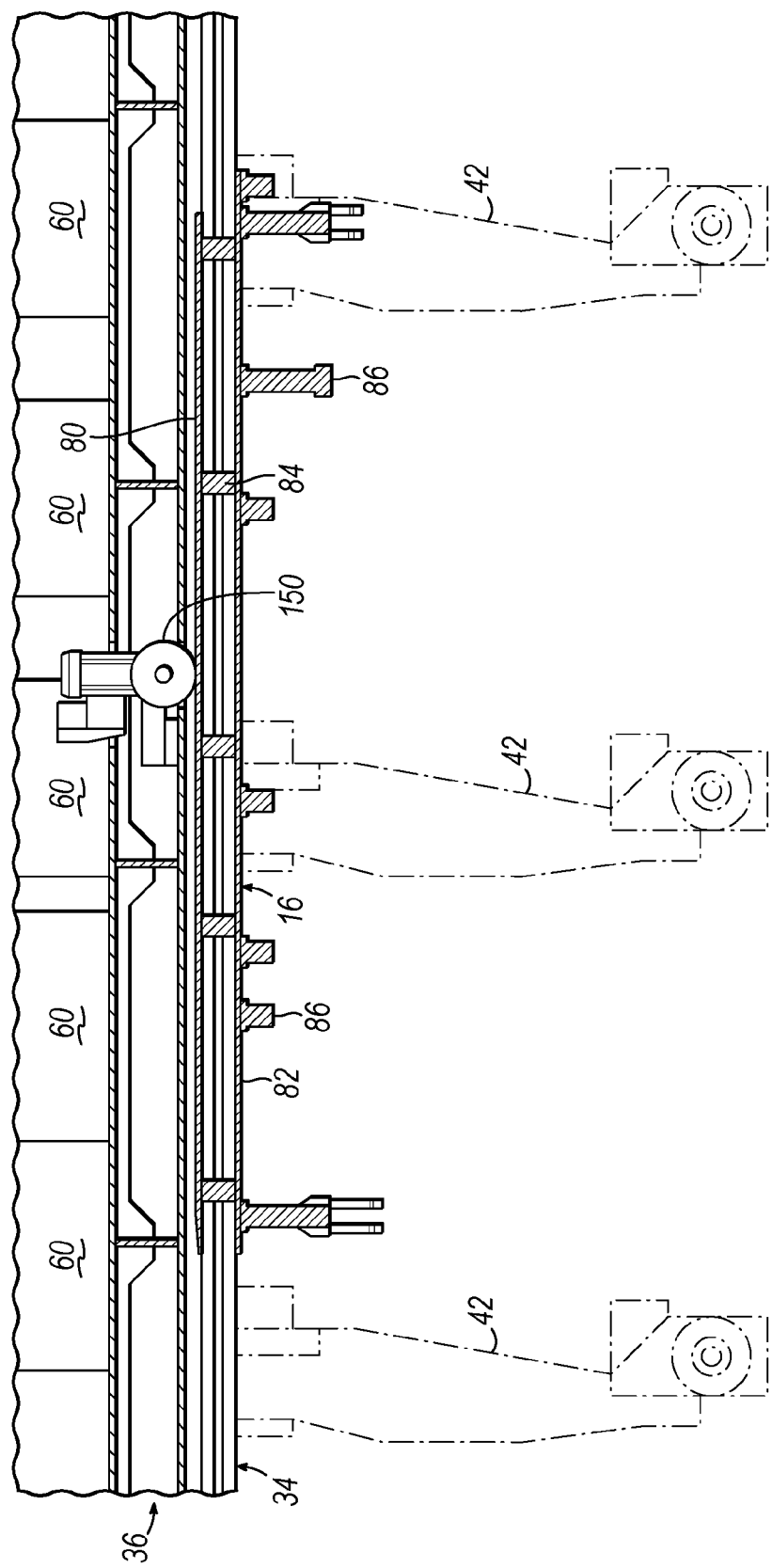
FIG. 17 is enlarged side elevation view of the overhead return track of FIG. 16.

FIG. 17 is a detailed side elevation view of the overhead return track 34. A carrier 16 is coupled with the overhead return track 34 and is astride a plurality of robots 42. The catwalk 36 supports a variety of equipment 60. In one embodiment, a friction roller 150 is in intermittent contact with the friction rail 80 of the carrier 16 and serves to propel the carrier 16 from the end of the line 22 to the beginning of the line 18.

Figure 18:
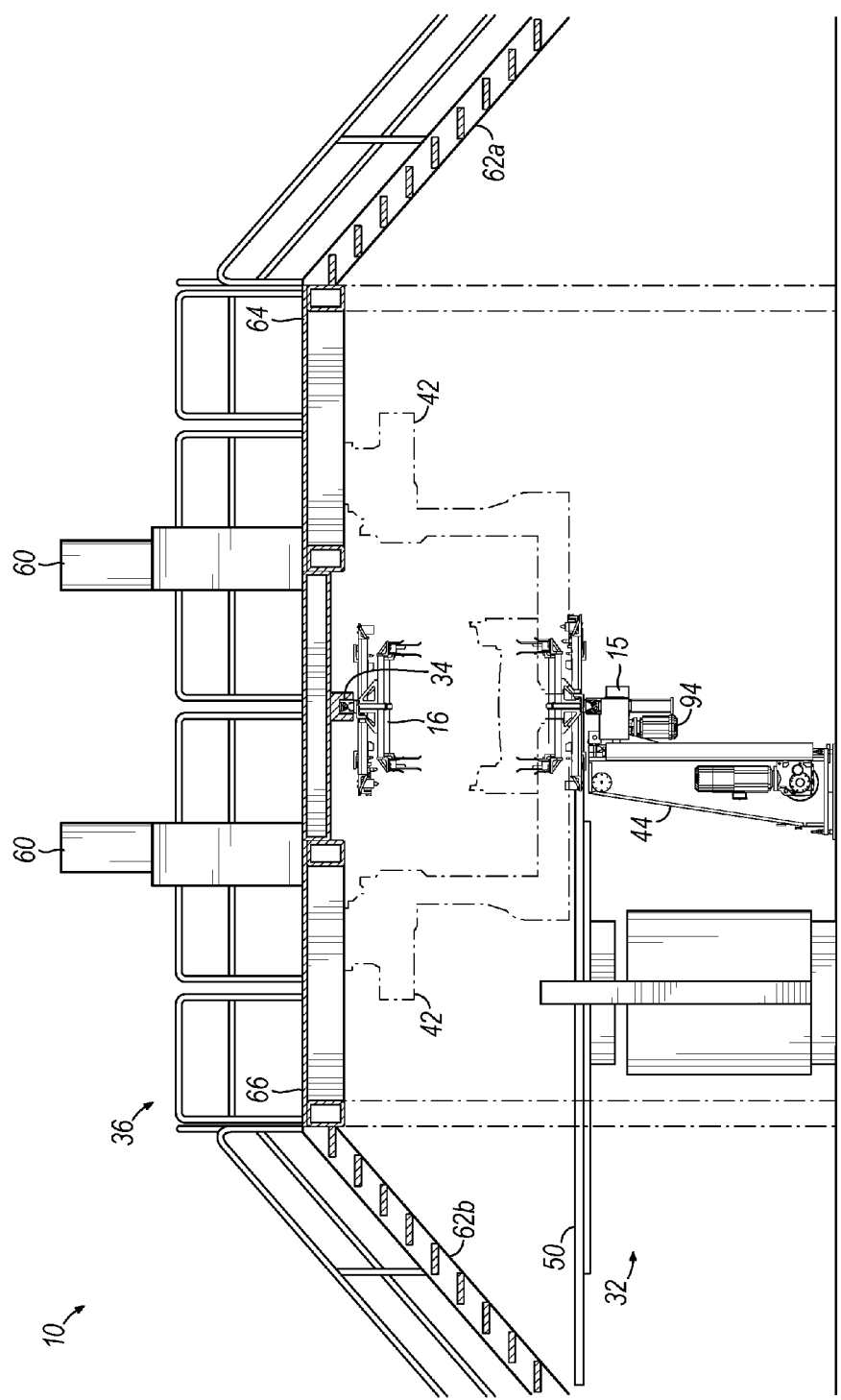
FIG. 18 is a partial cross-sectional elevation view taken along line 18-18 of FIG. 16.

FIG. 18 is an end elevation view of the conveyance system 10 taken along line 18-18 of FIG. 16, looking down the track 14. The overhead return track 34 and mated carrier 16 do not obstruct the catwalk 36 in any way. A worker going up on the left side 64 using the stair 62a is able to freely move about the catwalk 36 and descend the opposing stair 62b on the right side 66.

Figure 19:
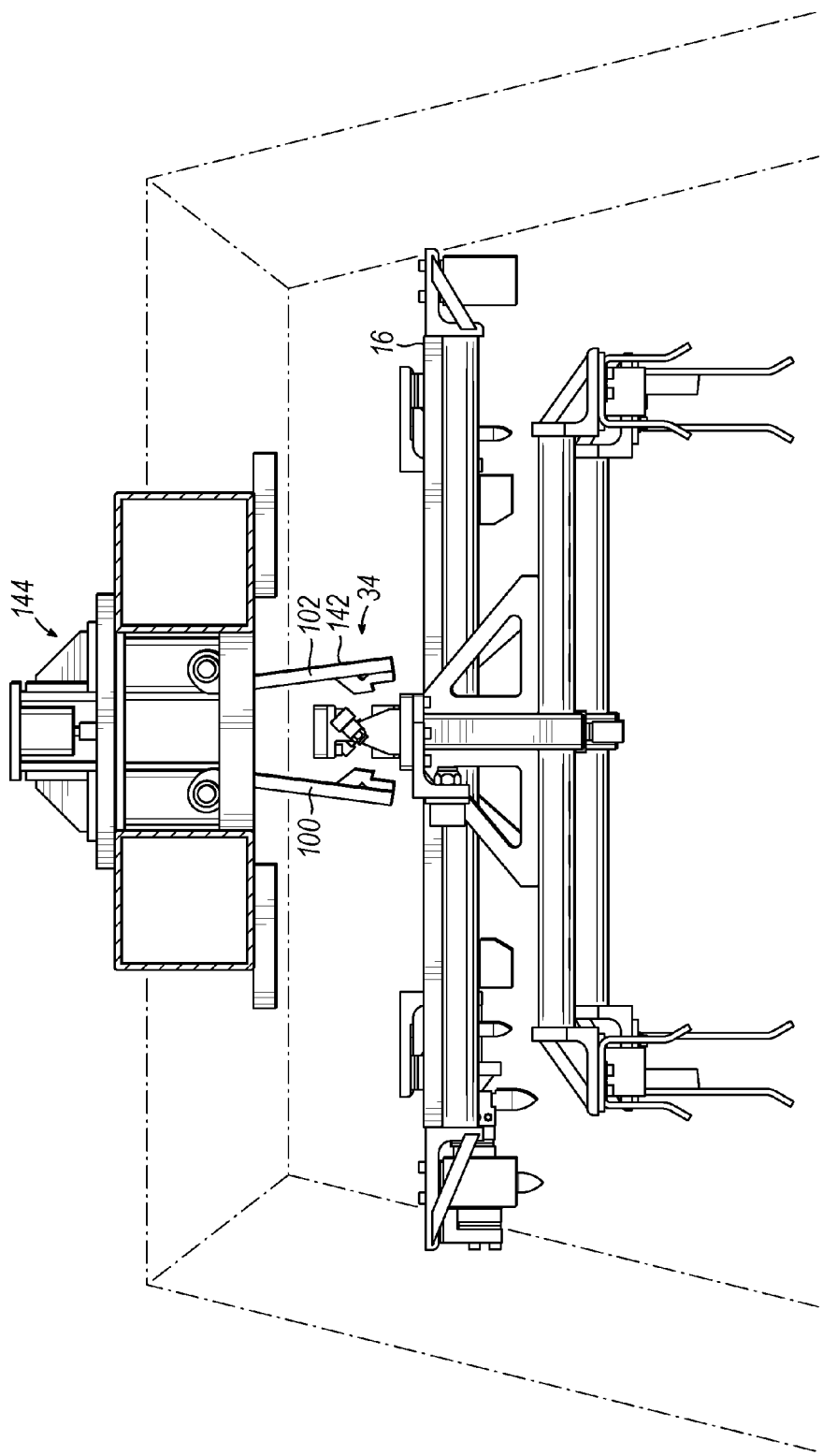
FIG. 19 is enlarged detail view of the return track of FIG. 18.

FIG. 19 is a detail view of the overhead return track 34 and carrier 16. In this view, the overhead return track 34 is shown in the second configuration 142, wherein the first rail 100 and second rail 102 are decoupled from the carrier 16. The track manipulator 144 has been activated to separate the first rail 100 from the second rail 102 and thereby allow the carrier 16 to be decoupled from the overhead return track 34.

Figure 20:
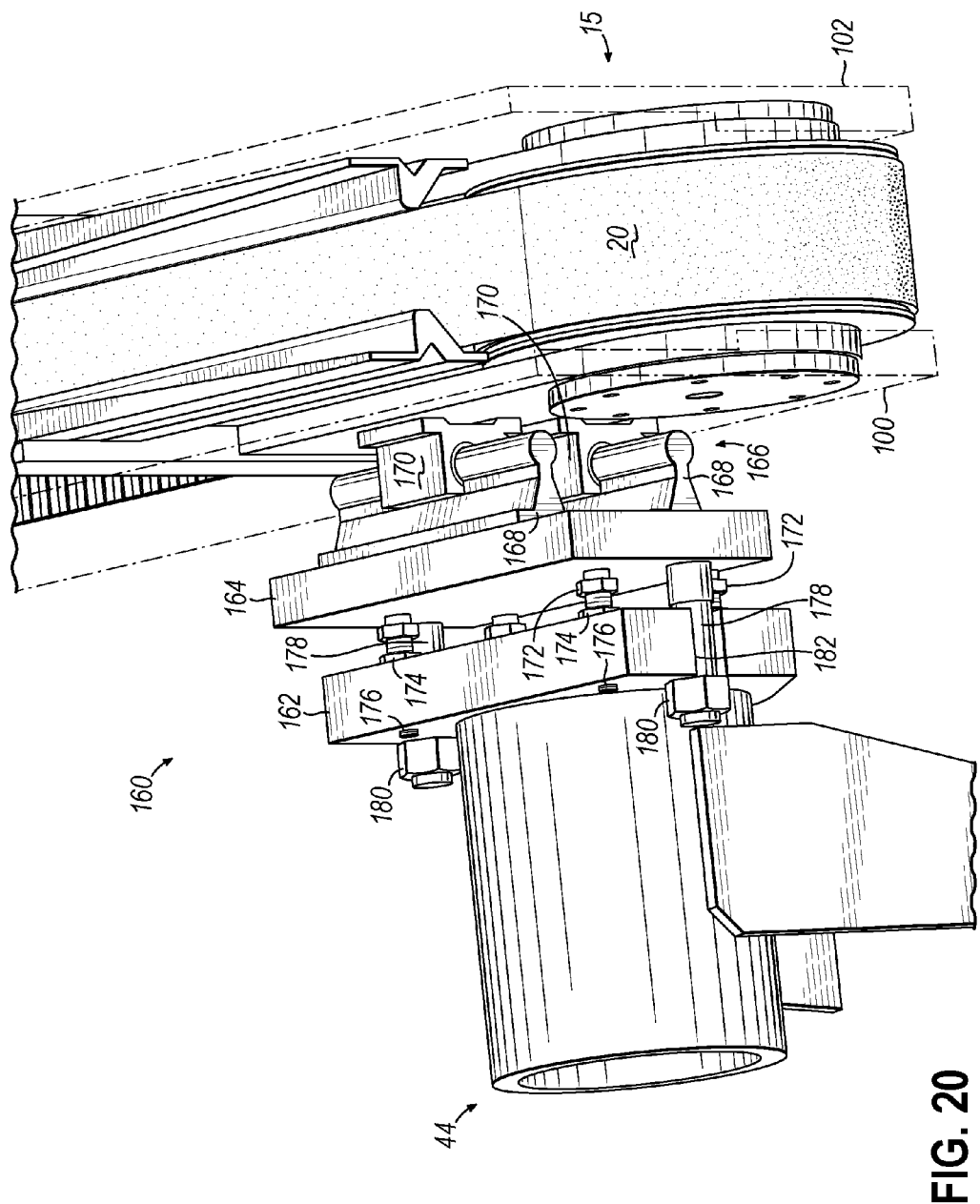
FIG. 20 is a perspective view of an exemplary adjustable mounting assembly in accordance with the principles of the present invention.

FIG. 20 shows a precision adjustable mounting assembly 160 used to join the vertical translation towers 44 to the track segment 15. The system 10 necessitates a high degree of alignment accuracy between track segments 15, and therefore a highly precise and robust method of adjusting the alignment of track segments 15 is required. A first plate 162 is attached to the vertical translation tower 44. Likewise, a second plate 164 is mated to the track segment 15 by a load distribution assembly 166. In one embodiment, the load distribution assembly 166 includes two or more projections 168 and cooperating receivers 170. The interface between the projections 168 and receivers 170 are configured to provide enhanced rigidity to the interface between second plate 164 and the track segment 15. This also aids in preventing twisting of the track segment 15 when under non-symmetric loads created by the carrier 16.

A plurality of jack screws 172 and lock nuts 174 are disposed between the first plate 162 and second plate 164. The jack screws 162 are received in a plurality of threaded holes 176 in the first plate 162. The opposing sides of the jack screws 172 sit in cooperating pockets (not shown) of the second plate 164. Rotating the jack screws in a counterclockwise direction (when configured with right-hand threads) causes the second plate 164 to be driven from the first plate 162 at a location centered about the actuated jack screw 172. By adjusting the plurality of jack screws 172, pitch, yaw, and roll of the track segment 15 may be adjusted. A plurality of load pins 178 bear most of the weight applied to the precision adjustable mounting assembly 160. Once the plurality of jack screws 172 are adjusted to appropriate position, the lock nuts 174 are tightened to secure the orientation of the jack screws 172. Additionally, a plurality of load pin nuts 180 are tightened to keep the first plate 162 and second plate 164 pulled in a fixed relationship with each other, and the keep the jack screws 172 seated within the pockets (not shown). To provide an enhanced degree of articulation, the load pins 178 are disposed in load pin bores 182 that are dimensioned slightly larger than the load pins 178. This allows the second plate 164 to roll, pitch, and yaw along with its cooperating track segment 15 during adjustment.

Figure 21:
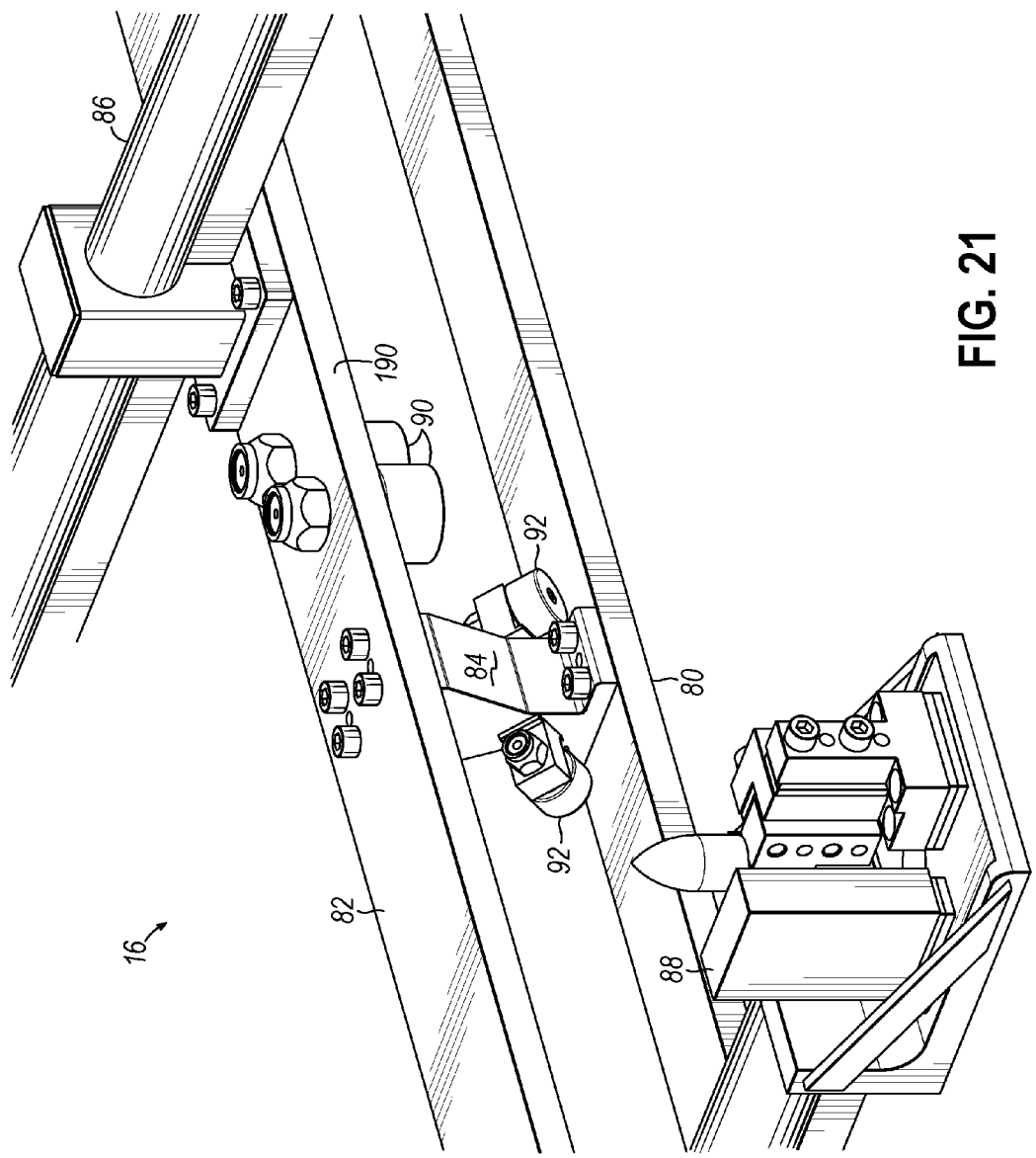
FIG. 21 is a perspective view of an exemplary carrier including a data matrix strip in accordance with the principles of the present invention.

FIG. 21 depicts an optional additional feature of the conveyance system 10 that provides additional motion control of the carrier 16 as it progresses through the track segments 15. In this embodiment, a data matrix 190 may be affixed to a side of the mounting rail 82. The data matrix 190 contains unique two-dimensional indicia capable of uniquely identifying each carrier 16 and its relative position throughout the system 10. Since each belt segment 20 of the system 10 is individually drive by its respective belt motor 94, each carrier 16 may be independently moved, stopped, accelerated, decelerated, reversed, positioned, etc. throughout the system 10. The data matrix 190, along with at least one cooperating camera reader (not shown) provides the system 10 with enhanced quality control tracking, diagnostic features, and speed of throughput. Instead of relying on limit switches, to include stop switches and slow switches, the data matrix 190 allows the system 110 to readjust a particular carrier 16 even while adjacent carriers 16 are stationary. A carrier 16 may be rapidly progressed through idle or vacant stations 12 by use of the data matrix 190 in conjunction with independently controlled belt motors 94. In addition to the enhanced motion control, increased productivity, quality control, and trouble-shooting is accomplished by uniquely identifying each carrier 16 as it progresses through the system 10. The system 10 using the data matrix 190 can uniquely identify and track a defective carrier 16 or carrier 16 that otherwise causes stoppages in the manufacturing process or yields defective finished products.

Figure 22:
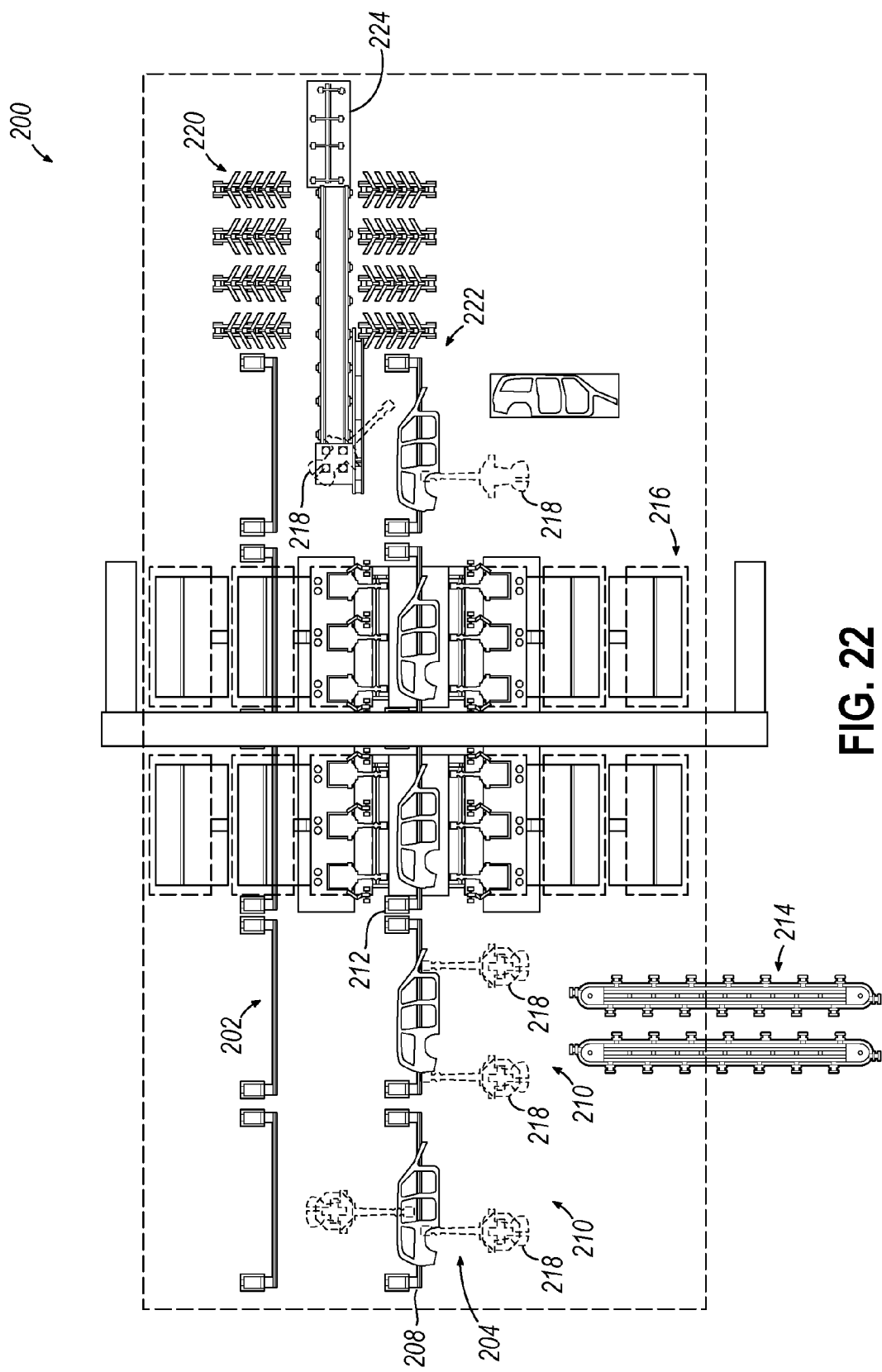
FIG. 22 is a schematic top plan view of an assembly line including another exemplary conveyance system in accordance with the principles of the present invention.

Referring now to FIGS. 22-26, another exemplary embodiment of a flexible conveyance system 200 in accordance with the principles of the present invention will be described. The conveyance system 200 of this embodiment is similar in many aspects to the conveyance system 10 described above with respect to FIGS. 1-21. Accordingly, only the differences between the systems will be described further below. FIG. 22 depicts a schematic illustration of a conveyance system 200 similar to the conveyance system 10 discussed above with respect to FIG. 3. However, instead of an overhead return line, the conveyance system 200 includes an optional return line 202 that is spaced laterally from the feed-forward line 204 and, in this embodiment, extends generally parallel to a feed-forward line 204 to return carriers 206 toward the beginning 208 of the feed-forward line 204. Various other aspects of the conveyance system 200 are similar to the conveyance system 10 described above, including the various stations 210 for loading and unloading components to a carrier 206, vertical translation towers 212 for raising and lowering carriers 206 relative to the assembly line, component feed conveyors 214, geo tool trays 216, and robotic manipulators 218 for performing assembly operations.

As illustrated in FIG. 22, a storage area 220 may be provided adjacent the offload station 222 at the end of the feed-forward line 204, for storing carriers 206 that have been removed from the feed-forward line 204 by a robot. A repair station 224 may also be provided adjacent the storage area 220, for repairing or adjusting carriers 206 as generally described above.

Figure 23:
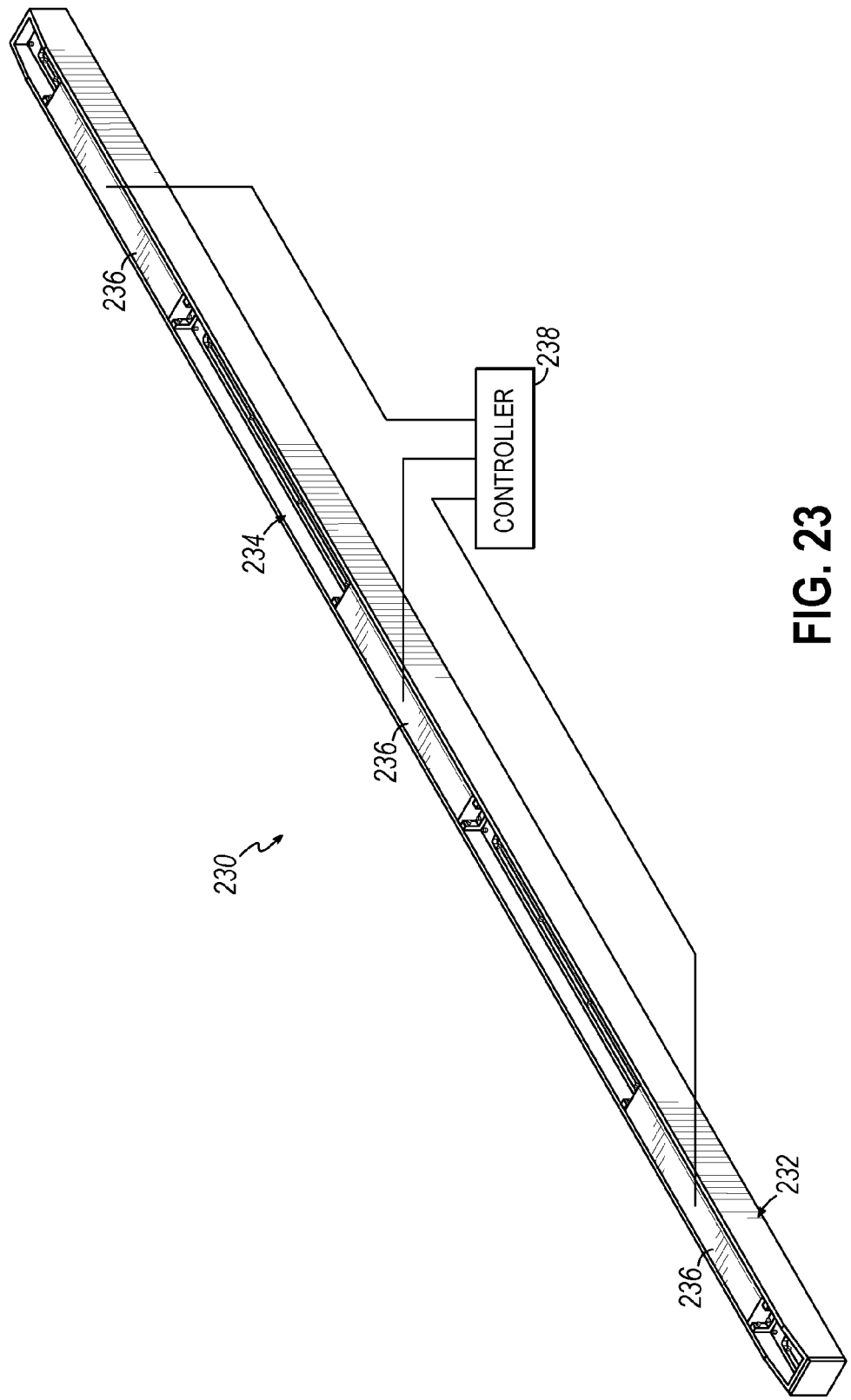
FIG. 23 is a perspective view of an exemplary track segment of the conveyance system of FIG. 22.

FIG. 23 depicts an exemplary track segment 230 used in both the feed-forward and return lines 202, 204. The track segment 230 includes an elongate track housing 232 having an open upper side defining an upwardly facing channel 234 that extends lengthwise along the track segment 230. At least one linear motor 236 is disposed within the channel 234 of each track segment 230 to control the movement of carriers 206 along the track segments 230. In the embodiment shown, three linear motors 236 are disposed in the channel 234 of the track segment 230. It will be appreciated, however, that each track segment 230 may alternatively include only a single linear motor 236, or various other numbers of linear motors 236 disposed in the channel 234 as may be desired. An exemplary linear motor 236 that may be used in the track segments 230 is the Quickstick HT2 available from MagneMotion, Inc., of Devens, Mass.

A controller 238 in communication with each linear motor 236 controls the operation of each linear motor 236 to move carriers 206 along the track segments 230 with high precision and independently of other carriers 206 supported on the plurality of track segments 230. While a single controller 238 is illustrated in communication with the linear motors 236, it will be appreciated that each linear motor 236 may alternatively be in communication with a dedicated controller that controls operation of that particular linear motor 236, in cooperation with other features of the conveyance system 200.

Figure 24:
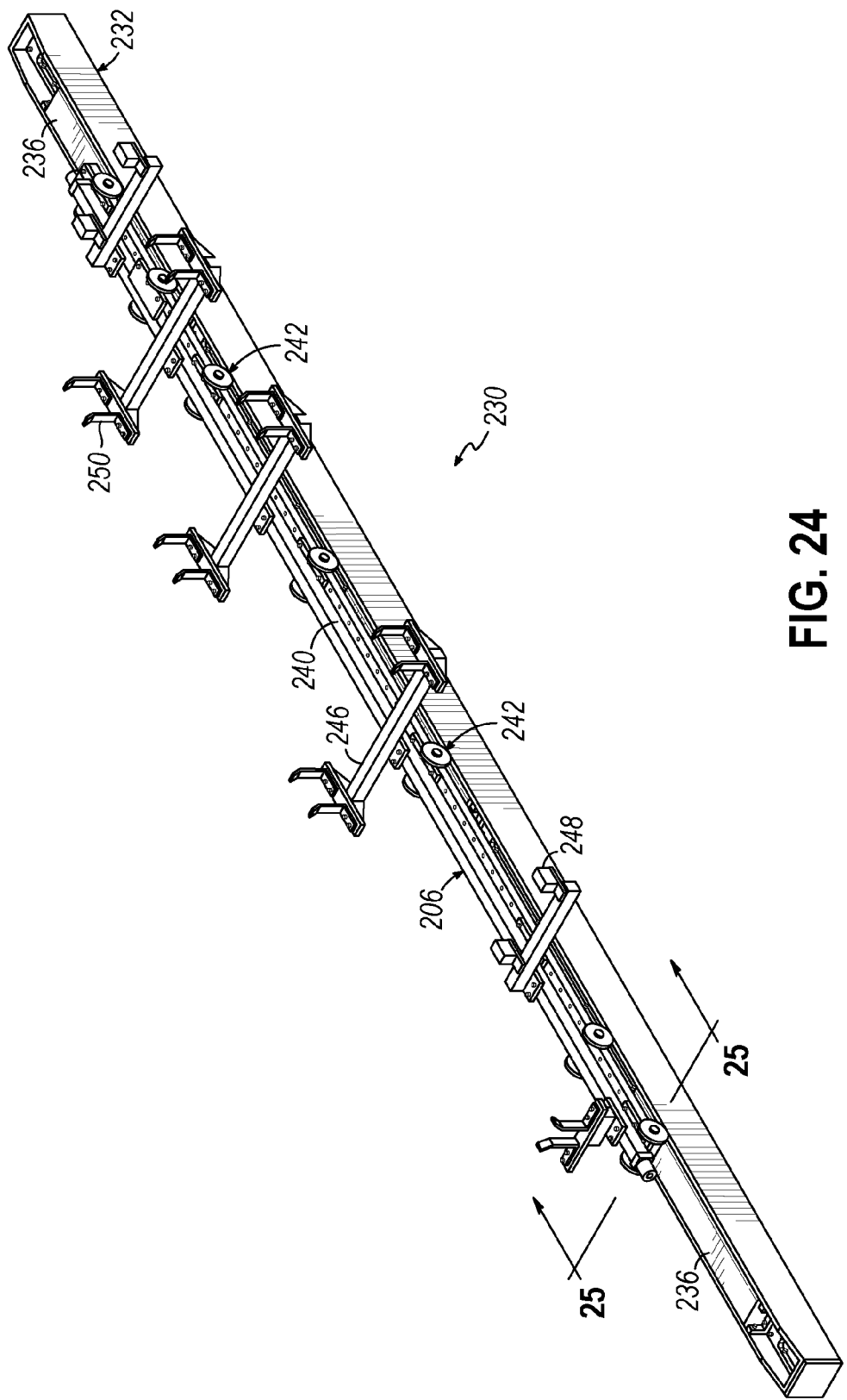
FIG. 24 is a perspective view of the track segment of FIG. 23, illustrating another exemplary carrier coupled with the track segment.
Figure 25:
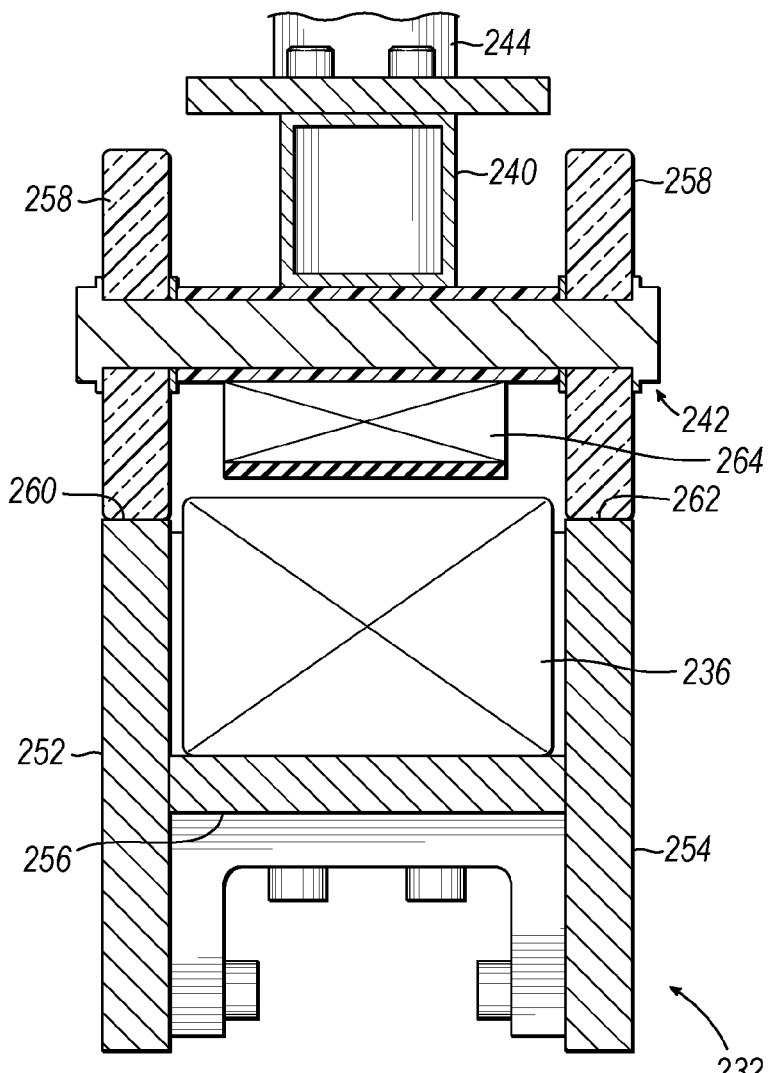
FIG. 25 is a partial cross-sectional view of the track segment and carrier of FIG. 24.

FIGS. 24 and 25 depict an exemplary carrier 206 in accordance with this embodiment, supported on a track segment 230. In this embodiment, the carrier 206 comprises an elongate mounting rail 240 to which a plurality of wheel assemblies 242 are coupled. A plurality of risers 244 are secured to an upper surface of the mounting rail 240, in a manner generally similar to the carriers 206 described above with respect to FIGS. 1-21. The risers 244 are in turn coupled with transverse supports 246 having load bearing surfaces 248 and appropriate fixtures 250 for supporting assembly components thereon. As seen in FIG. 25, the track housing 232 comprises first and second oppositely deposed sidewalls 252, 254 and a bottom wall 256, defining the channel 234 of the track housing 232. The wheel assemblies 242 of the carrier 206 are configured so that the wheels 258 engage the upper surfaces 260, 262 of the first and second sidewalls 252, 254 to provide rolling movement of the carrier 206 along the track segment 230. At least one permanent magnet 264 is secured to a lower surface of the mounting rail 240, generally opposite the risers 244. The permanent magnets 264 are supported on the mounting rails 240 of the carriers 206 at a fixed spacing from the linear motors 236.

Figure 26:
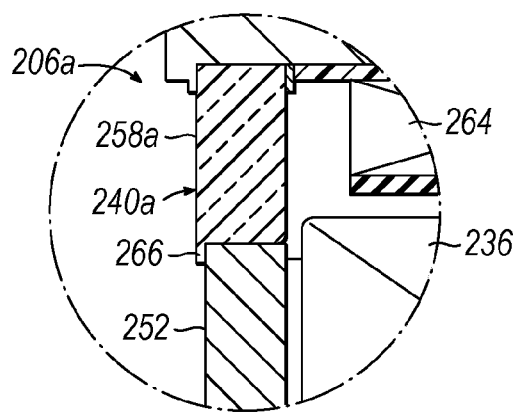
FIG. 26 is a detailed view of another embodiment of a carrier in accordance with the principles of the present invention and configured for use with the track segment of FIGS. 25 and 25.

FIG. 26 depicts another exemplary embodiment of a carrier 206a that can be used with the track segment 230 described with respect to FIGS. 24-25. In this embodiment, the wheels 258a of the wheel assemblies 240a include a radially outwardly extending circumferential lip 266 that cooperates with the sidewalls 252, 254 of the track housing 232 to facilitate alignment of the carrier 206a on the track segments 230.

In use, the linear motors 236 are actuated to create magnetic fields that cooperate with the permanent magnet 264 on the carrier 206 to provide the motive force for moving the carriers 206 along the plurality of track segments 230 and to precisely position the carriers 206 at desired locations along the track segments 230. Advantageously, the conveyance system 200 described herein provides a fast and efficient method for transferring assembly components along an assembly line, with real-time control of each carrier 206 independently of other carriers 206 moving along the assembly line. Moreover, the linear motors 236 cooperate with the permanent magnets to provide a significant hold down force that aids in the stability of the carriers 206 supported on the track segments 230. As the carriers 206 are moved along the track segments 230 of the feed-forward line 204, parts may be added and assembly operations may be performed at various stations 210 generally as described above with respect to the conveyance system 10 of FIGS. 1-21. While vertical translation towers 212 may be used to locate assembly components supported on the carriers 206 in a geo tool tray 216 as described above, the linear motors 236 provide such precise positioning of the carriers 206 on the track segments 230 that the use of vertical translation towers 212 to lower the components into a tool tray 216 may not be required.

At the end of the feed-forward line 204, completed assemblies may be removed from the carriers 206 by one or more robots 218. The unloaded carriers 206 may then be removed from the track segments 230 and placed into the storage area 220, sent to the repair station 224, or moved to the return line 202 to be transferred back toward the beginning 208 of the feed-forward line 204. In this embodiment, the return track segments 230 are similar in construction to the feed-forward track segments 230 discussed above with respect to FIGS. 23-26. The storage area facilitates adding and removing carriers 206 from the feed-forward line 204 and the return line 202 in various orders as nay be desired, so that carriers 206 may be provided to the beginning 208 of the feed-forward line 204 to accommodate changes in assembly requirements.

Figure 27:
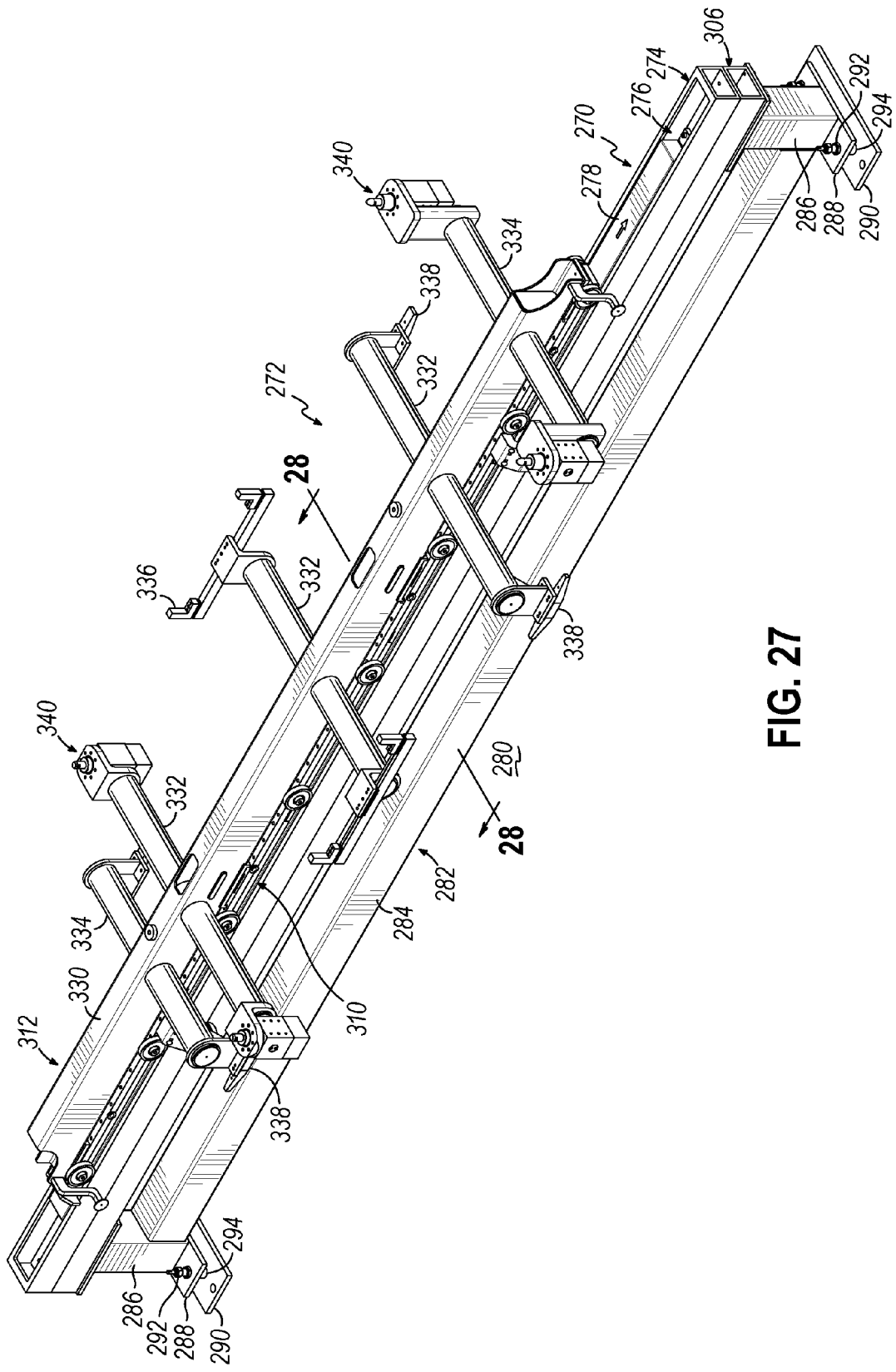
FIG. 27 is a perspective view of another exemplary track segment of the conveyance system of FIG. 22, illustrating another exemplary carrier coupled with the track segment.

FIG. 27 depicts another exemplary track segment 270 and another exemplary carrier 272, similar to the track segment 230 and carrier 206 discussed above with respect to FIGS. 22-26, and which can be used with the exemplary conveyance system 200 discussed above. Because the track segment 270 and carrier 272 of this embodiment are similar in many aspects to the track segment and carrier discussed above with respect to FIGS. 22-26, only the differences between the systems will be described in detail below. With continued reference to FIG. 27, and referring further to FIG. 27A, the exemplary track segment 270 includes an elongate track housing 274 having an upper side with at least one opening defining an upwardly facing channel 276 that extends lengthwise along the track segment 270. At least one linear motor 278 is disposed within the channel 276 of the track segment 270 to control the movement of carriers 272 along the track segments 270.

In the embodiment shown, the entire upper side of the track housing 274 is open to define a channel 276 that extends substantially the length of the track housing 274. It will be appreciated that the track housing mat alternatively have two or more distinct openings defining respective channels 276 for receiving the linear motors 278. In the embodiment shown, three linear motors 278 are disposed within the channel 276 of the track segment 270, however, it will be appreciated that each track segment 270 may alternatively include only a single linear motor 278, or various other numbers of linear motors 278 as may be desired.

Figure 27A:
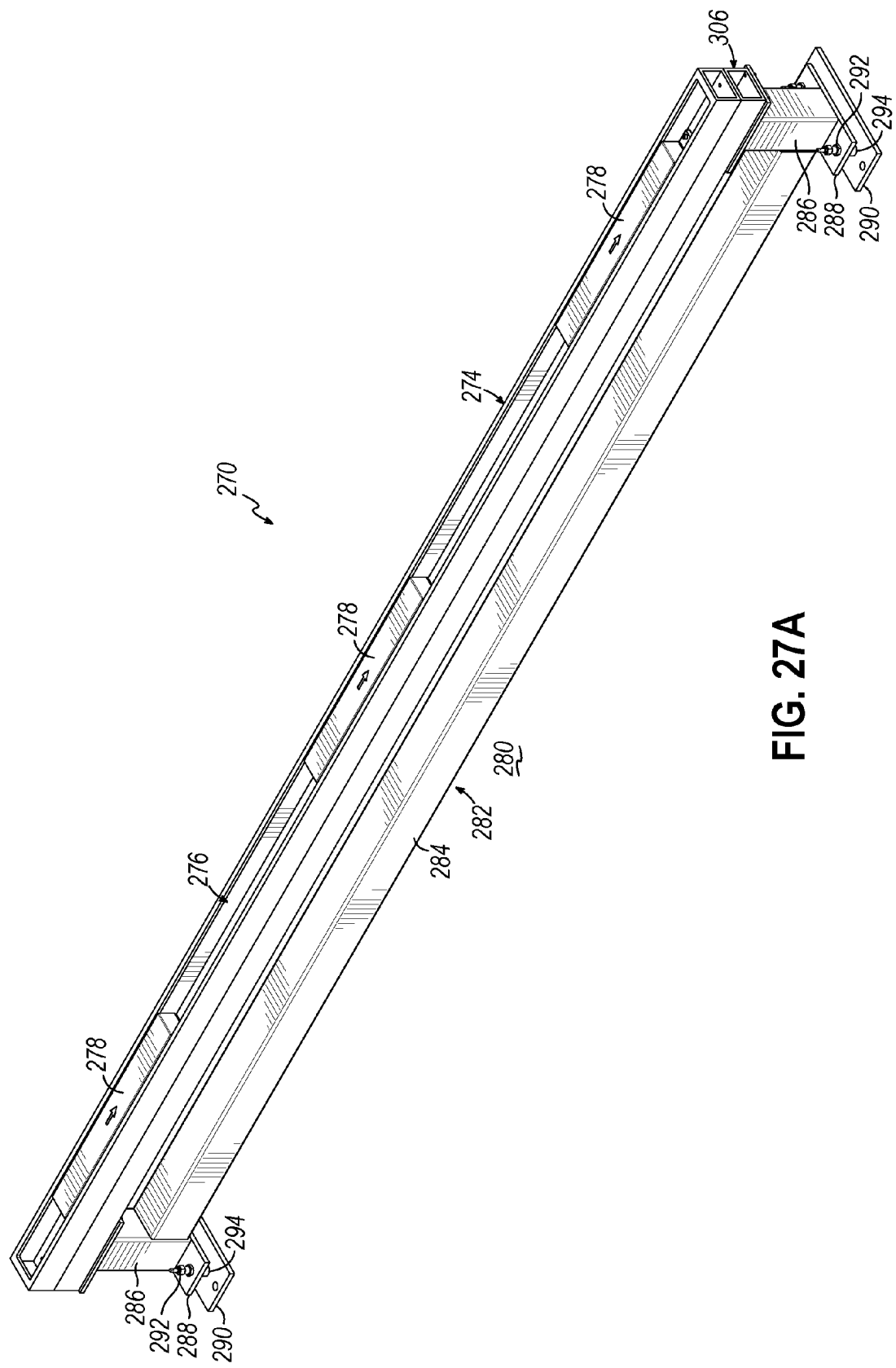
FIG. 27A is a perspective view of the exemplary track segment of FIG. 27.
Figure 27B:
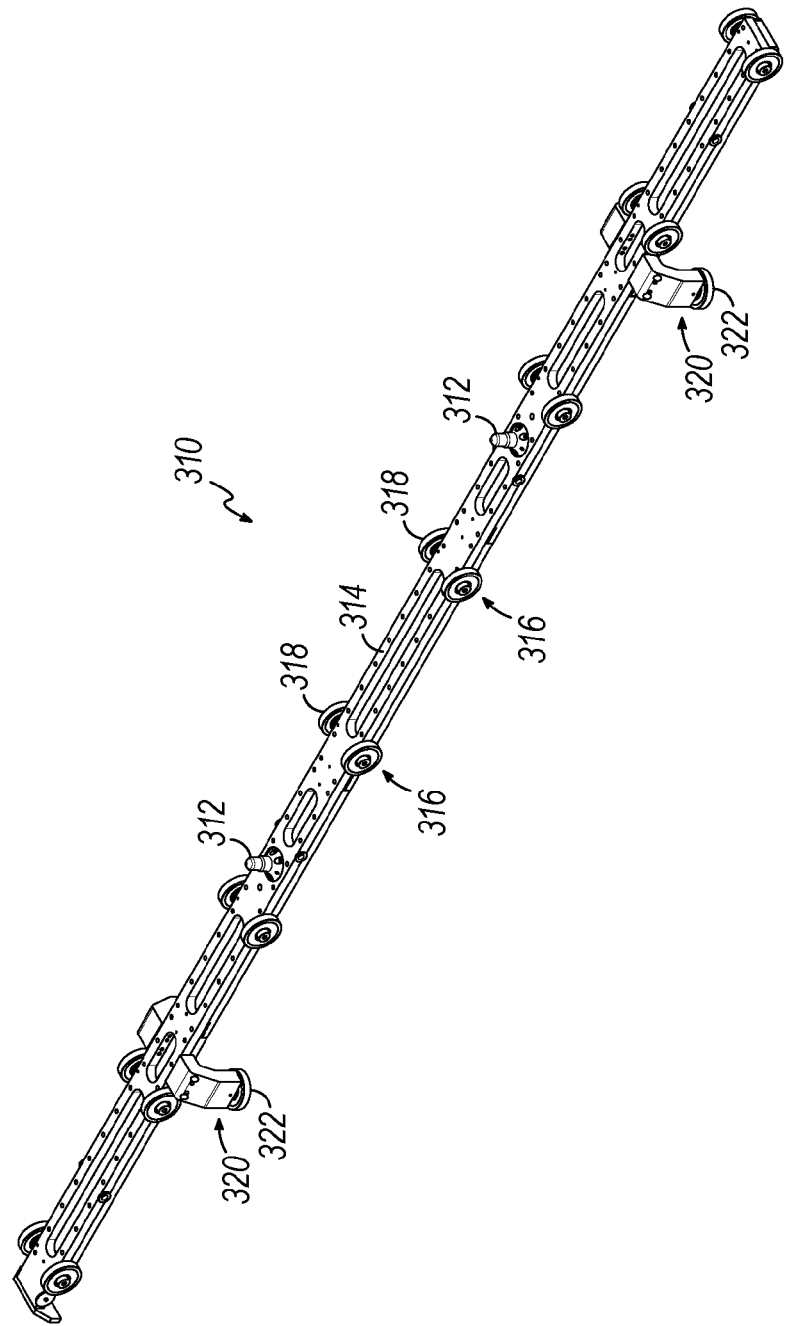
FIG. 27B is a perspective view of a first carrier portion of the exemplary carrier of FIG. 27.
Figure 28:
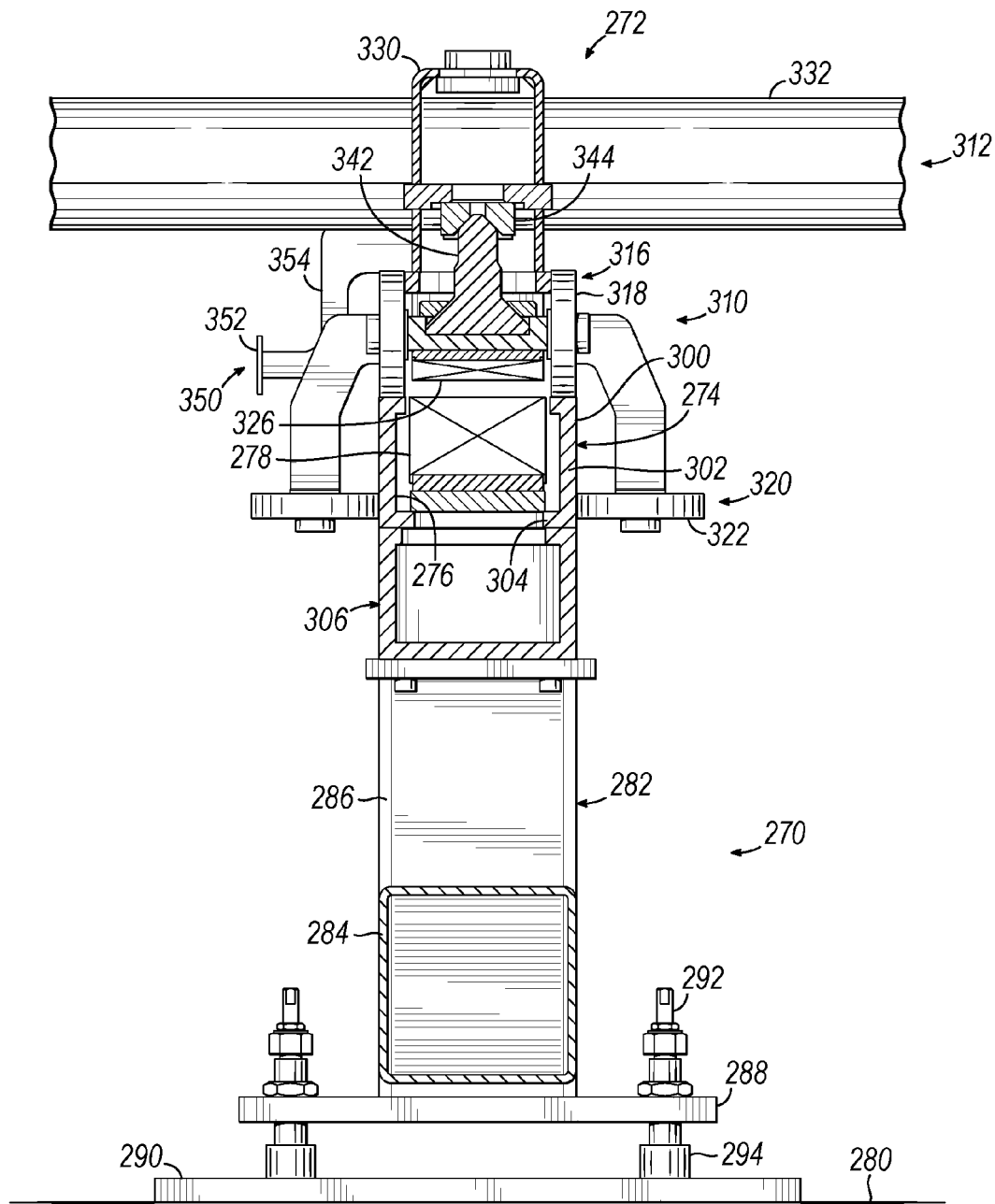
FIG. 28 is a partial cross-sectional view of the track segment and carrier of FIG. 27, taken along line 28-28.
Figure 29:
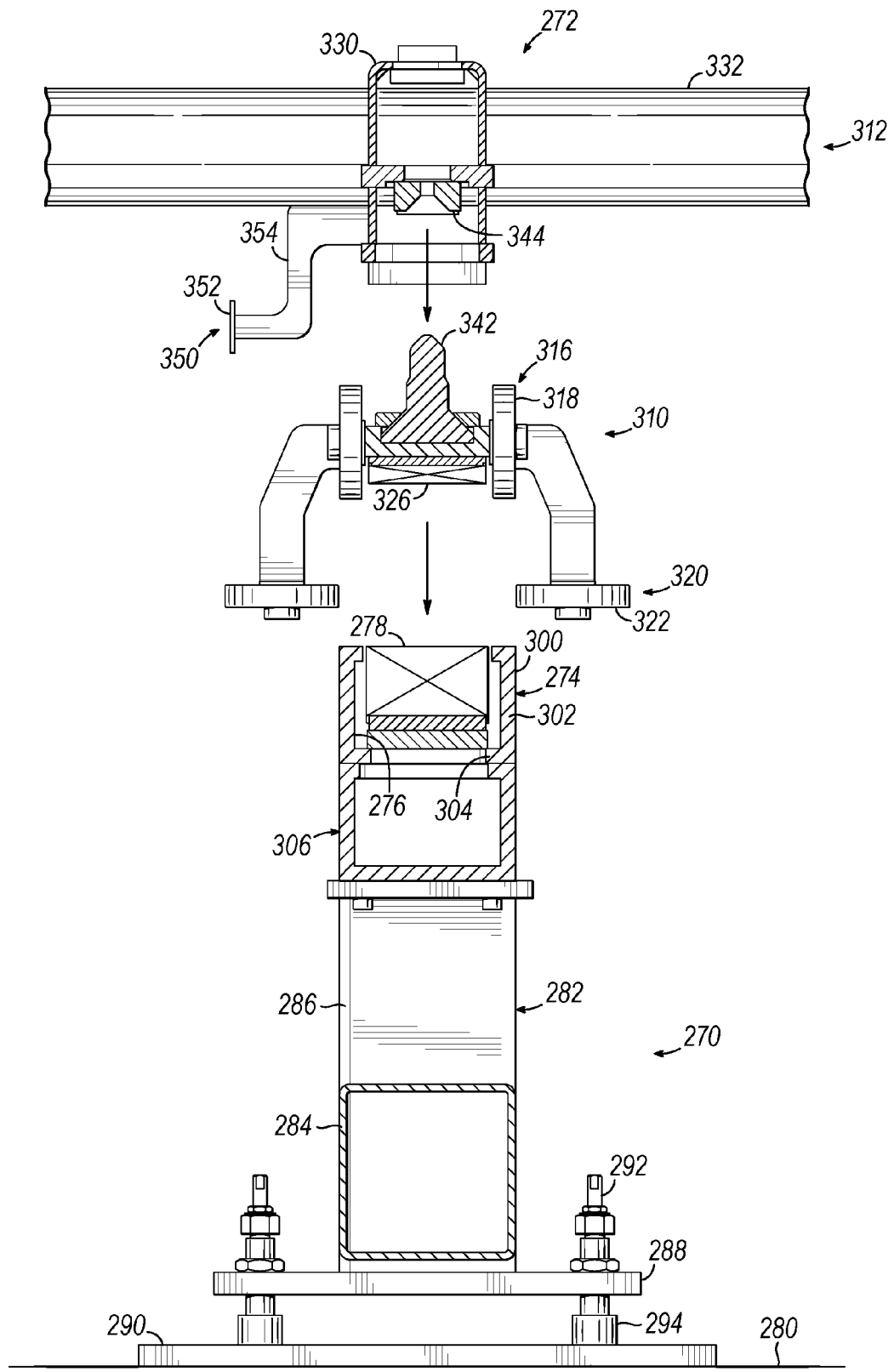
FIG. 29 is an exploded view of the cross-section illustrated in FIG. 28.
Figure 30:
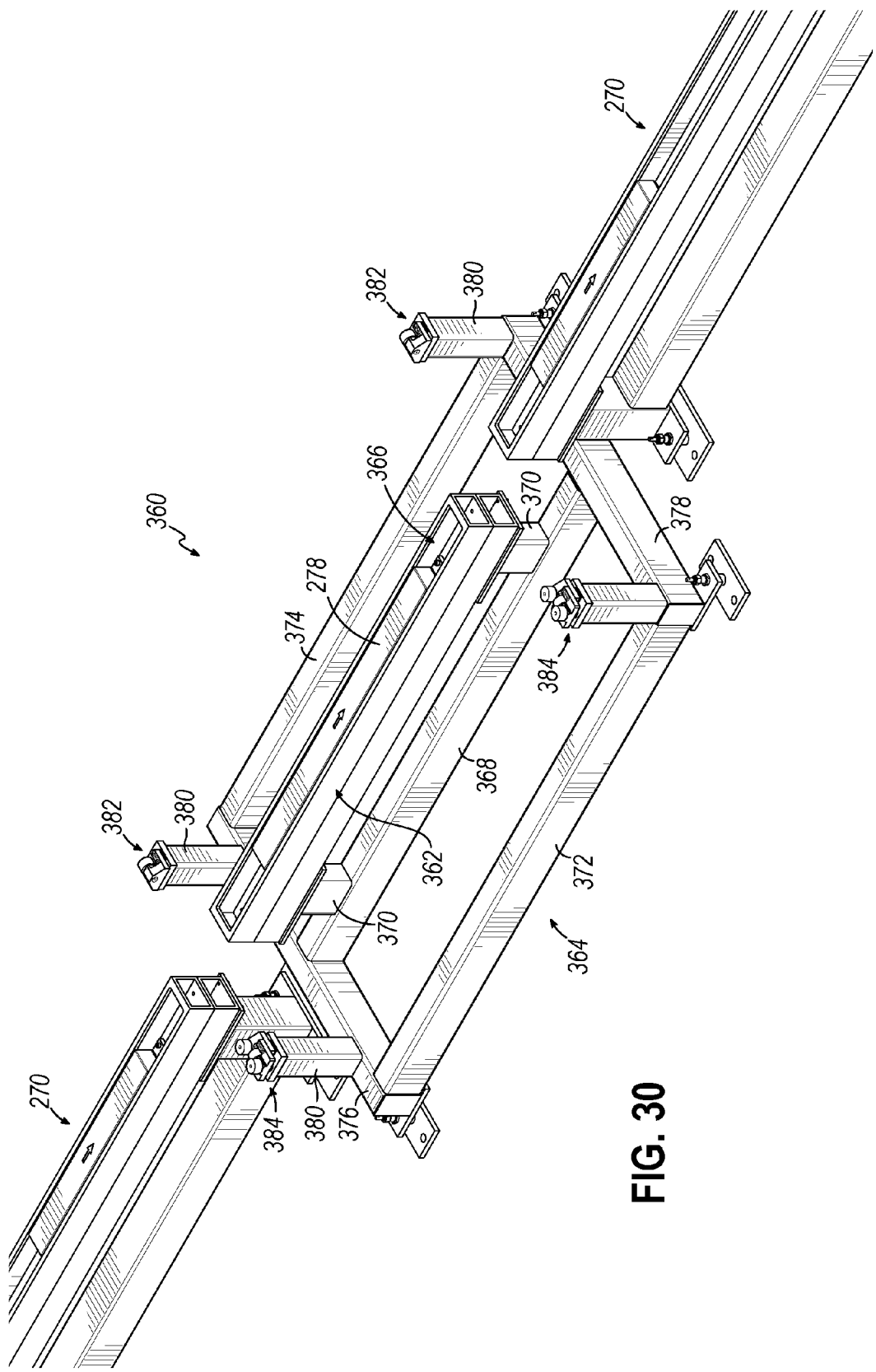
FIG. 30 is a perspective view of an exemplary workstation of a flexible conveyance system in accordance with the principles of the present disclosure.

With continued reference to FIG. 27A, and referring further to FIGS. 28 and 29, the exemplary track segment 270 is supported above a ground surface 280 by support frame 282 including a longitudinal support member 284 and spaced apart vertical support members 286, such that the track segment 270 is elevated above the ground surface 280. Flanges 288 may be provided at the vertical support members 286 to facilitate securing the support frame 282 to a floor plate 290 or, alternatively, directly to the ground surface 280, using appropriate fasteners 292. In the embodiment illustrated in FIGS. 28 and 29, the flanges 288 may be spaced from the ground surface 280 or the floor plate 290 by spacers 294 disposed between the flanges 288 and the ground surface 280 or floor plate 290.

As seen in FIGS. 28 and 29, the track housing 274 comprises first and second oppositely disposed sidewalls 300, 302 and a bottom wall 304, defining the channel 276 of the track housing 274. Advantageously, the track housing 274 may be formed from standard size beam sections, such as extruded beam sections, for example. As depicted in FIGS. 28 and 29, additional beam sections 306 may be coupled together and secured to the support frame 282 to locate the track housing 274 a desired height above the ground surface 280.

Figure 27C:
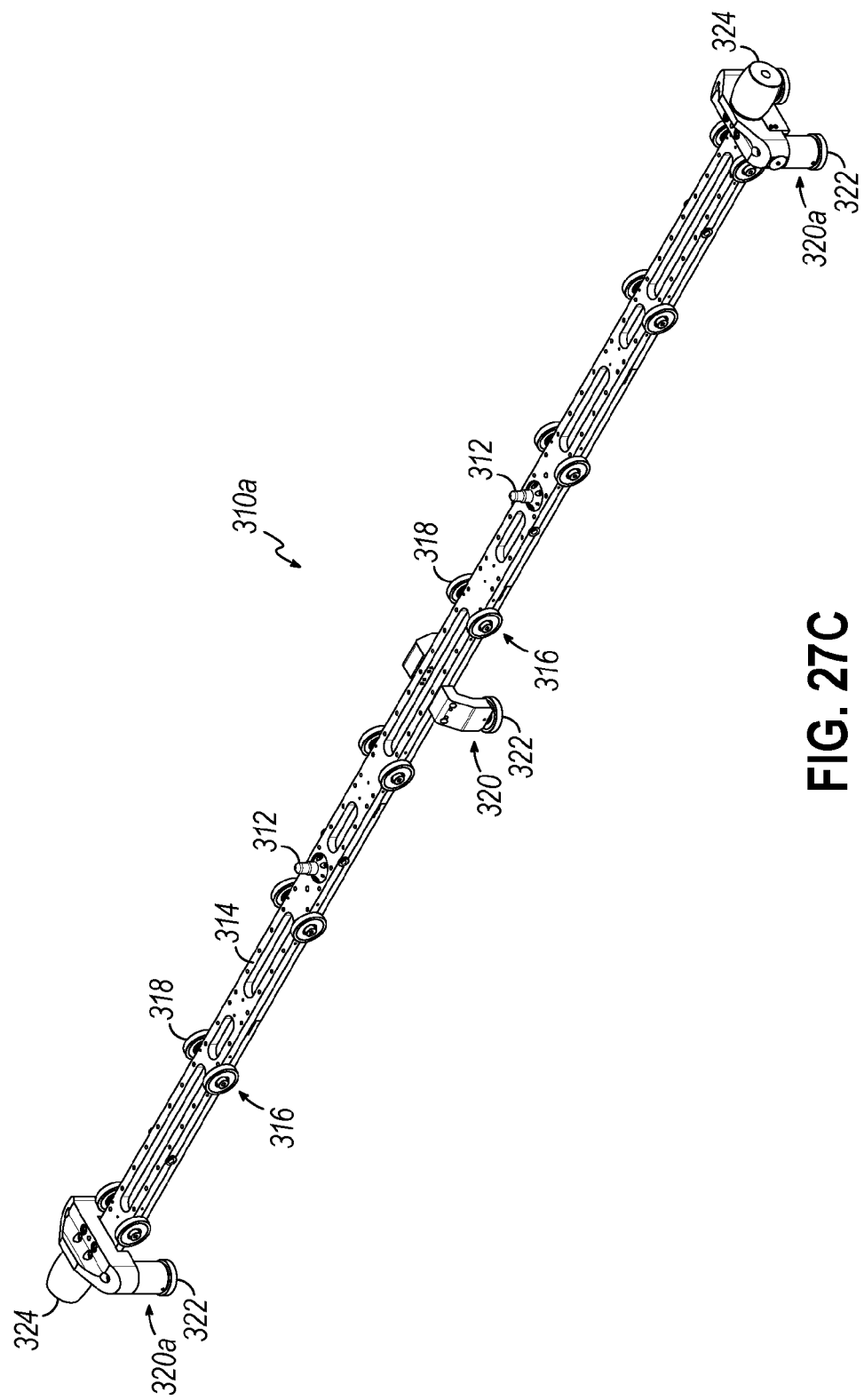
FIG. 27C is a perspective view of another exemplary first carrier portion, similar to the first carrier portion of FIG. 27B.

Referring now to FIGS. 27, 27B, 28, and 29, the exemplary carrier 272 of this embodiment comprises a first carrier portion 310 and a second carrier portion 312 that can be received on the track segments 270 for movement along the conveyance system 200. In the embodiment shown, the first carrier portion 310 comprises an elongate carriage 314 having a plurality of wheel assemblies for supporting the carriage 314 for rolling movement along the track segments 270. A plurality of first wheel assemblies 316 are configured such that the wheels 318 engage the upper surfaces of the first and second sidewalls 300, 302 of the track housing 374 to provide rolling movement of the carriage 314 along the track segment 270. In the embodiment shown, the carriage 314 further includes second wheel assemblies 320 having wheels 322 disposed on opposite sides of the track housing 274 and engaging the sidewalls 300, 302 of the track housing 274 to maintain stability of the carrier 272 supported thereon. FIG. 27C illustrates another embodiment of an exemplary first carrier portion 310a having a different arrangement of first and second wheel assemblies 316, 320, 320a, and further including bumpers 324 at the distal ends of the carriage. In each embodiment, the first carrier portion 310 further includes at least one magnet 326 disposed on a lower surface of the carriage 314 such that when the first carrier portion 310 is received on a track segment 270, the magnet 326 is supported at a fixed spacing from the linear motors 278 disposed within the channel 276 of the track housing 274, as depicted in FIGS. 28 and 29.

Figure 27D:
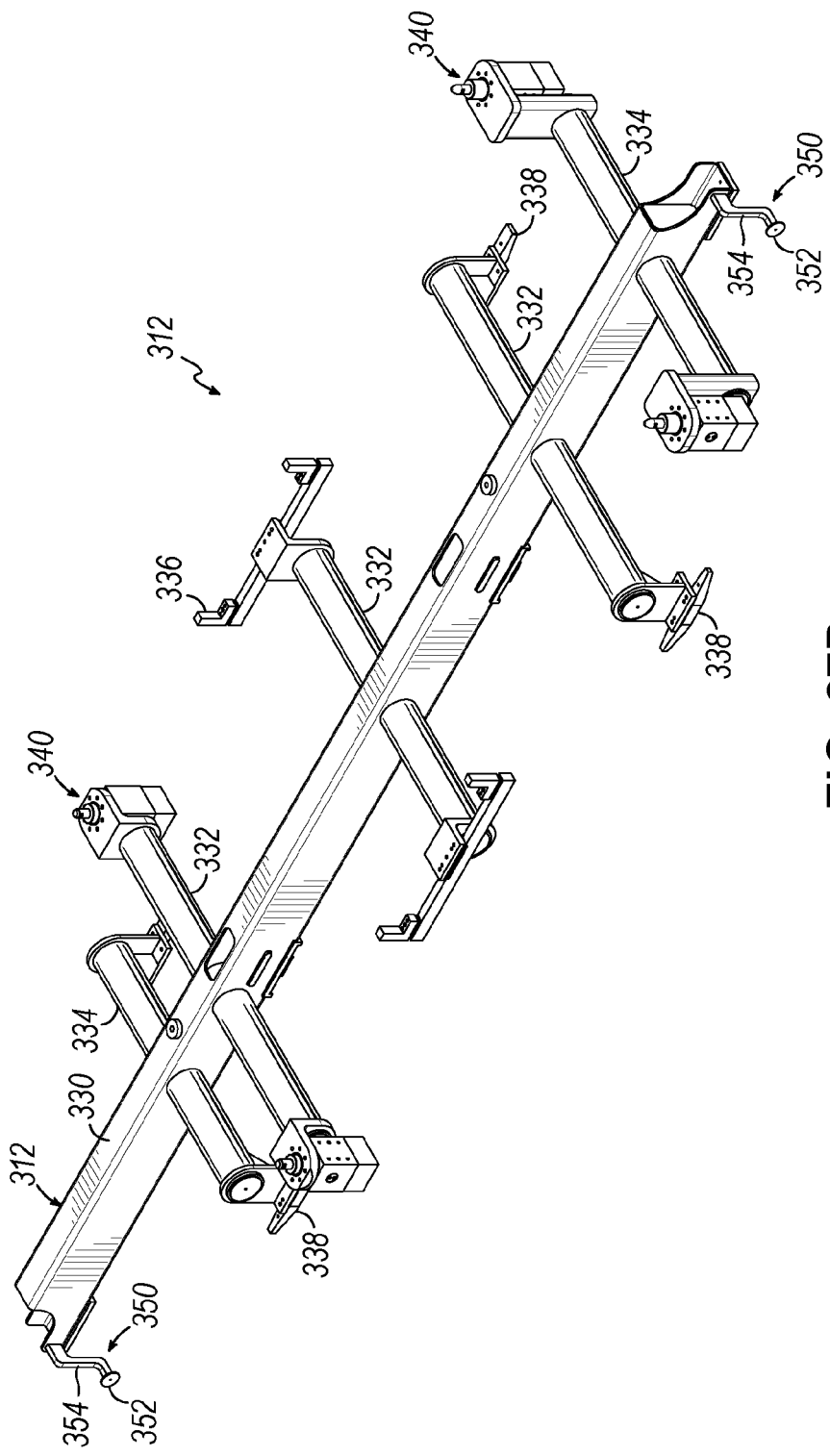
FIG. 27D is a perspective view of an exemplary second carrier portion of the exemplary carrier depicted in FIG. 27.

With continued reference to FIG. 27, and referring to FIGS. 27D, 28, and 29, the exemplary carrier 272 further includes a second carrier portion 312 configured to be received atop the first carrier portion 310. The second carrier portion 312 comprises an elongate mounting rail 330 supporting one or more transverse supports 332, 334 similar to the transverse supports described above with respect to FIGS. 22-26. The transverse supports 332, 334 may include load bearing surfaces 336 and/or appropriate fixtures (not shown) for supporting assembly components thereon, in a manner similar to that described above. In addition, the transverse supports 332, 334 may be coupled with locating structure 338 that cooperates with corresponding locating fixtures of a workstation, as will be described in more detail below. The second carrier portion 312 may further include actuators 340 for engaging and securing assembly components on the second carrier portion 312. In an exemplary embodiment, the actuators 340 may be actuated between at least a first condition wherein components may be received or removed from the second carrier portion 312, and a second condition wherein the components are secured on the second carrier portion 312.

With particular reference to FIGS. 28 and 29, the first carrier portion 310 includes at least one first engagement feature 342, and the second carrier portion 312 includes at least one second engagement feature 344 that is complementary to the first engagement feature 342, whereby the first and second engagement features 342, 344 may be engaged with one another to locate and secure the second carrier portion 312 on the first carrier portion 310. In the embodiment shown, the first engagement feature 342 comprises one or more tapered pins positioned on an upper surface of the carriage 314 and extending upwardly therefrom. The second engagement feature 344 comprises receptacles having surfaces shaped complementary to the tapered pins of the first engagement features 342, thereby facilitating the location and secure coupling of the second carrier portion 312 on the first carrier portion 310 to thereby form a carrier 272 as illustrated in FIG. 27.

The second carrier portion 312 may further include at least one information storage device 350 supported thereon and containing information regarding the carrier 272 or components supported on the carrier 272. In the embodiment shown, the information storage device 350 comprises a radio frequency identification (RFID) tag 352 supported on an arm 354 extending from one side of the mounting rail 330. While the information storage device 350 has been shown and described herein as an RFID tag supported on the mounting rail 330 of the second carrier portion 312, it will be appreciated that the information storage device 350 may comprise other structure and may alternatively be supported on other portions of the carrier 272 as may be desired.

As discussed above, the linear motors 278 provided in each track segment 270 are actuated to create magnetic fields that cooperate with the magnets 326 on the first carrier portion 310 to provide the motive force for moving the carriers 272 along a plurality of track segments 270 to precisely position the carriers 272 at desired locations along the track segments 270. Accordingly, the track segments 270 and carriers 272 disclosed in FIGS. 27-29 may be used in a conveyance system similar to the conveyance system 200 discussed above.

Referring now to FIGS. 30-33, an exemplary workstation 360 for use in a flexible conveyance system in accordance with the principles of the present disclosure is shown and described. The workstation 360 may be useful for adding or removing components to a carrier 272, or for performing procedures on components supported on the carriers 272, as described above. In the embodiment shown, the workstation 360 includes at least one workstation track segment 362 supported on a support frame 364 in alignment with at least one track segment 270 of the flexible conveyance system. The workstation track segment 362 is similar to the track segments 270 of the conveyance system and includes an open upper side defining an upwardly facing channel 366 that extends lengthwise along the workstation track segment 362. At least one linear motor 278 is disposed within the channel 366, however, it will be appreciated that the workstation track segment 362 may alternatively include more than one linear motor 278 to provide motive force to a carrier 272 supported thereon.

In this embodiment, the support frame 364 includes a central longitudinal support member 368 and vertical supports 370 disposed beneath the workstation track segment 362, similar to the track segment 270 illustrated in FIG. 27. The workstation 360 further includes first and second outer longitudinal support members 372, 374 spaced from the central longitudinal support member 368, and first and second lateral support members 376, 378 joined with the longitudinal support members 368, 372, 374 to define the support frame 364. The workstation 360 further includes one or more vertically extending posts 380 supporting locating fixtures 382, 384 positioned to cooperate with the locating structure supported on the carriers 272, as described above.

Figure 32:
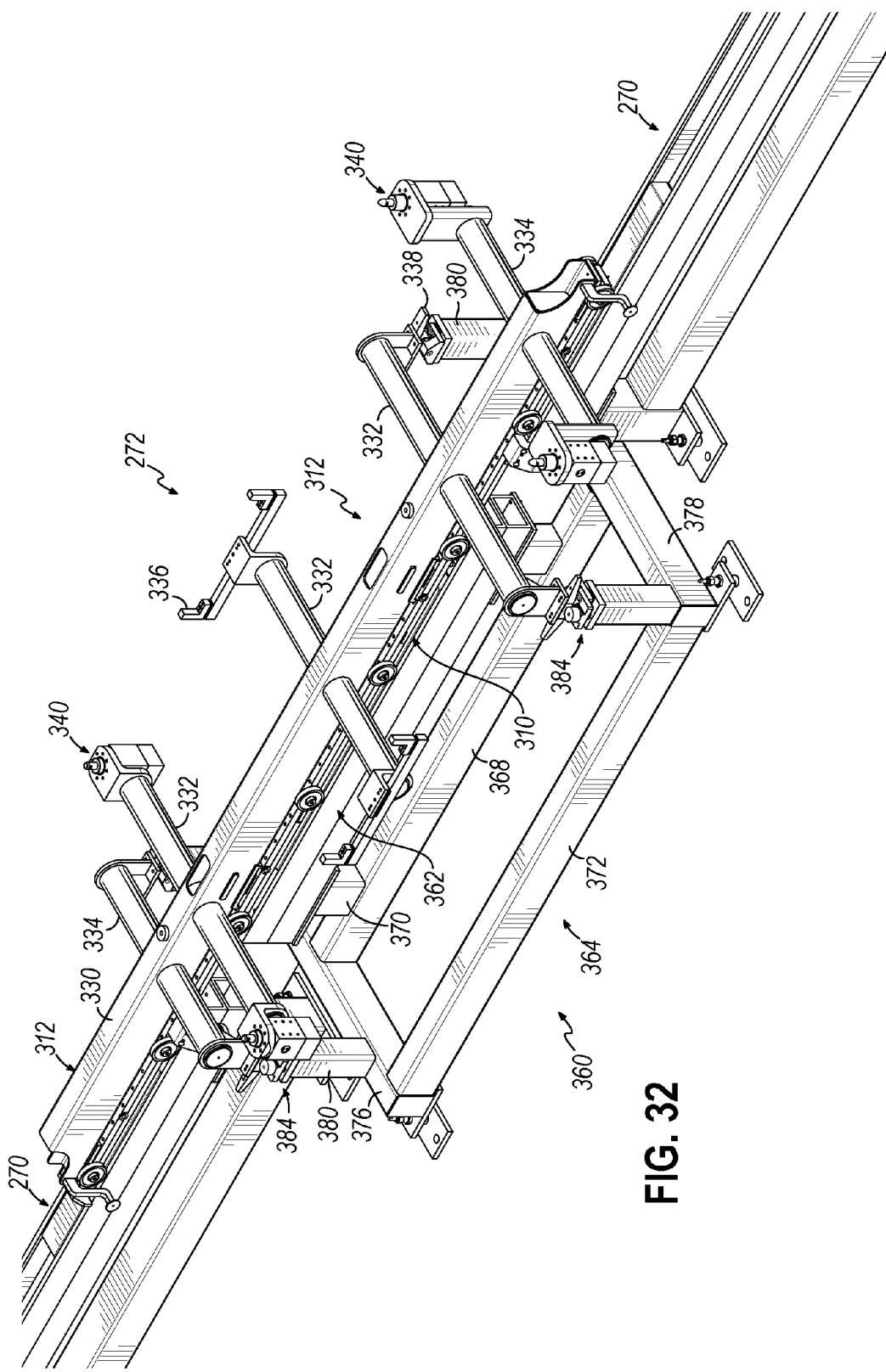
FIG. 32 is a perspective view of the workstation of FIG. 30, illustrating an exemplary carrier supported at the workstation.

With reference to FIGS. 31, 31A, 31B, and 33, the exemplary workstation 360 includes four posts 380 supporting corresponding locating fixtures 382, 384. In the embodiments shown, the locating fixtures 382, 384 include first rollers 388 for engaging a first locating surface of the locating structure 338 on the carrier 272. The first rollers 388 are positioned to define a desired vertical height of the second carrier portion 312 when the carrier 272 is received in the workstation 360 and the locating structures 338 are engaged with the first rollers 388, as depicted in FIG. 32. The locating fixtures 382, 384 may further include second rollers 390 for engaging second locating surfaces of the locating structure 338 on the carriers 272 when the carriers 272 are received in the workstation 360, as illustrated in FIG. 32.

Figure 33:
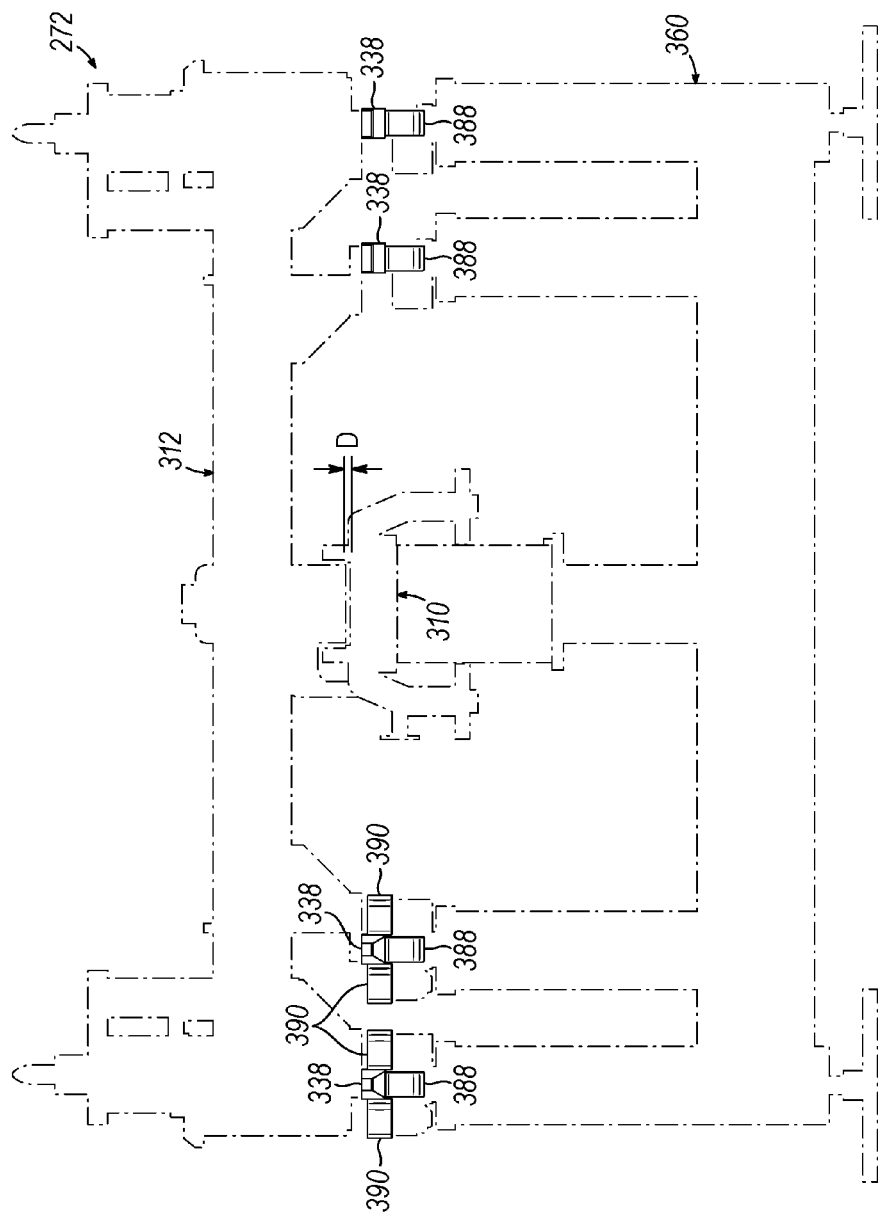
FIG. 33 is a partial front elevation of the workstation of FIG. 32, illustrating operation of the locating fixtures of the workstation.

In one aspect, the locating fixtures 382, 384 may be used to separate the second carrier portion 312 from the first carrier portion 310 and to position the second carrier portion 312 at a desired vertical height "D" when the carrier 272 is received in the workstation 360, as illustrated in FIG. 33. Specifically, as the carrier 272 travels along the workstation track segment 362, controlled by the linear motors 278 of the workstation track segment 362 and the track segments 270 of the conveyance system, the locating structure 338 supported on the second carrier portion 312 engages the first and second rollers 388, 390 of the workstation 360 to precisely position the second carrier portion 312 within the workstation 360. As lower surfaces of the locating structure 338 on the second carrier portion 312 engage the first rollers 388, the second carrier portion 312 is lifted in a vertical direction to separate the second carrier portion 312 from the first carrier portion 310.

In one embodiment, the first and second engagement features 342, 344 on the first and second carrier portions 310, 312 may be configured such that the first and second engagement features 342, 344 cooperate to maintain the position of the second carrier portion 312 relative to the first carrier portion 310 in the direction of travel along the workstation track segment 362, while the second rollers 390 on the locating fixtures 384 cooperate with side surfaces of the locating structure 338 of the second carrier portion 312 to control the position of the second carrier portion 312 relative to the first carrier portion 310 in directions transverse to the direction of travel along the workstation track segment 362. Separation of the second carrier portion 312 from the first carrier portion 310 in this manner may facilitate the addition or removal of components supported on the carrier 272, or the processing of components supported on the carrier 272, as may be required.

After components have been added or removed from the carrier 272 in the workstation 360, or after procedures have been performed on components supported on the carrier 272, the linear motors 278 of the workstation track segment 362 and the track segments 270 of the conveyance system may be actuated to move the carrier 272 out of the workstation 360. As the carrier 272 is moved out the workstation 360, the locating structure 338 on the second carrier portion 312 disengage from the first and second rollers 388, 390 of the locating fixtures 382, 384 of the workstation 360, whereby the second carrier portion 312 is lowered fully onto the first carrier portion 310 and the carrier 272 may travel toward the next station along the flexible conveyance system.

Figure 34:
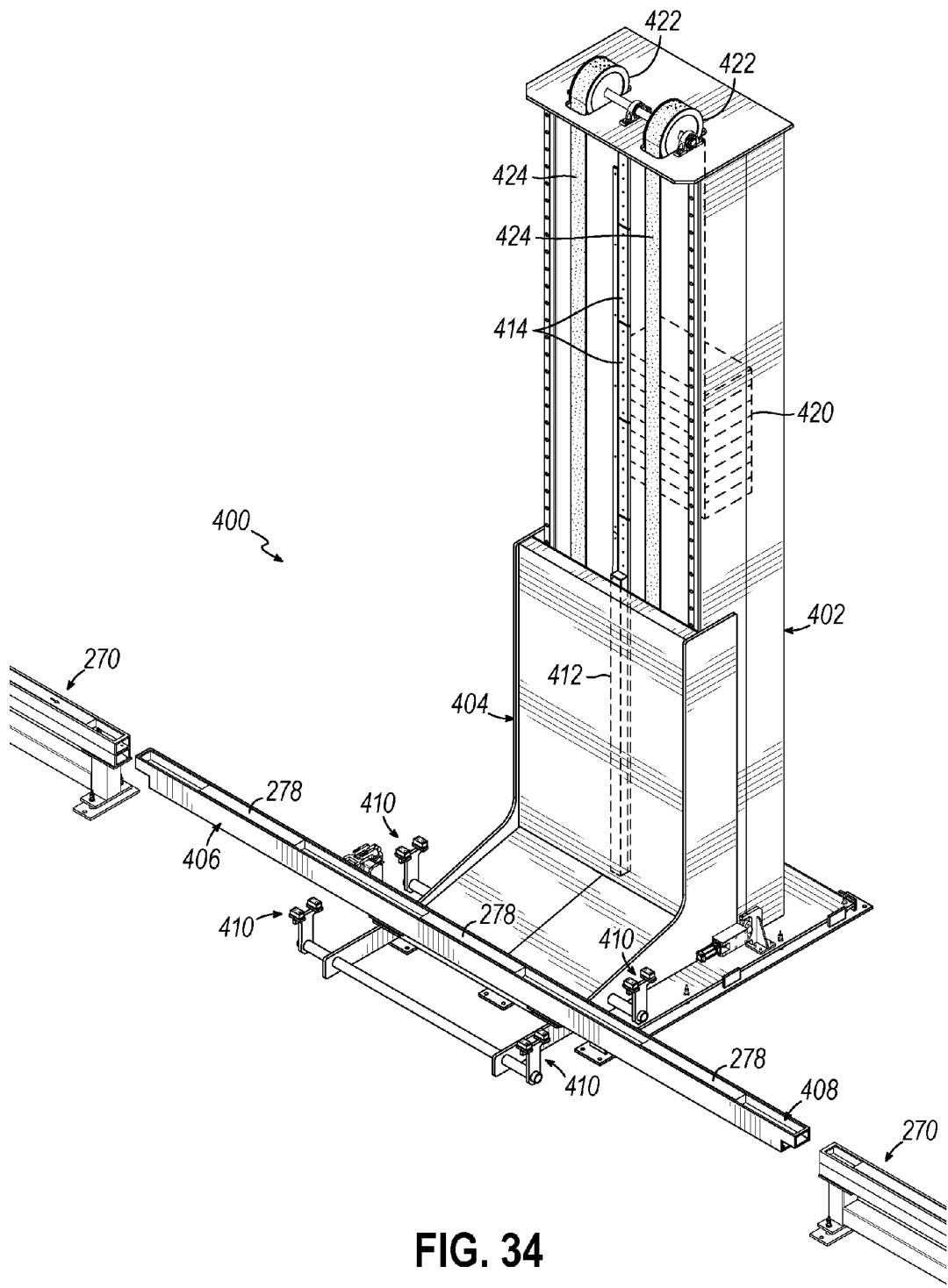
FIG. 34 is a perspective view of an exemplary track elevator in accordance with the principles of the present disclosure.
Figure 35:
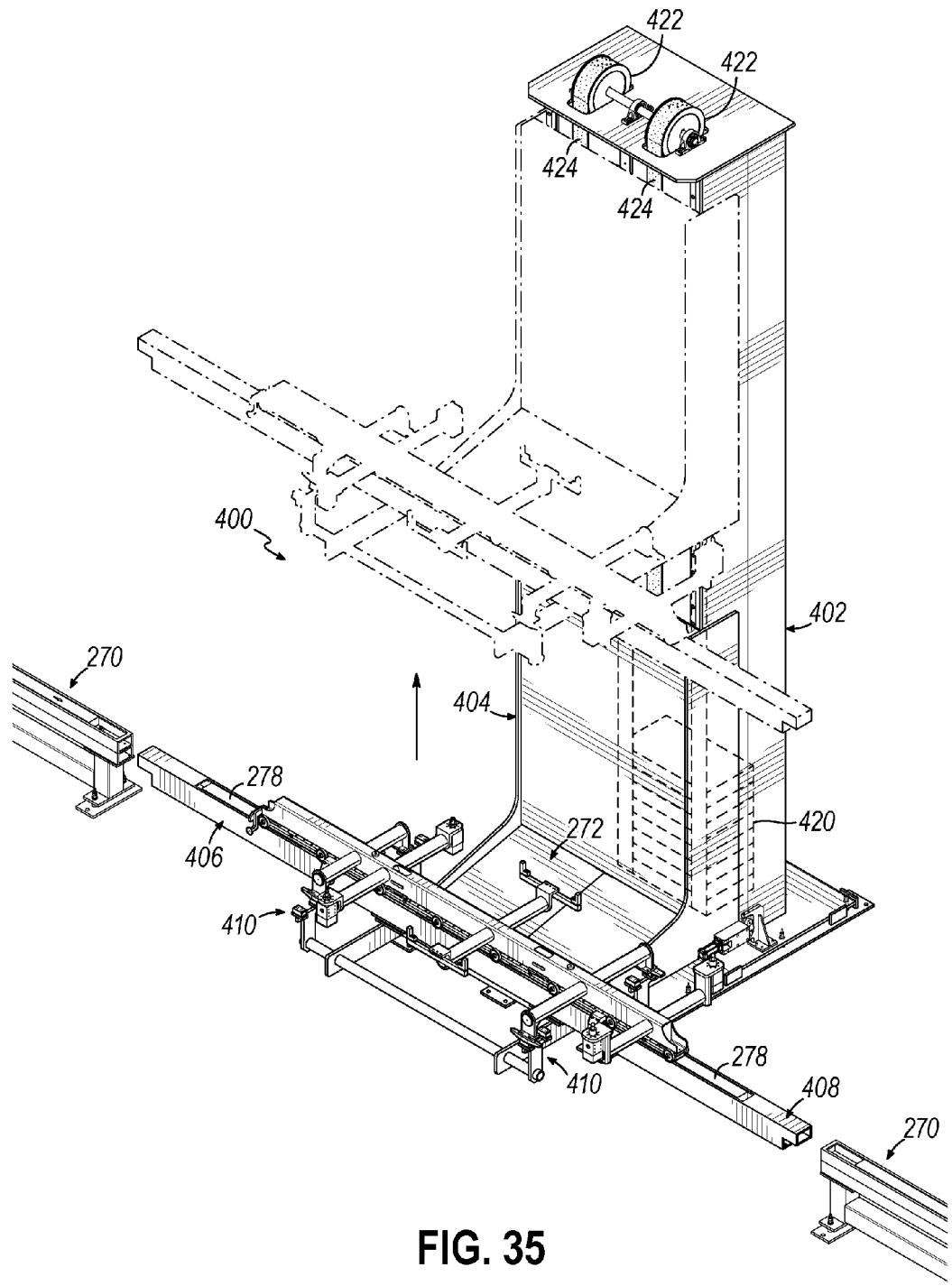
FIG. 35 is a perspective view of the track elevator of FIG. 34, illustrating a raised position of the elevator.
Figure 36:
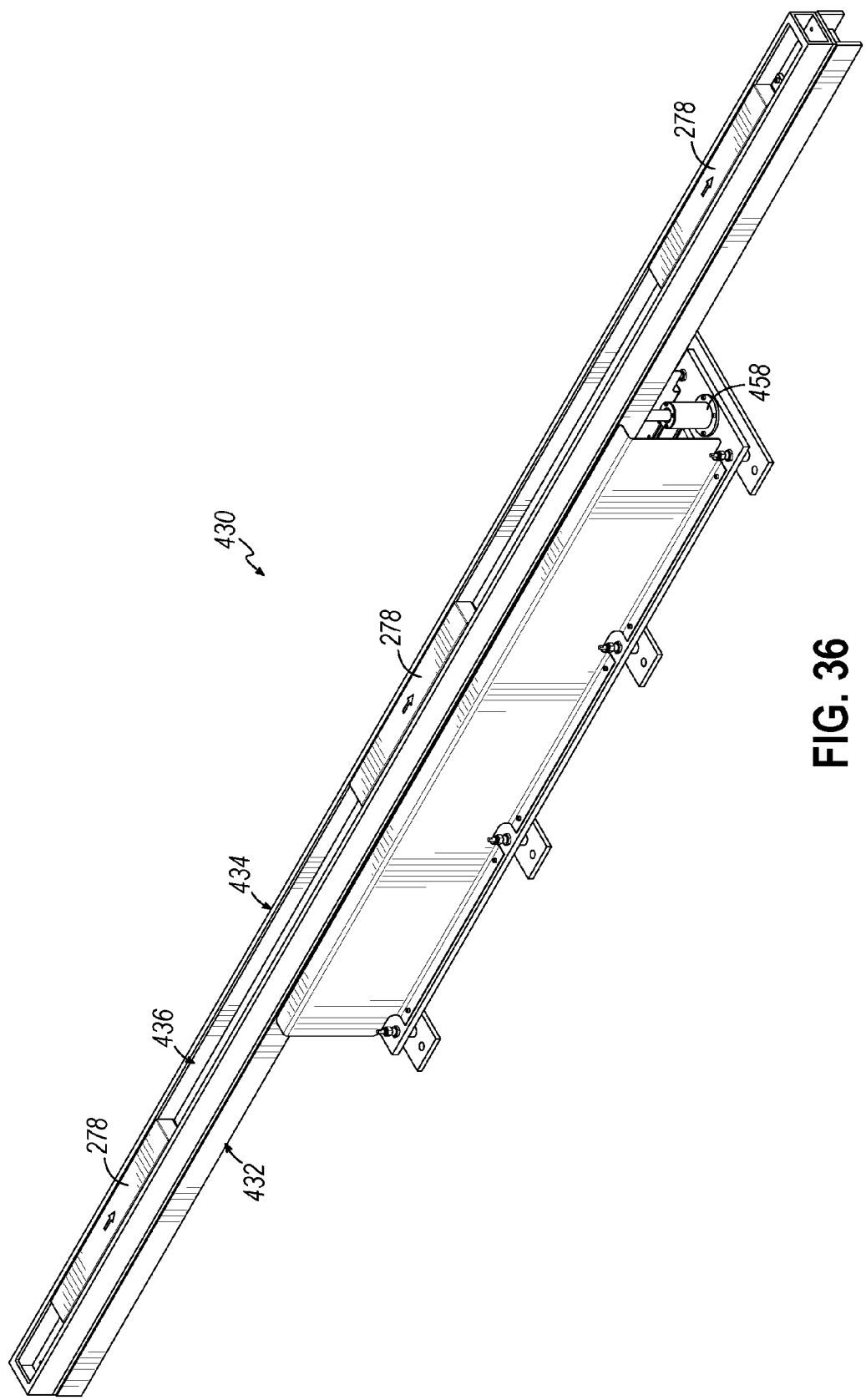
FIG. 36 is a perspective view of an exemplary lift for use with a flexible conveyance system in accordance with the principles of the present disclosure.

Referring now to FIGS. 34 and 35, an exemplary elevator 400 for use in the flexible conveyance system and for vertically raising a carrier 272 is shown and described. In the embodiment shown, the elevator 400 includes a vertically extending frame 402 and an elevator platform 404 operatively coupled with the frame 402 for movement between a lowered position (illustrated in FIG. 34) and at least one raised position (illustrated in FIG. 35). At least one elevator track segment 406 is supported on the elevator platform 404 and is aligned with at least one track segment 270 of the flexible conveyance system in the lowered position of the elevator platform 404. The elevator track segment 406 is similar to the track segments 270 of the flexible conveyance system described above, and includes an open upper side defining an upwardly facing channel 408 that extends lengthwise along the elevator track segment 406.

At least one first linear motor 278 is disposed within the channel 408 for moving carriers 272 onto and off of the elevator track segment 406. In the embodiment shown, the elevator track segment 406 includes three linear motors 278, however, it will be appreciated that the elevator track segment 406 may include only a single linear motor 278, or may include various other numbers of linear motors 278 as may be required to move carriers 272 along the elevator track segment 406 and to position carriers 272 thereon. The elevator 400 may further include one or more stabilizers 410 disposed adjacent the elevator track segment 406 to engage and stabilize carriers 272 received on the elevator track segment 406 during movement of the elevator platform 404 between the lowered and raised positions.

To facilitate movement of the elevator platform 404 along the vertical frame 402, the elevator 400 further includes at least one second linear motor 412 coupled with the elevator platform 404. At least one magnet 414 is coupled with the vertical frame 402 and is positioned in a closely spaced relationship with the at least one second linear motor 412 on the elevator platform 404, whereby the second linear motor 412 may be energized to cause the elevator platform 404 to move along the vertical frame 402 between the lowered and raised positions.

The elevator 400 may further include a counterweight 420 operatively coupled with the elevator platform 404 to offset the weight of the platform 404 and/or the elevator track segment 406 and a carrier 272 supported thereon, so that the effective lifting force required by the second linear motor 412 is reduced. In the embodiment shown, one or more plurality of pulleys 422 are disposed at an upper end of the vertical frame 402 and are coupled with the elevator platform 404 by respective belts 424. The belts are secured to the counterweight 420, thereby reducing the effective weight of the elevator platform 404 and/or the elevator track segment 406 and a carrier 272 supported thereon.

In use, the linear motors 278 of the elevator 400 and the conveyance system are actuated to position a carrier 272 on the elevator track segment 406, as depicted in FIG. 35, with the stabilizers 410 engaging the carrier 272. Thereafter, the second linear motor 412 may be actuated to move the platform 404 and carrier 272 to a raised position. Advantageously, the elevator 400 may be used to raise a carrier 272 to a desired position for performing operations on components supported on the carrier 272, or to facilitate the transfer of a carrier 272 to a different line of tack segments 270 positioned at a higher elevation.

FIGS. 36-39 depict an exemplary lift 430 for use in a flexible conveyance system and which may be useful for lifting a carrier 272 a desired distance above a floor surface when the height to which the carrier 272 is to be raised is generally less than the capabilities of the elevator 400 discussed above. In the embodiment shown, the lift 430 includes an elongate lift rail 432 that is movable between a lowered position (illustrated in FIG. 38) and at least one raised position (illustrated in FIG. 39) relative to a floor surface. At least one lift track segment 434 is supported on the lift rail 432 and is aligned with a track segment 270 of the flexible conveyance system in the lowered position. The lift track segment 434 is similar to the track segments 270 of the flexible conveyance system described above, and includes an upper side defining an upwardly facing channel 436 that extends lengthwise along the lift track segment 434. At least one first linear motor 278 is disposed within the channel 436 to facilitate movement and positioning of a carrier 272 thereon, in cooperation with the track segments 270 of the conveyance system.

Figure 37:
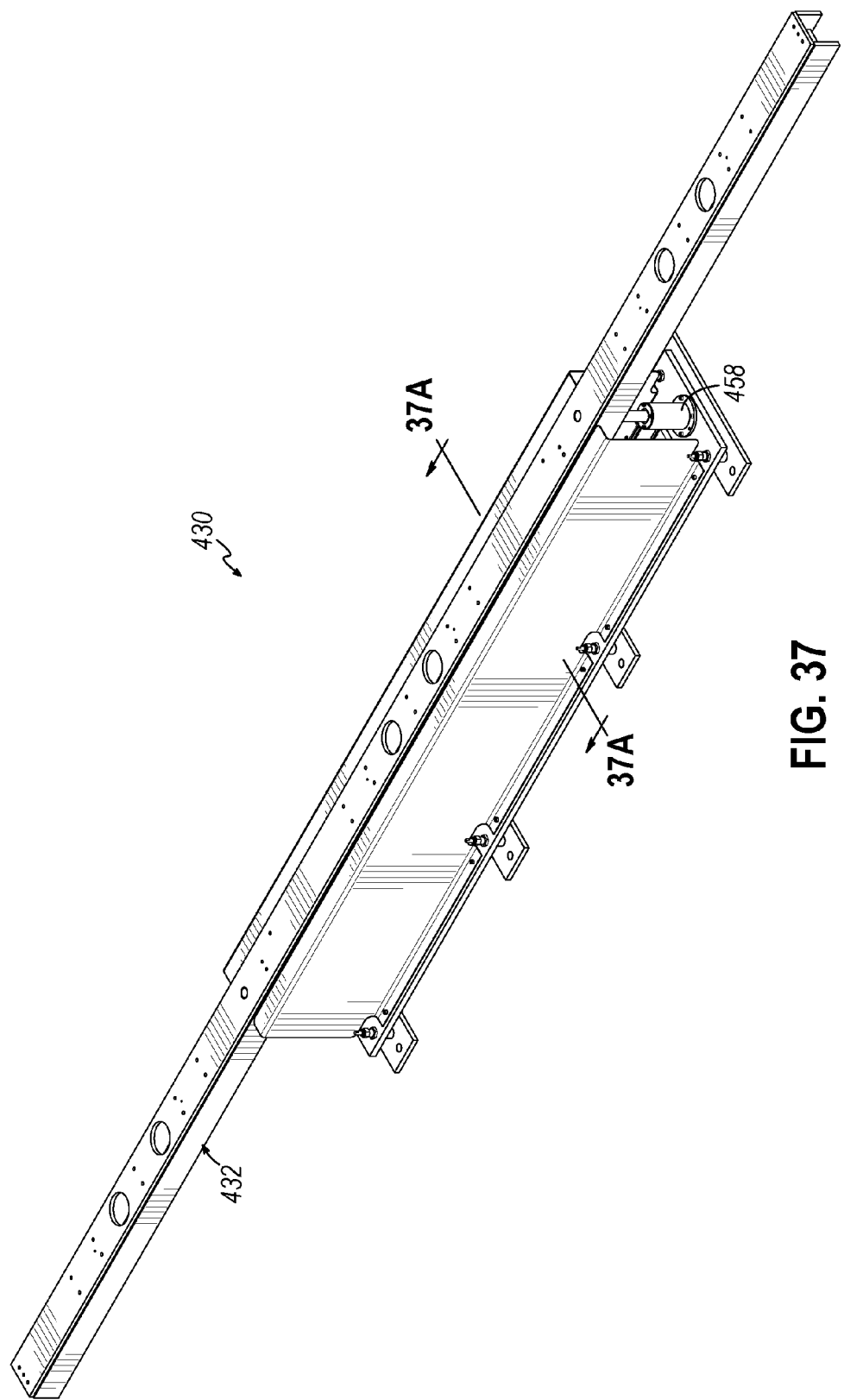
FIG. 37 is a perspective view of the lift of FIG. 36, with the track segment removed for illustration.
Figure 37A:
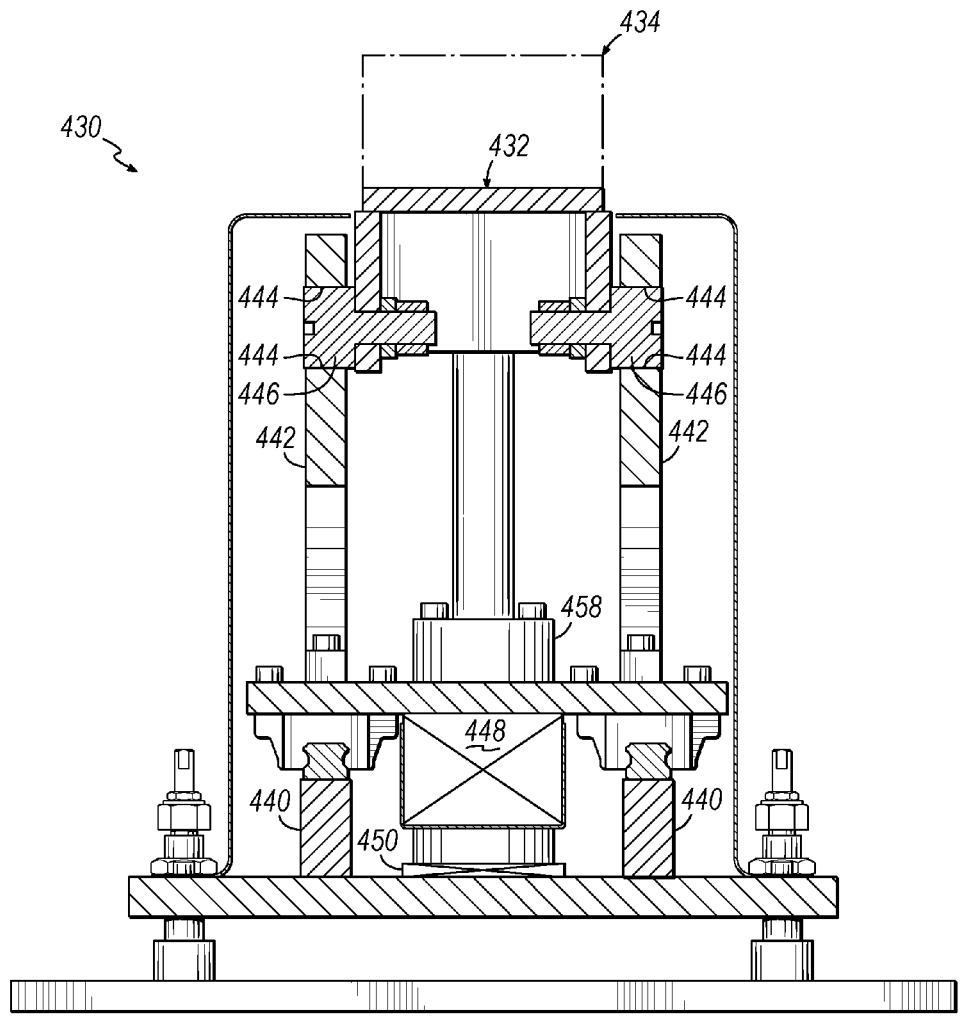
FIG. 37A is a partial cross-sectional view of the lift of FIG. 37, taken along line 37A-37A.
Figure 38:
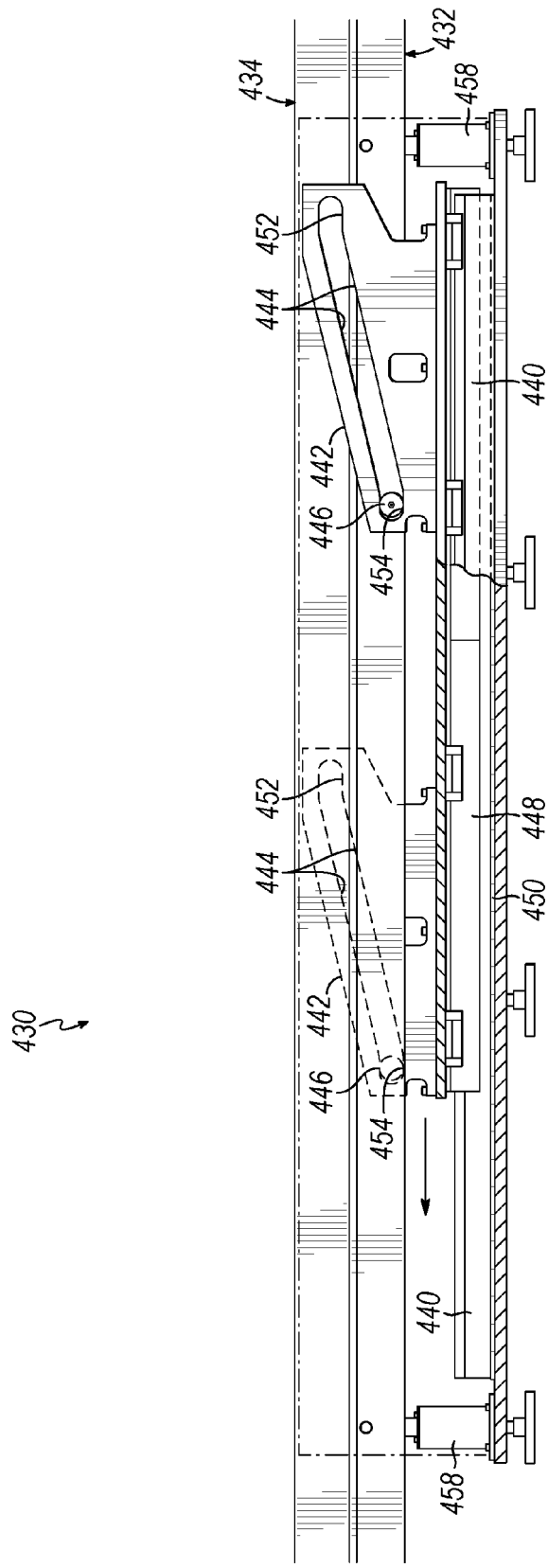
FIG. 38 is a partial elevation view of the lift of FIG. 36, illustrating the lift track segment in a lowered configuration.
Figure 39:
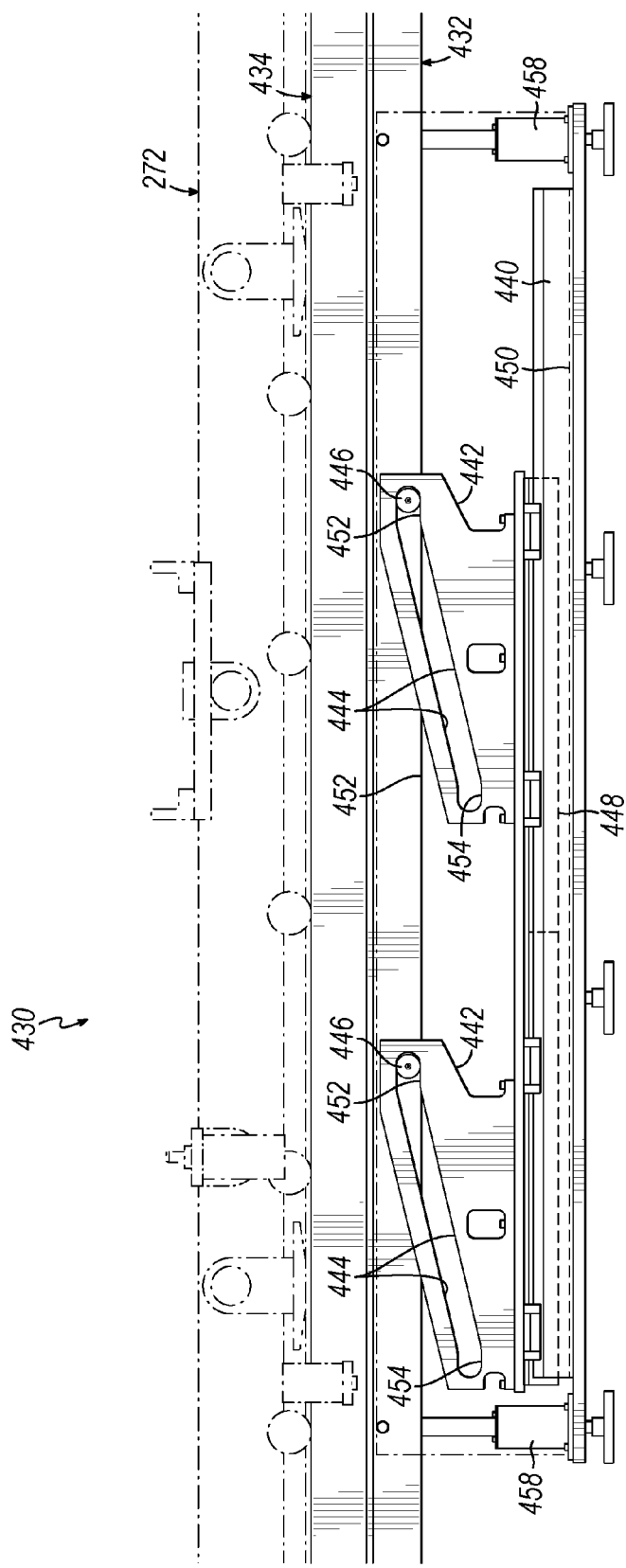
FIG. 39 is a side elevation view of the lift of FIG. 38, illustrating the lift track segment in a raised configuration.

Referring now to FIGS. 37A, 38, and 39, the lift 430 further includes elongate guide members 440 aligned with the longitudinal direction of the lift track segment 434. At least one cam member 442 is slidably coupled with a guide member 440 for movement along the guide member 440 in directions parallel to the longitudinal direction of the lift track segment 434. In the embodiment shown, two cam members 442 are provided on each transverse side of the lift track segment 434 for sliding movement along respective guide members 440. Each cam member 442 includes at least one cam surface 444 which may be engaged by a follower member 446 to define a path for movement of the lift rail 432 between the lowered and raised positions. In the embodiment shown, the cam surfaces 444 may be defined by a shaped slot formed in the cam member 442. At least one follower member 446 is coupled with the lift rail 432 and extends into the slot to engage the cam surfaces 444 of the cam member 442.

The lift 430 further includes at least one second linear motor 448 supported on the cam member 442 and at least one magnet 450 supported on the guide member 440 and spaced from the second linear motor 448 a distance to facilitate actuation of the cam member 442 to desired positions along the guide member 440 using the second linear motor 448. FIG. 38 depicts the lift rail 432 in a lowered position wherein the follower members 446 coupled with the lift rail 432 are positioned within the slots in the cam member 442. FIG. 39 illustrates a lift rail 432 in a raised position which has been achieved by actuating the linear motors 448 to move the cam members 442 in a direction generally to the left, as viewed in the figure, whereby the cam followers 446 engaged with the cam surfaces 444 are caused to follow the cam surfaces 444, thereby raising the lift rail 432. The cam members 442 may include one or more dwell portions 452, 454 defined by the cam surfaces 444 wherein at least a portion of the weight of the lift rail 432 and the lift track segment 434 may be at least partially supported by the cam surfaces 444. In the embodiment shown, the cam members 442 include dwell portions 452, 454 at the distal ends of the slot, however, it will be appreciated that dwell portions may be included at various other positions along the slot, as may be desired.

The lift 430 may further include pneumatic cylinders 458 coupled with the lift rail 432 to facilitate guiding the lift rail 432 between the lowered and raised positions, and to offset the effective lifting force required by the second linear motors 448 to raise and lower the lift rail 432.

Figure 40:
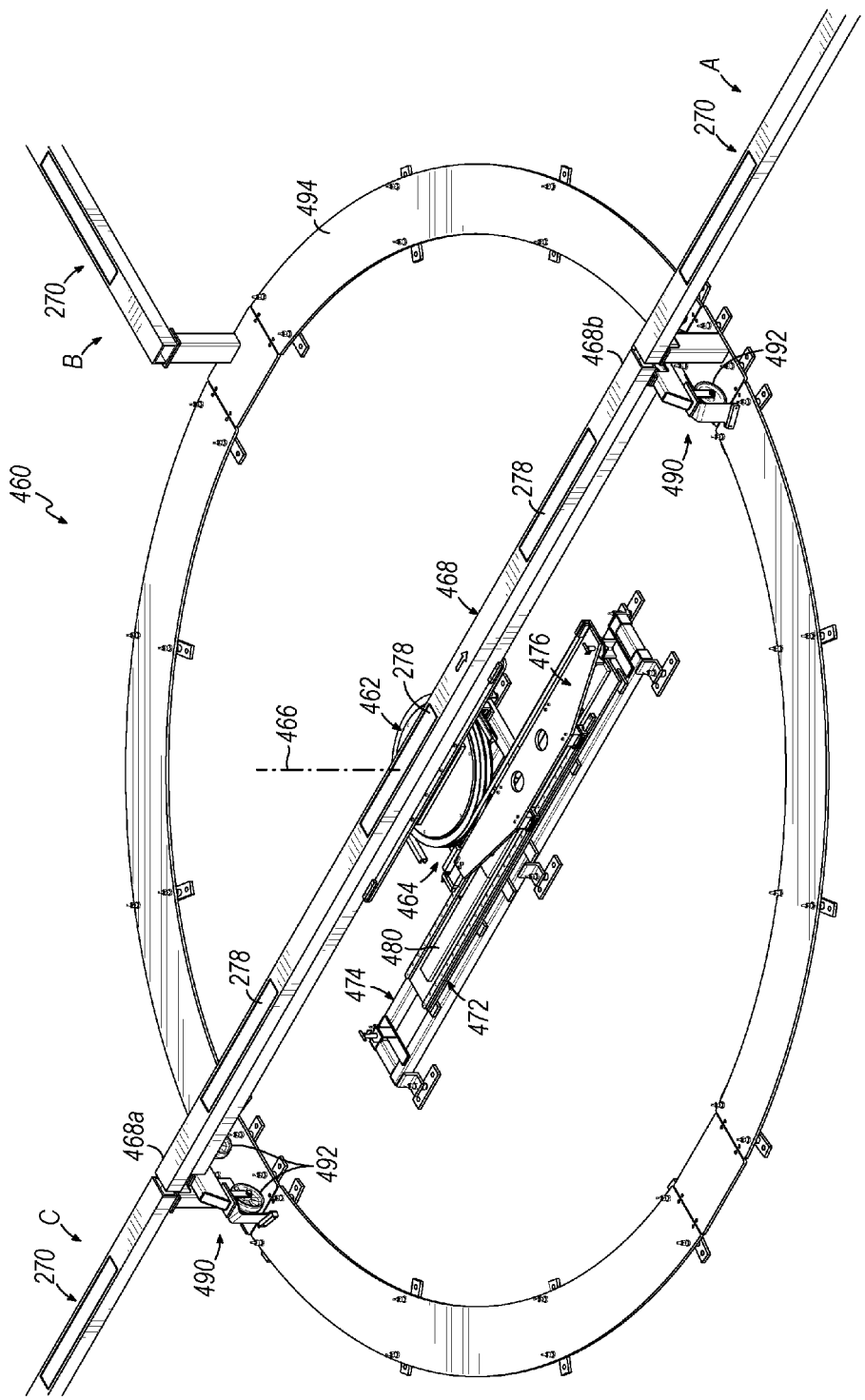
FIG. 40 is a perspective view of an exemplary track turnaround for use with the flexible conveyance system in accordance with the principles of the present disclosure.
Figure 40A:
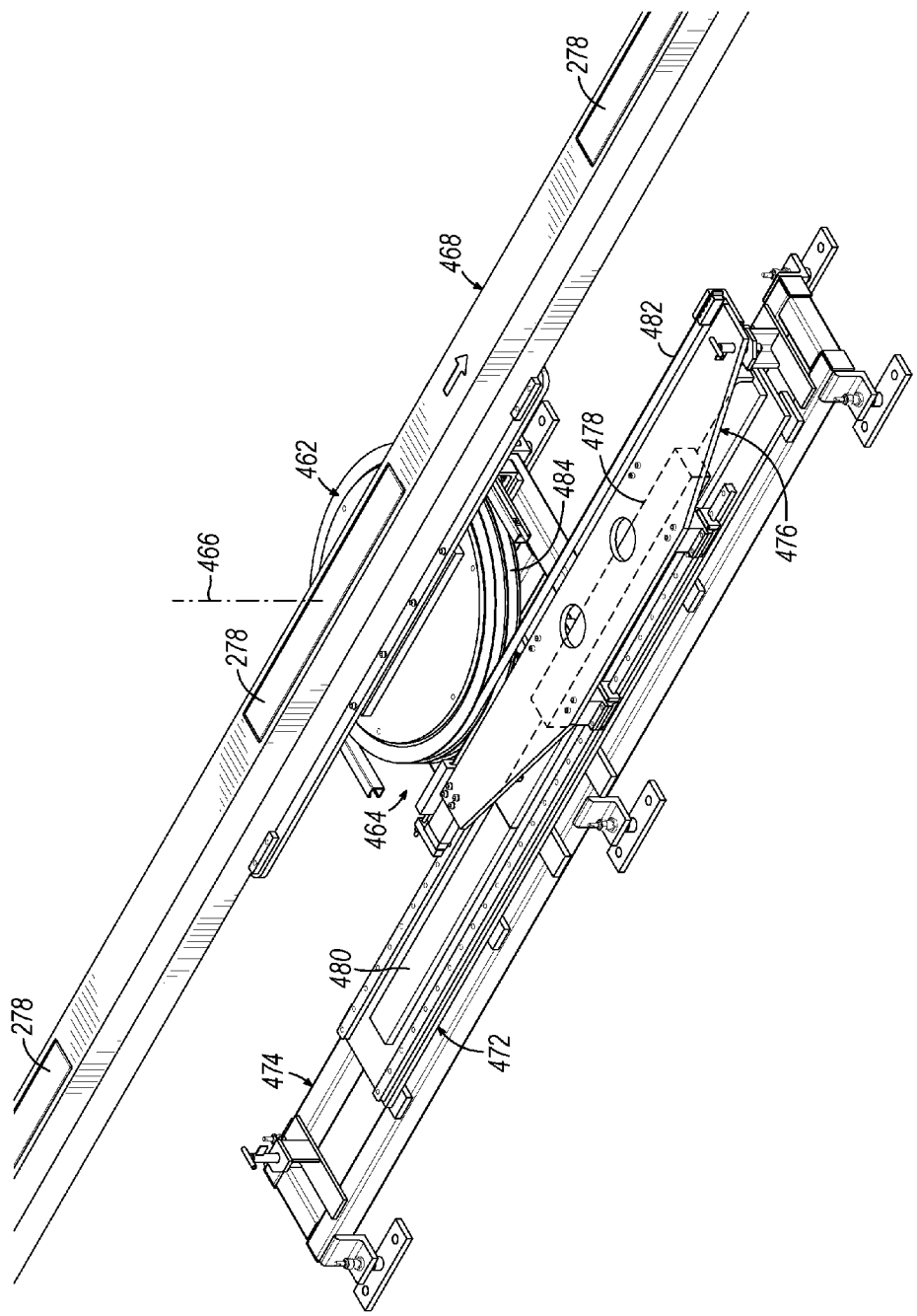
FIG. 40A is an enlarged perspective view the track turnaround of FIG. 40.
Figure 41:
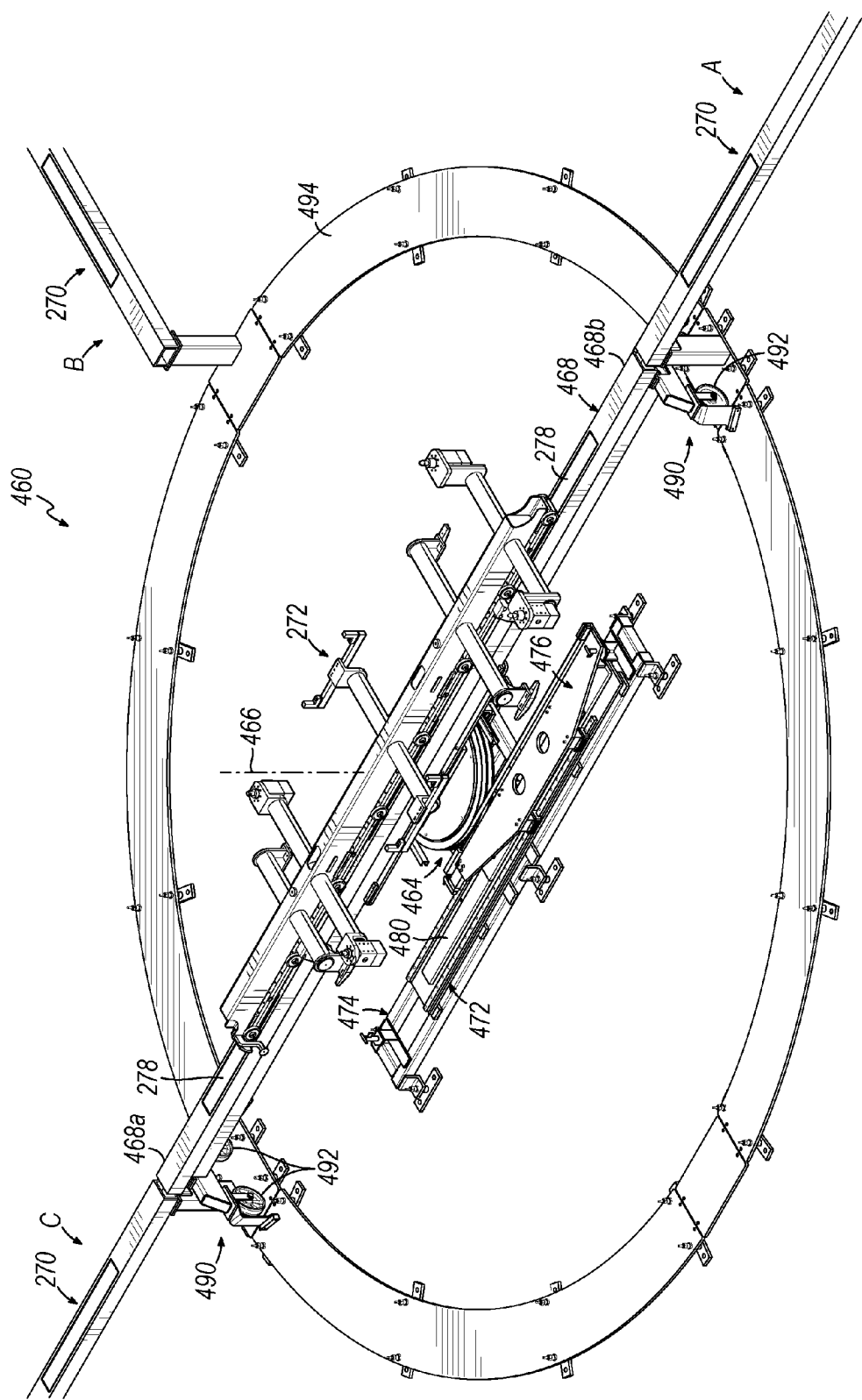
FIG. 41 is a perspective view of the track turnaround of FIG. 40, illustrating an exemplary carrier supported on the turnaround.

FIGS. 40 and 41 illustrate an exemplary turnaround 460 for use in a flexible conveyance system in accordance with the principles of the present disclosure. The turnaround 460 may be used to change the orientation of a carrier 272 relative to the track segments 270 of the conveyance system. Alternatively, the turnaround 460 may be used to direct a carrier 272 to a different line of track segments 270, as may be desired. In the embodiment shown, the turnaround 460 includes a platform 462 supported on a base 464 for rotation about a generally vertically extending axis of rotation 466. At least one turnaround track segment 468 is supported on the platform 462 and is substantially similar to the track segments 270 of the conveyance system discussed above. Specifically, the turnaround track segment 468 includes an open upper side defining an upwardly facing channel 470 that extends lengthwise along the turnaround track segment 468. At least one first linear motor 278 is disposed within the channel 470 to facilitate moving and positioning a carrier 272 thereon, in cooperation with the track segments 270 of the conveyance system.

The turnaround 460 further includes a guide rail assembly 472 spaced from the platform 462. In the embodiment shown, the guide rail assembly 472 is supported above a ground surface by a frame assembly 474. At least one shuttle 476 is slidably supported on the guide rail assembly 472 for movement therealong. At least one second linear motor 478 is supported on the shuttle 476, and at least one magnet 480 is supported on the guide rail assembly 472 in spaced relationship to the second linear motor 478, whereby the second linear motor 478 may be used in cooperation with the magnet 480 to move the shuttle 476 back and forth along the guide rail assembly 472. The shuttle 476 is operatively coupled with the platform 462 such that movement of the shuttle 476 along the guide rail assembly 472 rotates the platform 462 about the axis of rotation 466, thereby rotating a carrier 272 supported on the turnaround track segment 468. In the embodiment shown, the shuttle 476 is coupled to the platform 462 by first and second belts 482, 484 wound in opposite directions around the platform 462. The distal ends of the belts 482, 484 are attached to the shuttle 476 whereby movement of the shuttle 476 along the guide rail assembly 472 applies a corresponding torque to the platform 462 to thereby rotate the platform 462 and turnaround track segment 468. It will be appreciated that various other structure may alternatively be used to convert linear movement of the shuttle 476 by the linear motor 478 into rotation of the platform 462. As a non-limiting example, such other structure may include a rack-and-pinion gear arrangement.

In the embodiment shown, the distal ends 468a, 468b of the turnaround track segment 468 may be supported for rotation with the platform 462. In this embodiment, the distal ends 468a, 468b of the turnaround track segment 468 are supported by trolleys 490 having wheels 492 that ride on a trolley track 494 as the platform 462 rotates about the axis of rotation 466. One or more track segments 270 may be positioned around the turnaround 460, adjacent the trolley track 494, whereby the turnaround track segment 468 may be actuated to change the orientation of a carrier 272 supported on the turnaround 460 along a given direction of travel, or to divert a carrier 272 from one line of track segments 270 to another line of track segments 270.

Figure 42A:
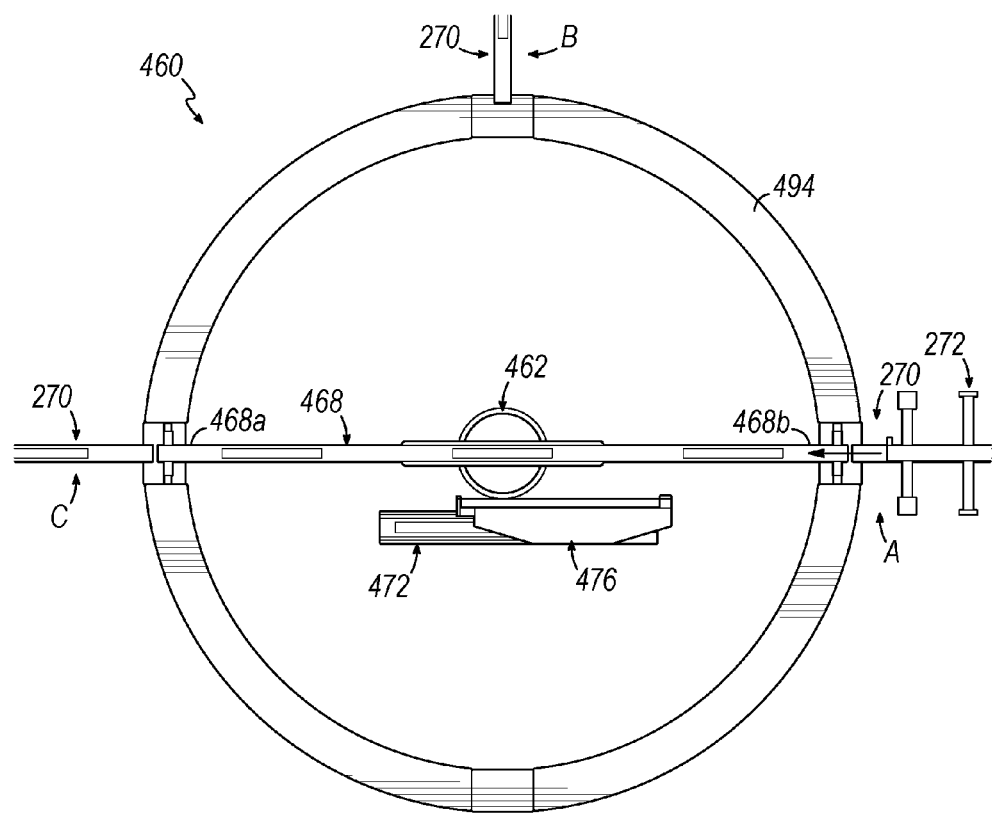
FIGS. 42A-42E are top plan views of the track turnaround of FIG. 40, illustrating exemplary operation of the track turnaround.
Figure 42B:
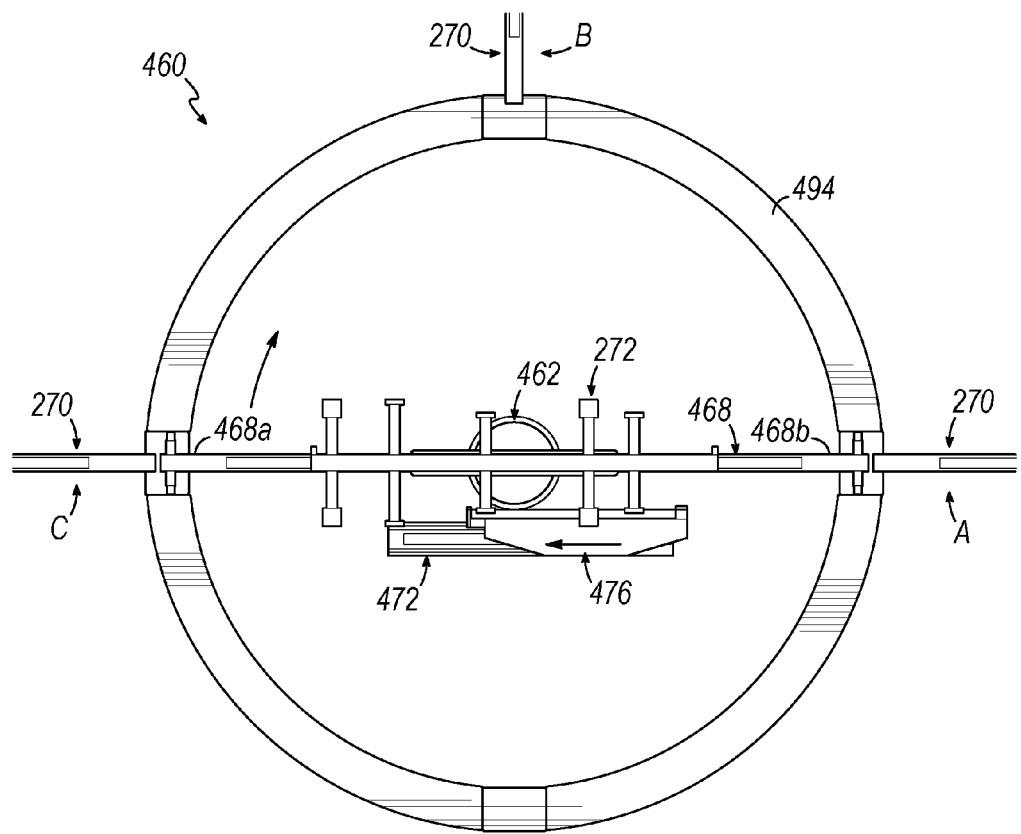
Figure 42C:
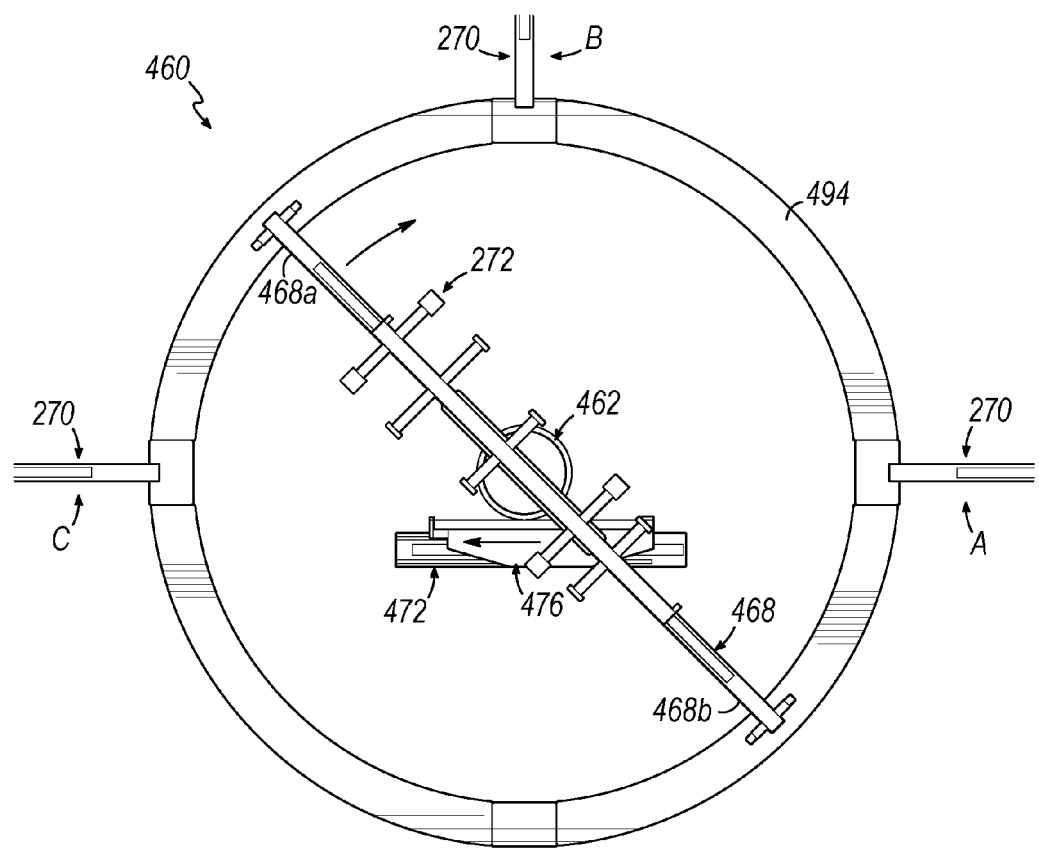
Figure 42D:
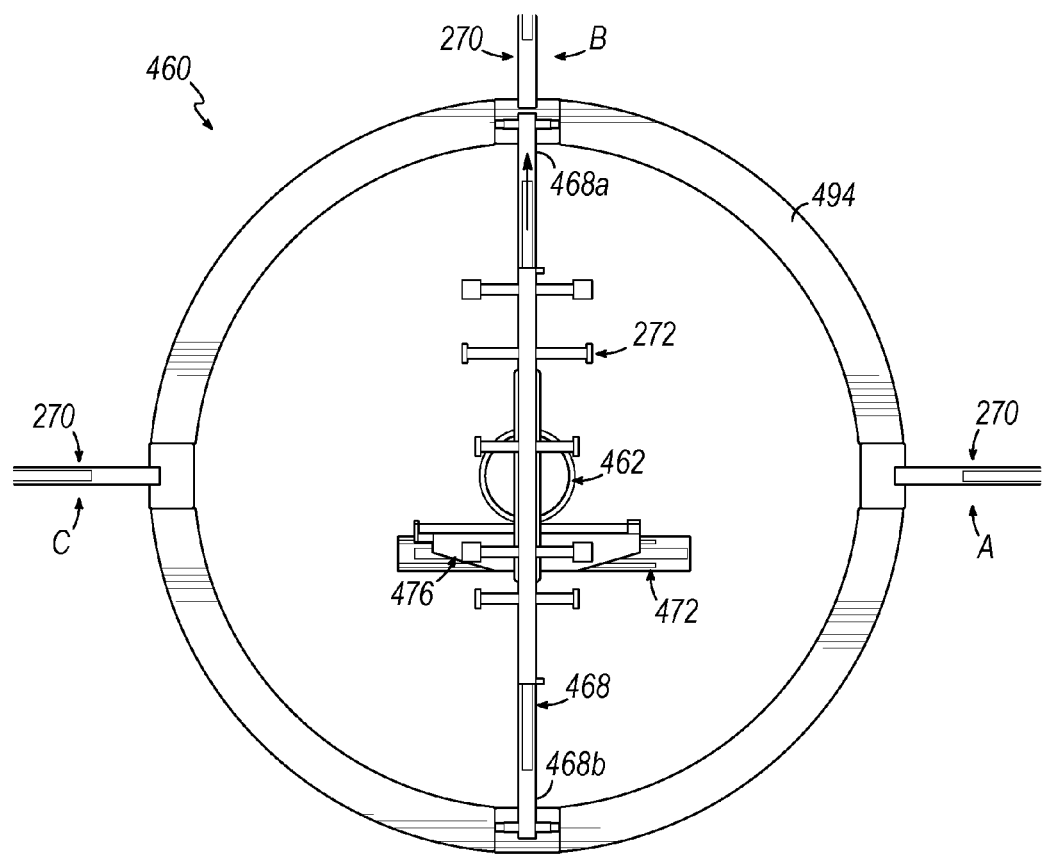

Referring now to FIGS. 41 and 42A-42E, operation of the exemplary turnaround 460 will be described with respect to track segment lines A, B, and C located adjacent the turnaround 460. A carrier 272 may approach the turnaround 460 along track segments 270 of line A, as depicted in FIG. 42A, under the control of linear motors 278 as described above. Once the carrier 272 is in position on the turnaround track segment 468, the carrier 272 is stopped, as depicted in FIGS. 41 and 42B. Thereafter, the second linear motors 478 of the turnaround 460 may be actuated to rotate the platform 462 and the carrier 272 supported on the turnaround track segment 468, as depicted in FIG. 42C. The platform 462 may be rotated until the turntable track segment 468 is aligned with a track segment 270 of line B, which is positioned approximately 90 degrees from the track segment of line A, as depicted in FIG. 42D. Thereafter, the linear motors 478 of the turnaround track segment 468 and the linear motors 278 of the track segments 270 of line B may be actuated to move the carrier 272 along line B as may be desired. In accordance with the process described above, the leading end of the carrier with respect to the direction of travel does not change.

Figure 42E:
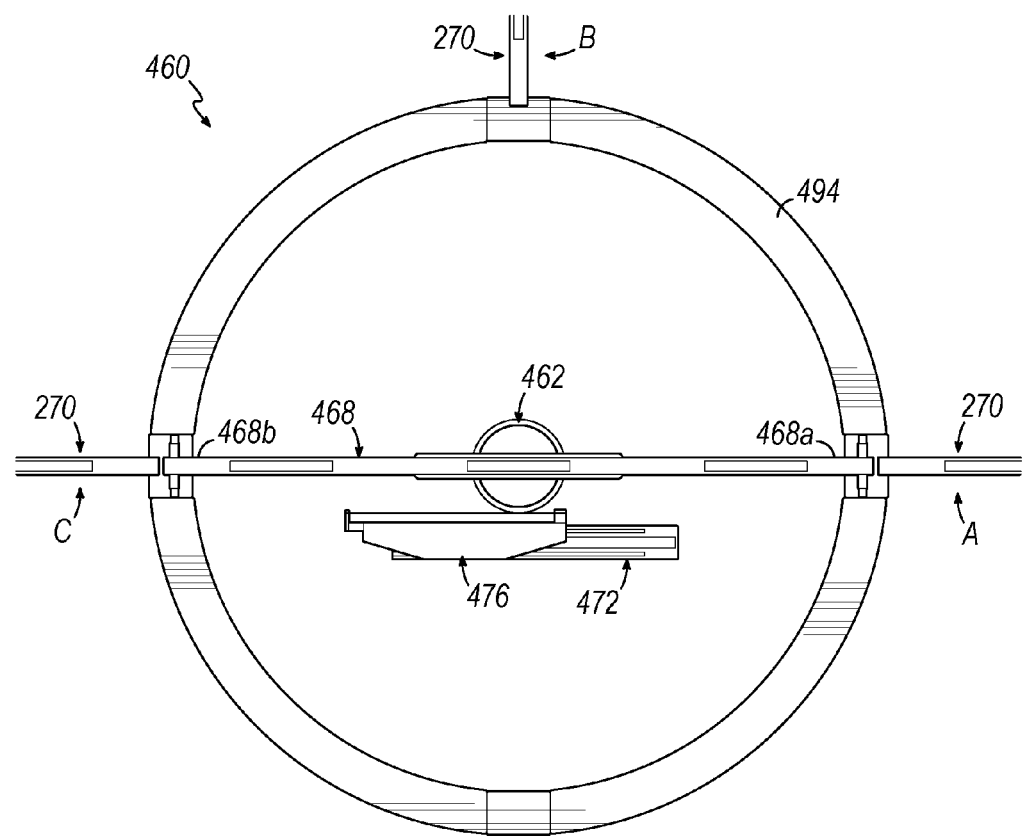

Alternatively, the turnaround 460 may be actuated to further rotate the platform 462, turnaround track segment 468, and a carrier 272 supported thereon, such that the distal end 468*b* of turnaround track segment 468 which was originally adjacent line A becomes positioned adjacent a track segment 270 of line C, which is positioned diametrically opposite the track segments 270 of line A, as depicted in FIG. 42E. In accordance with this operation of turnaround 460, the orientation of the carrier 272 will be changed with respect to the direction of travel so that as the second linear motors 478 of the turnaround 460 and the linear motors 278 of the track segments 270 of line C are actuated to move the carrier 272 from the turnaround track segment 468 and along the track segments 270 of line C, the end of the carrier 272 that was previously the trailing end during travel along line A will become the leading end during travel along line C. Changing the orientation of the carrier 272 in this manner may be useful to facilitate performing operations on assembly components supported on the carrier 272, particularly when only one side of a carrier 272 is accessible to assembly line personnel or robots.

While operation of the turnaround 460 has been described above with respect to lines A, B, and C positioned at 90 degrees and 180 degrees relative to one another, it will be appreciated that the turnaround 460 may be used with various other configurations of track segments 270, as may be desired, to change the direction of travel and/or the orientation of a carrier 272 with respect to the track segments 270.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An apparatus for use with a station of a flexible conveyance system having a plurality of track segments with linear motors for moving a carrier along the track segments, the carrier having at least one magnet cooperating with the linear motors of the conveyance system track segments to move the carrier along the track segments, the apparatus comprising:
at least one station track segment aligned with a track segment of the flexible conveyance system, the at least one station track segment having an upper side with at least one opening defining an upwardly-facing channel extending lengthwise along the station track segment, and having at least one linear motor disposed within the channel;
the at least one linear motor of the station track segment cooperating with the linear motors of the conveyance system track segments to receive and position the carrier on the station track segment; and
actuation structure proximate the station track segment and displacing at least a portion of the carrier when the carrier is positioned on the station track segment.

2. The apparatus of claim 1, wherein the actuation structure comprises:
at least one locating fixture spaced laterally from the at least one station track segment, the locating fixture defining at least one surface for contacting a complementary locating structure on the carrier when the carrier is received on the station track segment, whereby the locating fixture and the locating structure cooperate to position the carrier within the station.

3. The apparatus of claim 2, wherein contact between the locating fixture and the locating structure on the carrier moves a second carrier portion in a direction away from a first carrier portion that supports the second carrier portion thereon.

4. The apparatus of claim 2, wherein the actuation structure includes four locating fixtures spaced laterally from the at least one station track segment, and wherein a first pair of locating fixtures is positioned proximate a first distal end of the station track segment, a second pair of locating fixtures is positioned proximate a second distal end of the station track segment, and the first pair of locating fixtures is spaced laterally from the station track segment a greater distance than the second pair of locating fixtures.

5. The apparatus of claim 1, wherein the apparatus is an elevator for vertically displacing the carrier on the station track segment, the elevator comprising:
a vertically extending frame;
a elevator platform having a lowered position and movable along the vertical frame to at least one raised position;
wherein the station track segment is supported on the elevator platform and is aligned with a track segment of the flexible conveyance system in the lowered position;
at least one second linear motor coupled with the elevator platform;
at least one magnet coupled with the vertical frame;
the at least one second linear motor and the at least one magnet cooperating to move the elevator platform along the vertical frame between the lowered position and the at least one raised position.

6. The elevator of claim 5, further comprising:
a counterweight operatively coupled with the elevator platform and reducing an effective lifting force required by the second linear motor to raise the elevator platform from the lowered position.

7. The elevator of claim 5, further comprising:
at least one stabilizer disposed on the elevator platform, the stabilizer engaging a carrier received on the station track segment.

8. The apparatus of claim 1, wherein the apparatus is a lift for vertically displacing the carrier on the station track segment, the lift comprising:
an elongate lift rail movable between a lowered position and at least one raised position;
the at least one station track segment supported on the lift rail and aligned with a track segment of the flexible conveyance system in the lowered position;
a guide aligned with the longitudinal direction of the station track segment;
at least one cam member slidably coupled with the guide for movement therealong in a direction parallel to a longitudinal direction of the station track segment, the cam member having at least one cam surface;
at least one follower member on the lift rail and engaging the cam surface of the cam member;
at least one second linear motor on the cam member;
at least one magnet on the guide;
the at least one second linear motor and the at least one magnet cooperating to move the cam member along the guide such that the follower member moves along the cam surface between a first position corresponding to the lowered position of the lift rail and at least one second position corresponding to a raised position of the lift rail.

9. The lift of claim 8, wherein the cam member includes at least one dwell portion along the cam surface, wherein at least the weight of the lift rail and the station track segment is at least partially supported by the cam surface in a raised position of the lift rail.

10. The apparatus of claim 1, wherein the apparatus is a turnaround for angularly displacing the carrier on the station track segment, the turnaround comprising:
 a base;
 a platform supported on the base for rotation about a vertically extending axis of rotation;
 the at least one station track segment supported on the platform;
 a guide rail spaced from the platform;
 at least one shuttle slidably supported on the guide rail for movement therealong;
 at least one second linear motor on the shuttle; and
 at least one magnet on the guide rail;
 the at least one second linear motor and the at least one magnet cooperating to move the shuttle along the guide rail between first and second positions;
 the shuttle operatively coupled with the platform such that movement of the shuttle along the guide rail rotates the platform about the axis of rotation.

11. A carrier for use with a flexible conveyance system having a plurality of track segments with linear motors, the carrier comprising:
 a first carrier portion received on the track segments, the first carrier portion comprising:
  an elongate carriage;
  a plurality of wheel assemblies on the carriage, the wheel assemblies engagable with the track segments and facilitating sliding movement of the first carrier portion therealong;
  at least one magnet positioned to cooperate with the linear motors of the track segments when the first carrier portion is coupled with the track segments; and
  at least one first engagement feature; and
 a second carrier portion couplable with the first carrier portion, the second carrier portion comprising:
  an elongate rail;
  at least one second engagement feature on the rail, the second engagement feature complementary to the at least one first engagement feature and cooperating with the at least one first engagement feature to locate the second carrier portion on the first carrier portion; and
  support structure coupled with the rail and configured to support components to be assembled.

12. The carrier of claim 11, further comprising:
 at least one actuator on the second carrier portion;
 the at least one actuator actuatable between at least a first condition wherein components can be received on or removed from the second carrier portion, and a second condition securing components on the second carrier portion.

13. The carrier of claim 11, wherein the first engagement feature is shaped and configured such that the first and second engagement features remain in contact and control the position of the second carrier portion relative to the first carrier portion in a direction parallel to a longitudinal axis of the carrier when the second carrier portion is moved in a direction to separate the second carrier portion from the first carrier portion.

14. The carrier of claim 11, further comprising locating members supported on the second carrier portion for locating and positioning the second carrier portion in a workstation of the flexible conveyance system.

15. The carrier of claim 11, further comprising:
 at least one information storage device supported on the second carrier portion, the information storage device containing information regarding the carrier or components supported on the carrier.

16. The carrier of claim 15, wherein the information storage device utilizes RFID technology.

\* \* \* \* \*